United States Patent
Ito et al.

(10) Patent No.: US 8,870,650 B2
(45) Date of Patent: Oct. 28, 2014

(54) GAME SYSTEM, GAME APPARATUS, STORAGE MEDIUM HAVING GAME PROGRAM STORED THEREIN, AND GAME PROCESS METHOD

(75) Inventors: Jun Ito, Kyoto (JP); Kenta Sato, Kyoto (JP); Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 358 days.

(21) Appl. No.: 13/333,037

(22) Filed: Dec. 21, 2011

(65) Prior Publication Data

US 2012/0202593 A1  Aug. 9, 2012

(30) Foreign Application Priority Data

Feb. 3, 2011 (JP) ................................. 2011-021574

(51) Int. Cl.
*A63F 13/12* (2006.01)
*A63F 13/40* (2014.01)

(52) U.S. Cl.
CPC ......... *A63F 13/10* (2013.01); *A63F 2300/1031* (2013.01); *A63F 2300/301* (2013.01); *A63F 2300/8088* (2013.01)
USPC ............................................. 463/31; 463/36

(58) Field of Classification Search
CPC . A63F 13/04; A63F 13/06; A63F 2009/2407; A63F 2300/105; A63F 2300/301; A63F 2009/2401; A63F 2300/203; A63F 2300/204; A63F 2300/6661; A63F 2300/6669

USPC ...................... 463/30, 31, 33, 36, 39; 345/158
See application file for complete search history.

(56) References Cited

U.S. PATENT DOCUMENTS

| | | | |
|---|---|---|---|
| 6,478,679 B1 * | 11/2002 | Himoto et al. | 463/36 |
| 6,921,336 B1 * | 7/2005 | Best | 463/32 |
| 2002/0165028 A1 * | 11/2002 | Miyamoto et al. | 463/46 |
| 2007/0254738 A1 * | 11/2007 | Sato | 463/31 |
| 2010/0331082 A1 * | 12/2010 | Kim et al. | 463/30 |

FOREIGN PATENT DOCUMENTS

JP  2006-81753  3/2006

* cited by examiner

*Primary Examiner* — Damon Pierce
*Assistant Examiner* — Allen Chan
(74) *Attorney, Agent, or Firm* — Nixon & Vanderhye PC

(57) ABSTRACT

An example game system includes a plurality of operating devices, a game apparatus, and at least one portable display device. From each of the operating devices, the game apparatus acquires operation data outputted on the basis of an operation on the operating device, and performs a game process on the basis of the operation data. In addition, the game apparatus generates a first game image on the basis of the game process, the first game image being intended for a predetermined first one of the players. The game apparatus also generates a second game image on the basis of the game process, the second game image being intended for another player different from the first player. The first game image is outputted and displayed on the portable display device. The second game image is outputted and displayed on a predetermined display device different from the portable display device.

30 Claims, 22 Drawing Sheets

GAME SYSTEM, GAME APPARATUS, STORAGE MEDIUM HAVING GAME PROGRAM STORED THEREIN, AND GAME PROCESS METHOD

CROSS REFERENCE TO RELATED APPLICATION

The disclosure of Japanese Patent Application No. 2011-21574, filed Feb. 3, 2011, is incorporated herein by reference.

FIELD

This application describes a game system and so on, which are intended for playing a game between a plurality of players at the same time.

BACKGROUND AND SUMMARY

Conventionally, there are game systems in which a plurality of players can play a game at the same time. For example, in a conventional game system, when a plurality of players play a game, the screen of a single display device is divided into the same number of sections as the players, and game images for the players are displayed on their respective divided sections. In this manner, in the case of conventional multiplayer games, the display area of a single display device is divided into sections on which game images for players are respectively displayed.

In the conventional game system, since the display area of a single display device is divided to display a plurality of game images, a game image for a player is displayed on the display device along with another player's game image. Accordingly, each player might have trouble with finding his/her own game image and mistake another game image for his/her own game image. In addition, each player might feel uncomfortable about his/her own game image being displayed next to another game image which is irrelevant to the player (and unnecessary to view). These problems become remarkable as the number of divisions in the display area of the display device increases, and therefore it is preferable that, even when a game is played by a plurality of players, the display area is not divided, or even when the display area is divided, the number of divisions is as low as possible.

Furthermore, in the case of a game to be played against another player, if the display area of a single display device is divided to display a plurality of game images, a game image for one player can be seen by the other player, which reduces the strategic aspect of the game and renders the game less enjoyable.

Therefore, the present specification discloses a game system, and so on, in which the display area of a single display device is divided into as small a number of sections as possible, so that displayed game images can be readily viewed.

(1) An example game system described herein is intended for a plurality of players to play a game. The game system includes a plurality of operating devices, a game apparatus, and at least one portable display device.

The game apparatus includes an operation data acquisition unit, a game process unit, a first image generation unit, a second image generation unit, a first image output unit, and a second image output unit. The operation data acquisition unit acquires operation data from each of the operating devices, the operation data being outputted on the basis of an operation on the operating device. The game process unit performs a game process on the basis of the operation data. The first image generation unit generates a first game image on the basis of the game process, the first game image being intended for a predetermined first one of the players. The second image generation unit generates a second game image on the basis of the game process, the second game image being intended for another player different from the first player. The first image output unit outputs the first game image to the portable display device. The second image output unit outputs the second game image to a predetermined display device different from the portable display device.

The portable display device includes a game image reception unit and a display unit. The game image reception unit receives the first game image. The display unit displays the first game image.

The "game system" includes operating devices, a game apparatus, and a portable display device, and may or may not include a "predetermined display device". That is, the game system may or may not be provided in the form which includes the predetermined display device.

The term "operating device", as a concept, encompasses any operating devices, including a controller 5 in an example embodiment to be described later.

The "game apparatus" may be any information processing apparatus which performs game processes and generates game images based on the game processes. The game apparatus may be an information processing apparatus for game use or a multipurpose information processing apparatus such as a general personal computer.

The "portable display device" may be any device which includes a display unit for displaying game images, as in the case of a terminal device 7 in the example embodiment to be described later. Note that the term "portable" is intended to mean a size that allows the player to hold and move the device or arbitrarily change the position of the device.

As used herein, "another player" is defined as at least a second or more players.

As used herein, "a (first) game image for a (first) player" may be any game image so long as it is suitable for the player to perform a game operation. Conceivable examples of "the game image for the player" include game images in which the position of the point of view and/or the line of sight direction changes/change in accordance with the player's operation, the position of the point of view and/or the line of sight direction is/are set to include the player's operation target, or the position of the point of view is set at or near the position of the player's operation target.

As used herein, "a second game image for another player" is a game image suitable for that other player to perform a game operation. In the case where there is more than one other player, the second game image may be an image including a plurality of game images for their respective players, e.g., the second game image may be an image including a plurality of players' operation targets.

According to the above configuration (1), a game image is displayed on each of the two display devices. Specifically, the portable display device displays a game image for a first player, and the predetermined display device displays a game image for another player. Accordingly, in the case where there are two players, the game images can be displayed without dividing the display area of any display device, and therefore can be provided so as to be readily viewed without each player mistaking another player's game image for his/her own game image or feeling uncomfortable about his/her own game image being displayed in small size. Moreover, even if there are three or more players, it is possible to reduce the number of divisions in the display area compared to the case where only the predetermined display device is used, and therefore, it is possible to reduce the possibility of viewing a wrong image and causing the players to feel uncomfortable about their game images being displayed in small size. In addition, since one of the display devices is portable, it is possible to position the portable display device as necessary such that another player cannot see the game image displayed on the screen of the portable display device. As a result, by positioning the portable display device in such a relationship with another display device that the players cannot see each other's game image, it is rendered possible to enhance the strategic aspect of the game, thereby rendering the game more enjoyable.

Furthermore, according to the above configuration (1), each game image is generated on the game apparatus side, and therefore, the portable display device is simply provided with the function of receiving and displaying game images. For example, in the case where game processes are performed both in the game apparatus and the portable display device, synchronizing these game processes complicates the game processes. On the other hand, according to the above configuration (1), only one of them (the game apparatus) performs game processes, and therefore, the game processes are not synchronized, resulting in simplified game processes.

(2) The game process unit may include a first virtual camera control unit and a second virtual camera control unit. The first virtual camera control unit controls a first virtual camera set in a game space, on the basis of operation data representing an operation on the operating device manipulated by the first player. The second virtual camera control unit controls a second virtual camera set in the game space, on the basis of operation data representing an operation on the operating device manipulated by the other player. In this case, the first image generation unit generates the first game image on the basis of the first virtual camera. The second image generation unit generates the second game image on the basis of the second virtual camera.

According to the above configuration (2), the first player can adjust the point of view and the line of sight direction in the first game image by controlling the first virtual camera, and the other player can adjust the point of view and the line of sight direction in the second game image by controlling the second virtual camera.

(3) Each of the operating devices may include a sensor unit for detecting a physical quantity for calculating an attitude of the operating device. In this case, the operation data includes data acquired from the sensor unit. The game process unit includes an attitude calculation process unit for calculating the attitude of the operating device on the basis of the physical quantity included in the operation data, and performs the game process on the basis of the attitude of the operating device.

As used herein, the "physical quantity for calculating an attitude" may be any arbitrary value on the basis of which the attitude of the operating device can be calculated (estimated). In addition, the "sensor unit" may be any device capable of detecting such a "physical quantity". For example, the "sensor unit" may be an inertial sensor, such as a gyroscope or an acceleration sensor in the example embodiment to be described later, or may be a magnetic sensor or a camera. Note that in the case where the sensor unit is a magnetic sensor, information as to an orientation detected by the magnetic sensor corresponds to the physical quantity. Moreover, in the case where the sensor unit is a camera, numerical values (e.g., pixel values) for a pickup image, or numerical values obtained from the image (e.g., position coordinates of a predetermined imaging target within the pickup image) correspond to the physical quantities.

According to the above configuration (3), game processes are performed in accordance with the attitudes of the operating devices, and therefore, the players can intuitively and readily perform game operations by tilting their operating devices.

(4) Each of the operating devices may include a sensor unit for detecting a physical quantity for calculating a motion of the operating device. The operation data includes data acquired from the sensor unit. The game process unit includes an attitude calculation process unit for calculating the motion of the operating device on the basis of the physical quantity included in the operation data, and performs the game process on the basis of the motion of the operating device.

As used herein, the "physical quantity for calculating a motion" may be any arbitrary value on the basis of which the motion of the operating device can be calculated (estimated). In addition, the "sensor unit" may be any device capable of detecting such a "physical quantity". For example, the "sensor unit" may be an inertial sensor, such as a gyroscope or an acceleration sensor in the example embodiment to be described later, or may be a magnetic sensor or a camera. Note that in the case where the sensor unit is a magnetic sensor, information as to an orientation (or an orientation change) detected by the magnetic sensor corresponds to the physical quantity. Moreover, in the case where the sensor unit is a camera, numerical values (e.g., pixel values) for a pickup image, or numerical values obtained from the image (e.g., position coordinates of a predetermined imaging target within the pickup image) correspond to the physical quantities.

According to the above configuration (4), game processes are performed in accordance with the motions of the operating devices, and therefore, the players can intuitively and readily perform game operations by moving their operating devices.

(5) The game process unit may include a first specification process unit and a second specification process unit. The first specification process unit specifies a position in a display area of the portable display device on the basis of operation data for the operating device manipulated by the first player, and performs a process in accordance with the specified position. The second specification process unit specifies a position in a display area of the predetermined display device on the basis of operation data for the operating device manipulated by the other player, and performs a process in accordance with the specified position.

According to the above configuration (5), game processes are performed in accordance with positions on the screens of the display devices, specified by the operating devices, and therefore, the players can intuitively and readily perform game operations by specifying positions on the screens of the display devices. Note that as the number of divisions in the display area (screen) of the display device increases, it becomes difficult to perform the operation of specifying a position on the screen. On the other hand, according to the configurations as mentioned in (1) to (10), the number of divisions can be reduced, which facilitates the operation of specifying a position on the screen, rendering the operation more user-friendly.

(6) The game system may further include a light-emitting device arrangeable close to the predetermined display device. In addition, the portable display device further includes a light-emitting unit. Each of the operating devices further includes an image pickup unit capable of picking up light from both the light-emitting device and the light-emitting unit. The operation data includes imaging data for an image picked up by the image pickup unit. The game process unit uses the imaging data to perform a game process based on a position of a predetermined imaging target within the pickup image.

The "imaging data" may be image data for an image picked up by the image pickup unit, or may be data representing information obtained from the pickup image (e.g., information indicating the position of a predetermined imaging target within the pickup image, such as marker coordinates in the example embodiment to be described later).

For example, the "game process based on a position of a predetermined imaging target within the pickup image" may be a process for calculating an attitude as mentioned in (3) above on the basis of the position of the predetermined imaging target or may be a process for calculating a position on the screen as mentioned in (5) above on the basis of the position of the predetermined imaging target.

According to the above configuration (6), game processes are performed on the basis of positions of imaging targets within pickup images. Accordingly, game operations based on positions, attitudes, and motions of the operating devices can be performed, making it possible to intuitively and readily perform game operations. In addition, the imaging data allows the positional relationship between the operating device and the imaging target to be calculated with accuracy, making it possible to render game operations user-friendly.

(7) The number of operating devices included in the game system may be at least three. In this case, the second image generation unit generates as the second game image a game image including an image for a second player different from the first player and an image for a third player different from the first player.

According to the above configuration (7), even if the number of players is three or more, a game image can be provided to each player.

(8) The predetermined display device may have a horizontally long display area. In this case, the second image generation unit generates as the second game image an image having vertically long game images arranged side by side, respectively for the second and third players.

According to the above configuration (8), a vertically long game image can be provided by displaying a plurality of game images side by side on the screen of the predetermined display device. In addition, the portable display device can be positioned vertically, and therefore, by so positioning the portable display device, a vertically long game image can be provided. Therefore, according to the above configuration (8), every game image is vertically long, so that a vertically long game image can be provided to each of three or more players. Thus, it is possible to equalize the ratio of width to height among game images, and render the game images readily viewable without causing much unfair advantage/disadvantage among players.

Furthermore, the display areas of general display devices are horizontally long, and therefore, in the case where a vertically long game image is displayed on such a display device, an essentially dispensable image is added next to the vertically long game image, which might cause the player to feel the display to be unnatural. On the other hand, according to the above configuration (8), a plurality of vertically long game images are displayed on the screen of the predetermined display device, and therefore, no dispensable image is additionally displayed on the predetermined display device. Thus, it is possible to provide game images that can be readily viewed without causing the player to feel the display to be artificial or unnatural.

(9) The operation data acquisition unit may be capable of acquiring operation data from anywhere from one to a predetermined number of operating devices. In this case, the game process unit includes a determination unit for determining whether or not the number of players of the game meets a predetermined condition. The first image generation unit generates a first game image for the first player when the number of players meets the predetermined condition. The second image generation unit generates a game image for the other player as the second game image when the number of players meets the predetermined condition, or a game image for each player of the game as the second game image when the number of players does not meet the predetermined condition.

According to the above configuration (9), when the number of players meets a predetermined condition, a first game image for a first player is displayed on the portable display device, and a second game image for another player is displayed on the predetermined display device. In addition, when the number of players does not meet the predetermined condition, a second game image for players (including the first player and another player) is displayed on the predetermined display device. That is, according to the above configuration (9), whether game images are displayed on two display devices or on a predetermined display device is determined in accordance with the number of players. Thus, according to the above configuration (9), it is possible to provide game images in a suitable display format in accordance with the number of players.

(10) The first image generation unit may generate a first game image for the first player when the game process meets a predetermined game condition. In this case, the second image generation unit generates a game image for the other player as the second game image when the game process meets the predetermined game condition, or a game image for the plurality of players as the second game image when the game process does not meet the predetermined game condition.

The "game condition" may be any condition related to the game, and examples thereof include conditions related to the positions and the states of player objects (more specifically, the conditions are such that, for example, a player object lies within a predetermined range in a game field, or a player object acquires a predetermined item) and conditions related to the progression of the game (more specifically, for example, advancement to a predetermined stage of the game).

According to the above configuration (10), when the game condition is met, a first game image for a first player is displayed on the portable display device, and a second game image for another player is displayed on the predetermined display device. In addition, when the game condition is not met, a second game image for players (including the first player and another player) is displayed on the predetermined display device. That is, according to the above configuration (10), whether game images are displayed on two display devices or on a predetermined display device is determined in accordance with the situation of the game. Thus, according to the above configuration (10), it is possible to provide game images in a suitable display format in accordance with the situation of the game. As a result, for example, in any scene where two player objects act together, the two player objects can be displayed on one display device, and in any scene where two player objects act individually, the player objects can be separately displayed on two display devices. Thus, it is possible to enhance the real feel of the game, thereby rendering the game highly enjoyable.

Note that disclosed herein are example game apparatuses as included in the game systems described in (1) to (10) above. Also disclosed herein are example non-transitory computer-readable game programs for causing computers of the game apparatuses to function as means equivalent to the features of the game apparatuses as described above (which may exclude the image output unit). Further disclosed herein are example game process methods as performed in the game systems or apparatuses as described in (1) to (10) above.

In the game systems, the game apparatuses, the storage media each having a game program stored therein, and the game process methods as mentioned above, a plurality of game images for a plurality of players are displayed on two display devices, which makes it possible to reduce the number of divisions in the display area of any display device, thereby displaying game images that can be readily viewed by the players.

These and other objects, features, aspects and advantages will become more apparent from the following detailed description when taken in conjunction with the accompanying drawings.

DETAILED DESCRIPTION OF NON-LIMITING EXAMPLE EMBODIMENTS

1. Overall Configuration of the Game System

Figure 1:
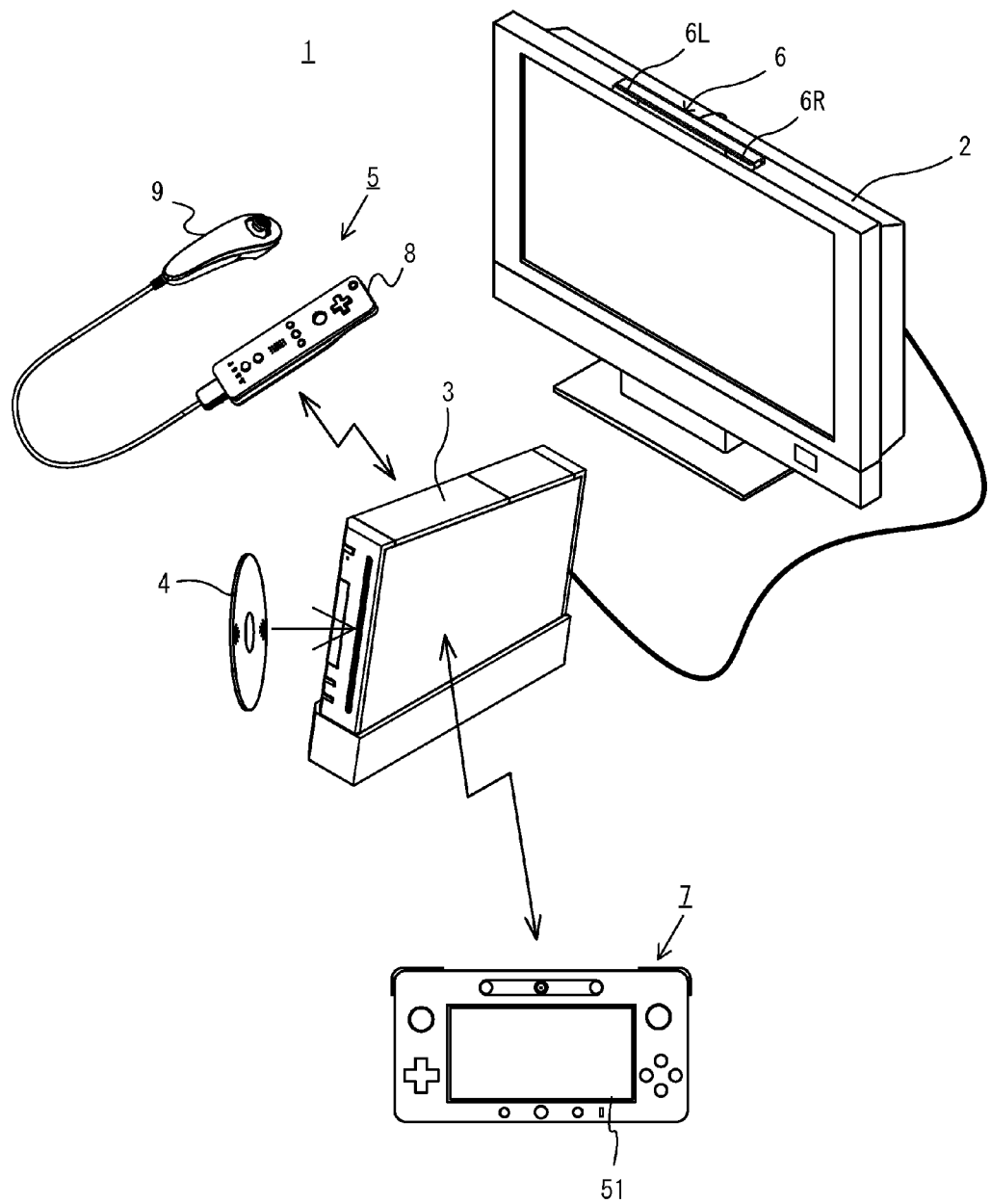
FIG. 1 is an external view of an example non-limiting game system 1.

An example game system 1 according to an example embodiment will now be described with reference to the drawings. FIG. 1 is an external view of the game system 1. In FIG. 1, the game system 1 includes a stationary display device (hereinafter referred to as a "television") 2 such as a television receiver, a stationary game apparatus 3, an optical disc 4, a controller 5, a marker device 6, and a terminal device 7. In the game system 1, the game apparatus 3 performs game processes based on game operations performed using the controller 5, and game images acquired through the game processes are displayed on the television 2 and/or the terminal device 7.

In the game apparatus 3, the optical disc 4 typifying an information storage medium used for the game apparatus 3 in a replaceable manner is removably inserted. An information processing program (a game program, for example) to be executed by the game apparatus 3 is stored in the optical disc 4. The game apparatus 3 has, on the front surface thereof, an insertion opening for the optical disc 4. The game apparatus 3 reads and executes the information processing program stored on the optical disc 4 which is inserted into the insertion opening, to perform the game process.

The television 2 is connected to the game apparatus 3 by a connecting cord. Game images acquired as a result of the game processes performed by the game apparatus 3 are displayed on the television 2. The television 2 includes a speaker 2a (see FIG. 2), and the speaker 2a outputs game sounds acquired as a result of the game process. In alternative example embodiments, the game apparatus 3 and the stationary display device may be an integral unit. Also, the communication between the game apparatus 3 and the television 2 may be wireless communication.

The marker device 6 is provided along the periphery of the screen (on the upper side of the screen in FIG. 1) of the television 2. The user (player) can perform game operations by moving the controller 5, the details of which will be described later, and the marker device 6 is used by the game apparatus 3 for calculating the movement, position, attitude, etc., of the controller 5. The marker device 6 includes two markers 6R and 6L on opposite ends thereof. Specifically, the marker 6R (as well as the marker 6L) includes one or more infrared LEDs (Light Emitting Diodes), and emits an infrared light in a forward direction from the television 2. The marker device 6 is connected to the game apparatus 3, and the game apparatus 3 is able to control the lighting of each infrared LED of the marker device 6. Note that the marker device 6 is of a transportable type so that the user can install the marker device 6 in any desired position. While FIG. 1 shows an example embodiment in which the marker device 6 is arranged on top of the television 2, the position and the direction of arranging the marker device 6 are not limited to this particular arrangement.

The controller 5 provides the game apparatus 3 with operation data representing the content of operations performed on the controller itself. In the present example embodiment, the controller 5 includes a main controller 8 and a sub-controller 9, and the sub-controller 9 is detachably attached to the main controller 8. The controller 5 and the game apparatus 3 can wirelessly communicate with each other. In the present example embodiment, the wireless communication between the controller 5 and the game apparatus 3 uses, for example, Bluetooth (Registered Trademark) technology. In other example embodiments, the controller 5 and the game apparatus 3 may be connected by a wired connection. Furthermore, in FIG. 1, the game system 1 includes only one controller 5, but in the present example embodiment, the game system 1 includes a plurality of controllers 5. The game apparatus 3 is capable of communicating with a plurality of controllers, so that by using a predetermined number of controllers at the same time, a plurality of people can play the game. The configuration of the controller 5 will be described in detail later.

The terminal device 7 is of a size that can be held by the user, so that the user can hold and move the terminal device 7 or can place the terminal device 7 in any desired position. As will be described in detail later, the terminal device 7 includes a liquid crystal display (LCD) 51, and input means (e.g., a touch panel 52 and a gyroscope 64 to be described later). The terminal device 7 can communicate with the game apparatus 3 wirelessly (or wired). The terminal device 7 receives data for images generated by the game apparatus 3 (e.g., game images) from the game apparatus 3, and displays the images on the LCD 51. Note that in the present example embodiment, the LCD is used as the display of the terminal device 7, but the terminal device 7 may include any other display device, e.g., a display device utilizing electro luminescence (EL). Furthermore, the terminal device 7 transmits operation data representing the content of operations performed thereon to the game apparatus 3.

2. Internal Configuration of the Game Apparatus 3

Figure 2:
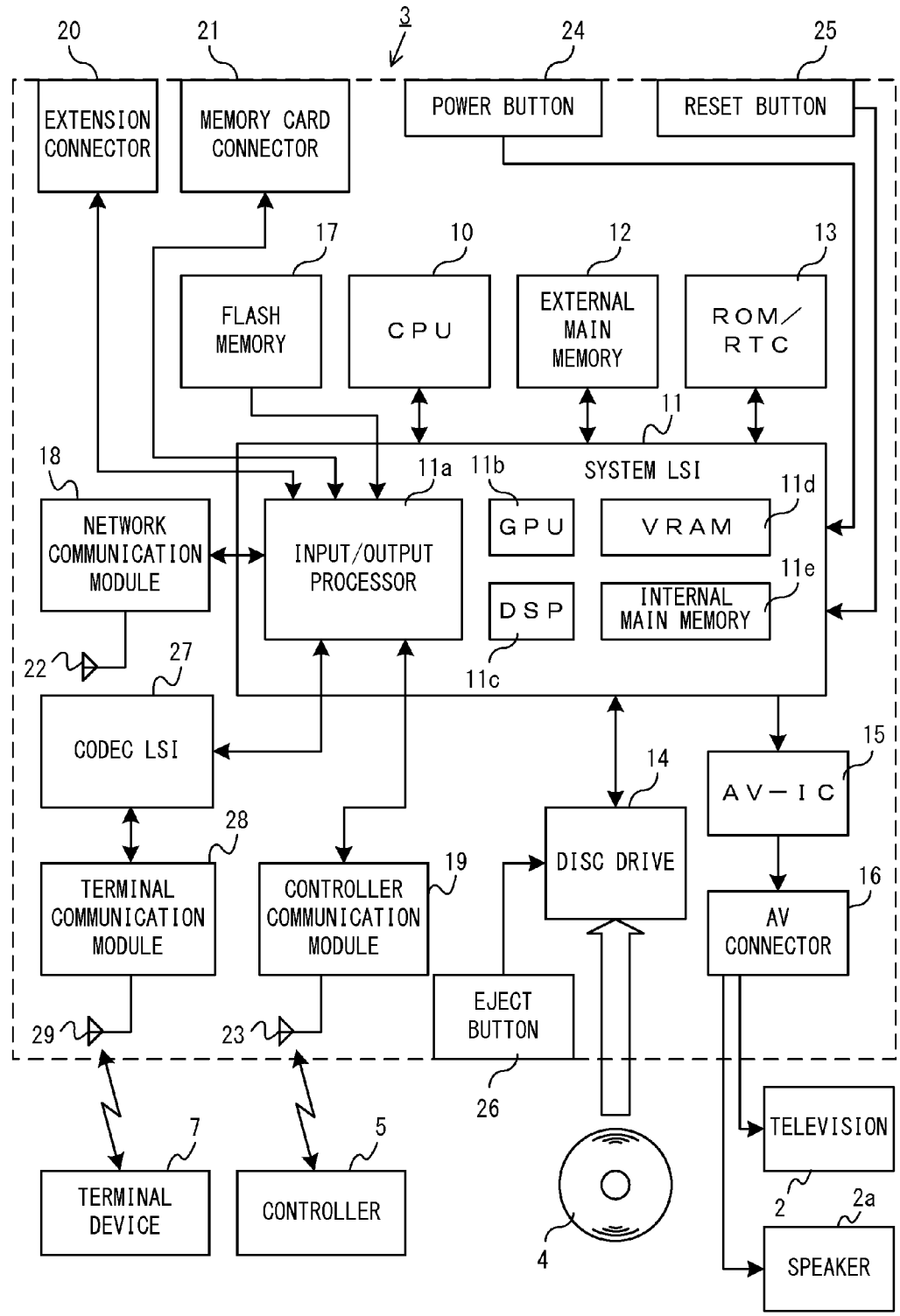
FIG. 2 is a block diagram illustrating an internal configuration of an example non-limiting game apparatus 3.

An internal configuration of the game apparatus 3 will be described with reference to FIG. 2. FIG. 2 is a block diagram illustrating an internal configuration of the game apparatus 3. The game apparatus 3 includes a CPU (Central Processing Unit) 10, a system LSI 11, external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device(s), and the like. The internal configuration of the system LSI 11 will be described below. The external main memory 12 is of a volatile type and stores a program such as a game program read from the optical disc 4, a game program read from flash memory 17, and various data. The external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disc drive 14 reads program data, texture data, and the like from the optical disc 4, and writes the read data into internal main memory 11e (to be described below) or the external main memory 12.

The system LSI 11 includes an input/output processor (I/O processor) 11a, a GPU (Graphics Processor Unit) 11b, a DSP (Digital Signal Processor) 11c, VRAM (Video RAM) 11d, and the internal main memory 11e. Although not shown in the figures, these components 11a to 11e are connected with each other through an internal bus.

The GPU 11b, acting as a part of a rendering mechanism, generates images in accordance with graphics commands (rendering commands) from the CPU 10. The VRAM 11d stores data (data such as polygon data and texture data) to be used by the GPU 11b to execute the graphics commands. When images are generated, the GPU 11b generates image data using data stored in the VRAM 11d. Note that in the present example embodiment, the game apparatus 3 generates both game images to be displayed on the television 2 and game images to be displayed on the terminal device 7. Hereinafter, the game images to be displayed on the television 2 are referred to as the "television game images" and the game images to be displayed on the terminal device 7 are referred to as the "terminal game images".

The DSP 11c, functioning as an audio processor, generates sound data using sound data and sound waveform (e.g., tone quality) data stored in one or both of the internal main memory 11e and the external main memory 12. Note that in the present example embodiment, game sounds to be generated are classified into two types as in the case of the game images, one being outputted by the speaker of the television 2, the other being outputted by speakers of the terminal device 7. Hereinafter, in some cases, the game sounds to be outputted by the television 2 are referred to as "television game sounds", and the game sounds to be outputted by the terminal device 7 are referred to as "terminal game sounds".

Among the images and sounds generated by the game apparatus 3 as described above, both image data and sound data to be outputted by the television 2 are read out by the AV-IC 15. The AV-IC 15 outputs the read-out image data to the television 2 via an AV connector 16, and outputs the read-out sound data to the speaker 2a provided in the television 2. Thus, images are displayed on the television 2, and sounds are outputted by the speaker 2a.

Furthermore, among the images and sounds generated by the game apparatus 3, both image data and sound data to be outputted by the terminal device 7 are transmitted to the terminal device 7 by the input/output processor 11a, etc. The data transmission to the terminal device 7 by the input/output processor 11a, etc., will be described later.

The input/output processor 11a exchanges data with components connected thereto, and downloads data from an external device(s). The input/output processor 11a is connected to the flash memory 17, a network communication module 18, a controller communication module 19, an expansion connector 20, a memory card connector 21, and a codec LSI 27. Furthermore, an antenna 22 is connected to the network communication module 18. An antenna 23 is connected to the controller communication module 19. The codec LSI 27 is connected to a terminal communication module 28, and an antenna 29 is connected to the terminal communication module 28.

The game apparatus 3 is capable of connecting to a network such as the Internet to communicate with external information processing apparatuses (e.g., other game apparatuses and various servers). Specifically, the input/output processor 11a can be connected to a network such as the Internet via the network communication module 18 and the antenna 22 to communicate with external information processing apparatuses connected to the network. The input/output processor 11a regularly accesses the flash memory 17, and detects the presence or absence of any data to be transmitted to the network, and when detected, transmits the data to the network via the network communication module 18 and the antenna 22. Further, the input/output processor 11a receives data transmitted from the external information processing apparatuses and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game apparatus 3 in addition to data exchanged between the game apparatus 3 and the external information processing apparatuses. Moreover, the flash memory 17 may have a game program stored therein.

Furthermore, the game apparatus 3 is capable of receiving operation data from the controller 5. Specifically, the input/output processor 11a receives operation data transmitted from the controller 5 via the antenna 23 and the controller communication module 19, and stores it (temporarily) in a buffer area of the internal main memory 11e or the external main memory 12.

Furthermore, the game apparatus 3 is capable of exchanging data, for images, sound, etc., with the terminal device 7. When transmitting game images (terminal game images) to the terminal device 7, the input/output processor 11a outputs game image data generated by the GPU 11b to the codec LSI 27. The codec LSI 27 performs a predetermined compression process on the image data from the input/output processor 11a. The terminal communication module 28 wirelessly communicates with the terminal device 7. Accordingly, the image data compressed by the codec LSI 27 is transmitted by the terminal communication module 28 to the terminal device 7 via the antenna 29. In the present example embodiment, the image data transmitted from the game apparatus 3 to the terminal device 7 is image data used in a game, and the playability of a game can be adversely influenced if there is a delay in the images displayed in the game. Therefore, the game system may avoid delay in transmitting image data from the game apparatus 3 to the terminal device 7. Therefore, in the present example embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use other communication schemes.

Furthermore, in addition to the image data, the game apparatus 3 also transmits sound data to the terminal device 7. Specifically, the input/output processor 11a outputs sound data generated by the DSP 11c to the terminal communication module 28 via the codec LSI 27. The codec LSI 27 performs a compression process on the sound data as it does on the image data. Any method can be employed for compressing the sound data, and, for example, such a method uses a high compression rate but causes less sound degradation. Also, in another example embodiment, the sound data may be transmitted without compression. The terminal communication module 28 transmits compressed image and sound data to the terminal device 7 via the antenna 29.

Furthermore, in addition to the image and sound data, the game apparatus 3 transmits various control data to the terminal device 7 where appropriate. The control data is data representing an instruction to control a component included in the terminal device 7, e.g., an instruction to control lighting of a marker section (a marker section 55 shown in FIG. 10) or an instruction to control shooting by a camera (a camera 56 shown in FIG. 10). The input/output processor 11a transmits the control data to the terminal device 7 in accordance with an instruction from the CPU 10. Note that in the present example embodiment, the codec LSI 27 does not perform a compression process on the control data, but in another example embodiment, a compression process may be performed. Note that the data to be transmitted from the game apparatus 3 to the terminal device 7 may or may not be coded depending on the situation.

Furthermore, the game apparatus 3 is capable of receiving various data from the terminal device 7. As will be described in detail later, in the present example embodiment, the terminal device 7 transmits operation data, image data, and sound data. The data transmitted by the terminal device 7 is received by the terminal communication module 28 via the antenna 29. Here, the image data and the sound data from the terminal device 7 have been subjected to the same compression process as performed on the image data and the sound data from the game apparatus 3 to the terminal device 7. Accordingly, the image data and the sound data are transferred from the terminal communication module 28 to the codec LSI 27, and subjected to a decompression process by the codec LSI 27 before output to the input/output processor 11a. On the other hand, the operation data from the terminal device 7 is smaller in size than the image data or the sound data and therefore is not always subjected to a compression process. Moreover, the operation data may or may not be coded depending on the situation. Accordingly, after being received by the terminal communication module 28, the operation data is outputted to the input/output processor 11a via the codec LSI 27. The input/output processor 11a stores the data received from the terminal device 7 (temporarily) in a buffer area of the internal main memory 11e or the external main memory 12.

Furthermore, the game apparatus 3 can be connected to other devices or external storage media. Specifically, the input/output processor 11a is connected to the expansion connector 20 and the memory card connector 21. The expansion connector 20 is a connector for an interface, such as a USB or SCSI interface. The expansion connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the expansion connector 20 or the memory card connector 21 to store data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied from an external power source to the components of the game apparatus 3 via an AC adaptor (not shown). When the reset button 25 is pressed, the system LSI 11 reboots a boot program of the game apparatus 3. The eject button 26 is connected to the disc drive 14. When the eject button 26 is pressed, the optical disc 4 is ejected from the disc drive 14.

In other example embodiments, some of the components of the game apparatus 3 may be provided as extension devices separate from the game apparatus 3. In this case, an extension device may be connected to the game apparatus 3 via the expansion connector 20, for example. Specifically, an extension device may include components as described above, e.g., a codec LSI 27, a terminal communication module 28, and an antenna 29, and can be attached to/detached from the expansion connector 20. Thus, by connecting the extension device to a game apparatus which does not include the above components, the game apparatus can communicate with the terminal device 7.

3. Configuration of the Controller 5

Figure 3:
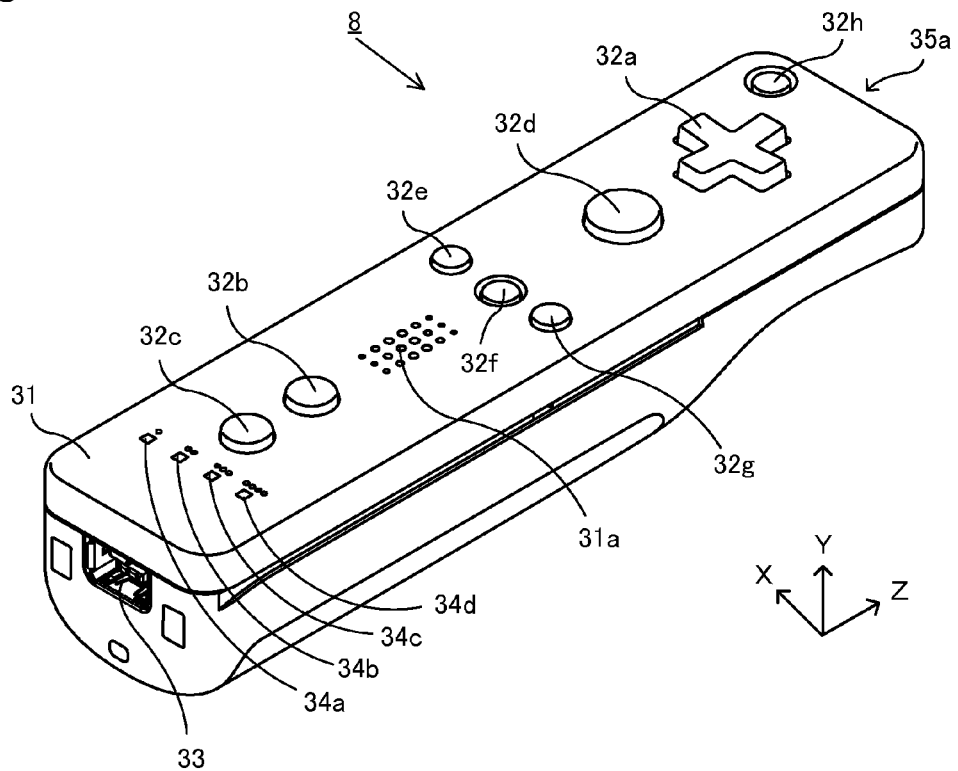
FIG. 3 is a perspective view illustrating an external configuration of an example non-limiting main controller 8.
Figure 4:
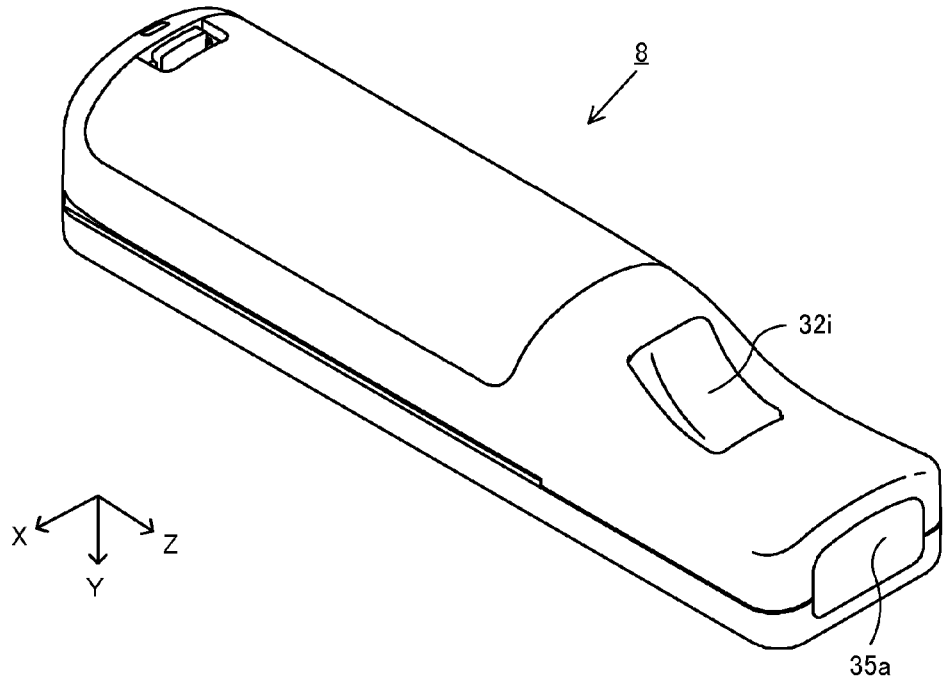
FIG. 4 is another perspective view illustrating an external configuration of the main controller 8.

Next, with reference to FIGS. 3 to 7, the controller 5 will be described. As described above, the controller 5 includes the main controller 8 and the sub-controller 9. FIG. 3 is a perspective view illustrating an external configuration of the main controller 8. FIG. 4 is a perspective view illustrating an external configuration of the main controller 8. The perspective view of FIG. 3 shows the main controller 8 as viewed from the top rear side thereof, and the perspective view of FIG. 4 shows the main controller 8 as viewed from the bottom front side thereof.

As shown in FIG. 3 and FIG. 4, the main controller 8 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. The user can perform game operations by pressing buttons provided on the main controller 8, and moving the main controller 8 to change the position and the attitude (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present example embodiment, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are appropriately assigned their respective functions in accordance with the information processing program executed by the game apparatus 3. Further, the power button 32h is intended to remotely turn ON/OFF the game apparatus 3. The home button 32f and the power button 32h each have the top surface thereof recessed below the top surface of the housing 31. Therefore, the home button 32f and the power button 32h are prevented from being inadvertently pressed by the user.

On the rear surface of the housing 31, the connector 33 is provided. The connector 33 is used for connecting the main controller 8 to another device (e.g., the sub-controller 9 or another sensor unit). Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 (the main controller 8) is assigned a controller type (number) so as to be distinguishable from another controller. The LEDs 34a, 34b, 34c, and 34d are each used for informing the user of the controller type which is currently being set for the controller 5 being used, and for informing the user of remaining battery power of the controller 5, for example. Specifically, when a game operation is performed using the controller 5, one of the LEDs 34a, 34b, 34c, and 34d corresponding to the controller type is lit up.

The main controller 8 has an imaging information calculation section 35 (FIG. 6), and a light incident surface 35a through which a light is incident on the imaging information calculation section 35 is provided on the front surface of the housing 31, as shown in FIG. 4. The light incident surface 35a is made of a material transmitting therethrough at least infrared light outputted by the markers 6R and 6L.

On the top surface of the housing 31, sound holes 31a for externally outputting a sound from a speaker 47 (shown in FIG. 5) incorporated in the main controller 8 is provided between the first button 32b and the home button 32f.

Figure 5:
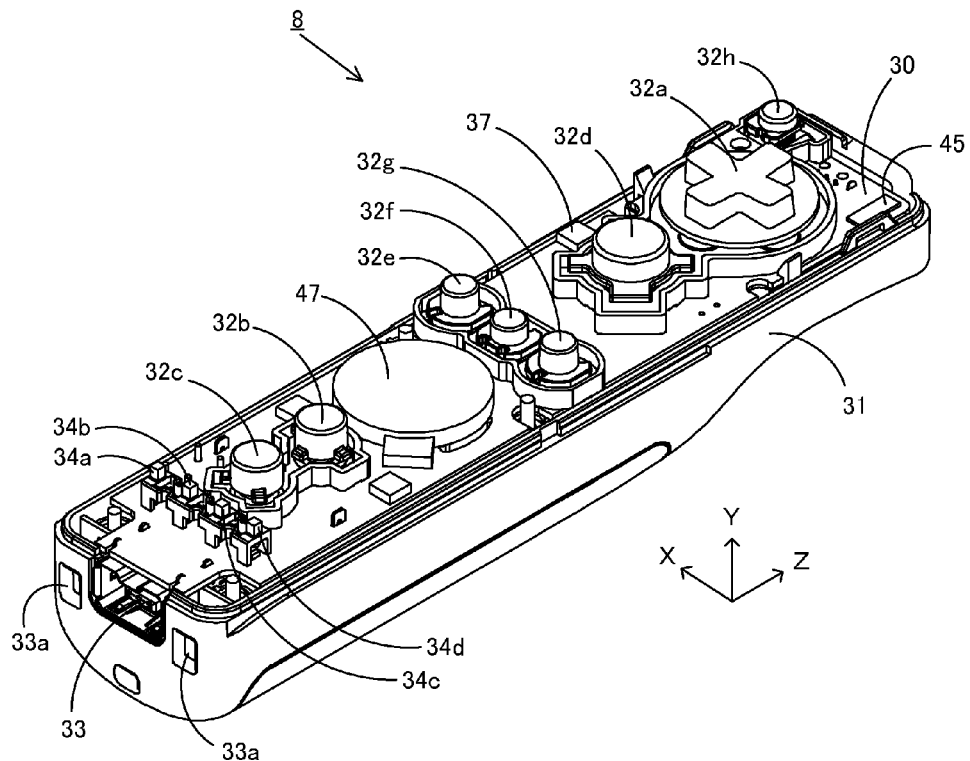
FIG. 5 is a diagram illustrating an internal configuration of the main controller 8.
Figure 6:
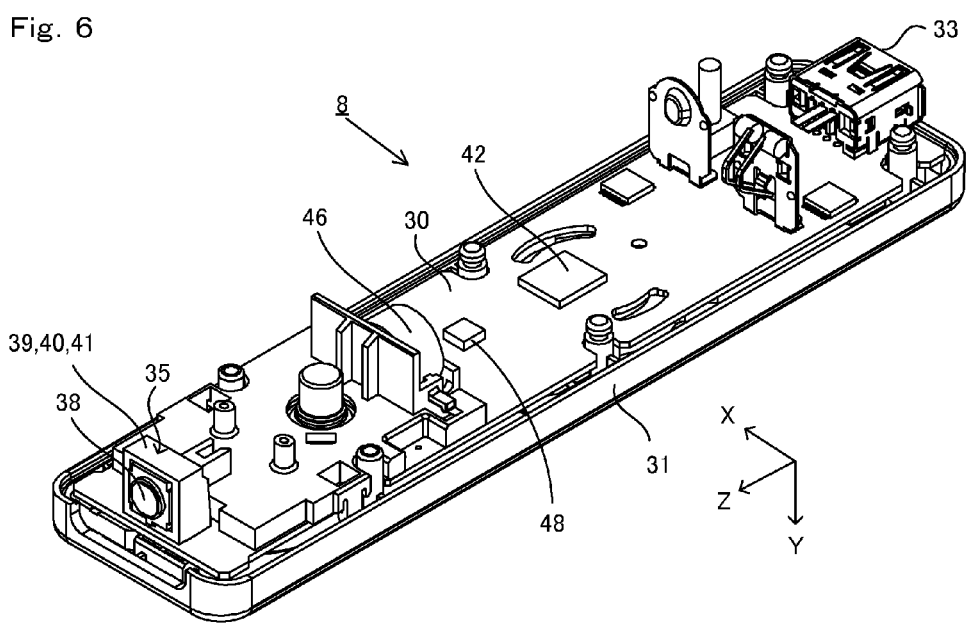
FIG. 6 is another diagram illustrating an internal configuration of the main controller 8.

Next, with reference to FIGS. 5 and 6, an internal configuration of the main controller 8 will be described. FIGS. 5 and 6 are diagrams illustrating the internal configuration of the main controller 8. FIG. 5 is a perspective view illustrating a state where an upper casing (a part of the housing 31) of the main controller 8 is removed. FIG. 6 is a perspective view illustrating a state where a lower casing (a part of the housing 31) of the main controller 8 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 47, and the like are provided. These elements are connected to a microcomputer 42 (see FIG. 6) via lines (not shown) formed on the substrate 30 and the like. In the present example embodiment, the acceleration sensor 37 is provided on a position offset from the center of the main controller 8 with respect to the X-axis direction. Thus, calculation of the movement of the main controller 8 being rotated about the Z-axis may be facilitated. Further, the acceleration sensor 37 is provided anterior to the center of the main controller 8 with respect to the longitudinal direction (Z-axis direction). Further, a wireless module 44 (see FIG. 6) and the antenna 45 allow the controller 5 (the main controller 8) to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, an image pickup element 40 and an image processing circuit 41 located in order, respectively, from the front of the main controller 8. These components 38 to 41 are attached on the bottom main surface of the substrate 30.

On the bottom main surface of the substrate 30, the microcomputer 42 and a vibrator 46 are provided. The vibrator 46 is, for example, a vibration motor or a solenoid, and is connected to the microcomputer 42 via lines formed on the substrate 30 or the like. The main controller 8 is vibrated by actuation of the vibrator 46 based on a command from the microcomputer 42. Therefore, the vibration is conveyed to the user's hand holding the main controller 8, and thus a so-called vibration-feedback game is realized. In the present example embodiment, the vibrator 46 is disposed slightly toward the front of the housing 31. That is, the vibrator 46 is positioned offset from the center toward the end of the main controller 8, and therefore the vibration of the vibrator 46 can lead to enhancement of the vibration of the entire main controller 8. Further, the connector 33 is provided at the rear edge of the bottom main surface of the substrate 30. In addition to the components shown in FIGS. 5 and 6, the main controller 8 includes a quartz oscillator for generating a reference clock of the microcomputer 42, an amplifier for outputting a sound signal to the speaker 47, and the like.

Figure 7:
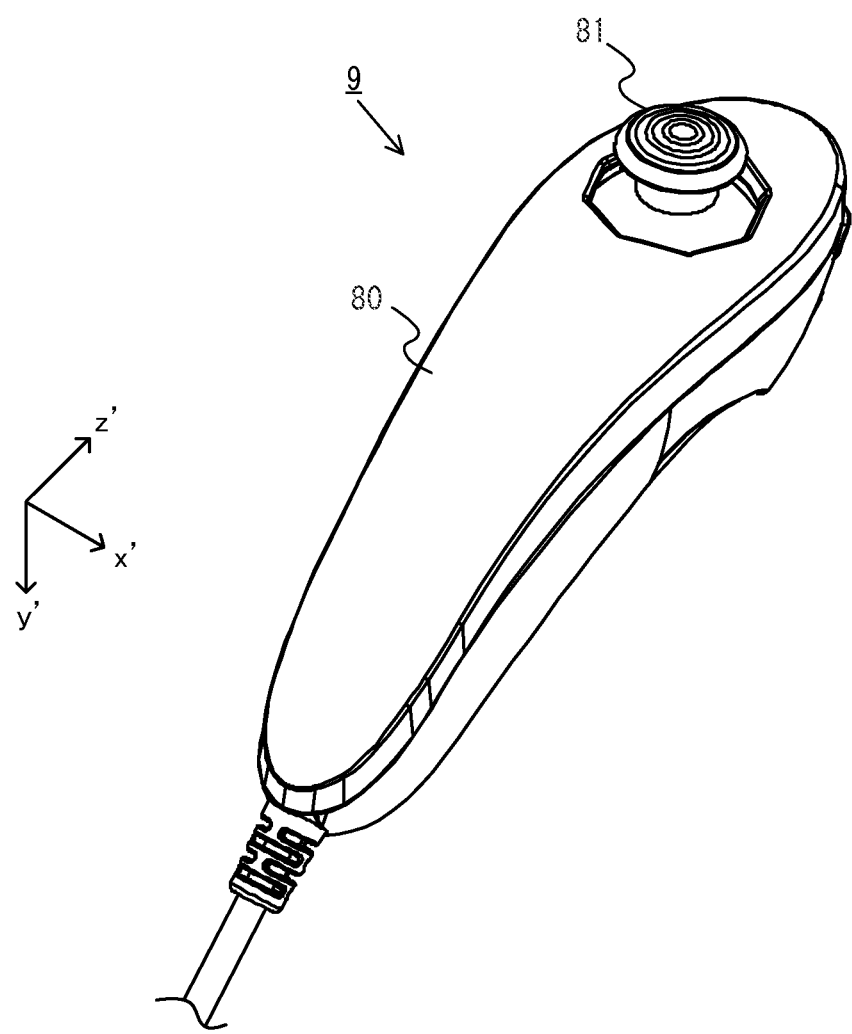
FIG. 7 is a perspective view illustrating an external configuration of an example non-limiting sub-controller 9.

FIG. 7 is a perspective view illustrating an external configuration of the sub-controller 9. The sub-controller 9 includes a housing 80 formed by, for example, plastic molding. As with the main controller 8, the housing 80 is sized as a whole to be held by a hand of an adult or a child. In the case of using the sub-controller 9 also, the player can perform game operations by operating buttons and sticks and changing the position and the direction of the sub-controller.

As shown in FIG. 7, the housing 80 has an analog joystick 81 provided at the tip side (the z'-axis positive direction side) on the upper surface (the surface on the y'-axis negative direction side). Although not shown, the tip of the housing 80 has a surface slightly inclined backward, and a C button and a Z button are provided at the tip surface so as to be arranged vertically (the y-axis direction shown in FIG. 3). The analog joystick 81 and these buttons (the C button and the Z button) are appropriately assigned their functions in accordance with game programs to be executed by the game apparatus 3. Note that in some cases, the analog joystick 81 and these buttons may be collectively referred to as an "operating section 82 (see FIG. 8)".

Although not shown in FIG. 7, the sub-controller 9 also includes an acceleration sensor (acceleration sensor 83 shown in FIG. 8) inside the housing 80. In the present example embodiment, the acceleration sensor 83 is of the same type as the acceleration sensor 37 of the main controller 8. However, the acceleration sensor 83 may be of a different type from the acceleration sensor 37 and may detect acceleration about, for example, a predetermined one axis or two axes.

Furthermore, as shown in FIG. 7, the housing 80 is connected at the rear to one end of a cable. Although not shown in FIG. 7, the other end of the cable is attached to a connector (connector 84 shown in FIG. 8). The connector can be attached to the connector 33 of the main controller 8. That is, by attaching the connector 33 to the connector 84, the main controller 8 is attached to the sub-controller 9.

Note that FIGS. 3 to 7 only show examples of the shapes of the main controller 8 and the sub-controller 9, the shape of each operation button, the number and the positions of acceleration sensors and vibrators, and so on, and other shapes, numbers, and positions may be employed. Further, although in the present example embodiment, the imaging direction of the image pickup means of the main controller 8 is the Z-axis positive direction, the imaging direction may be any direction. That is, the imagining information calculation section 35 (the light incident surface 35a through which a light is incident on the imaging information calculation section 35) of the controller 5 may not necessarily be provided on the front surface of the housing 31, but may be provided on any other surface on which a light can be received from the outside of the housing 31.

Figure 8:
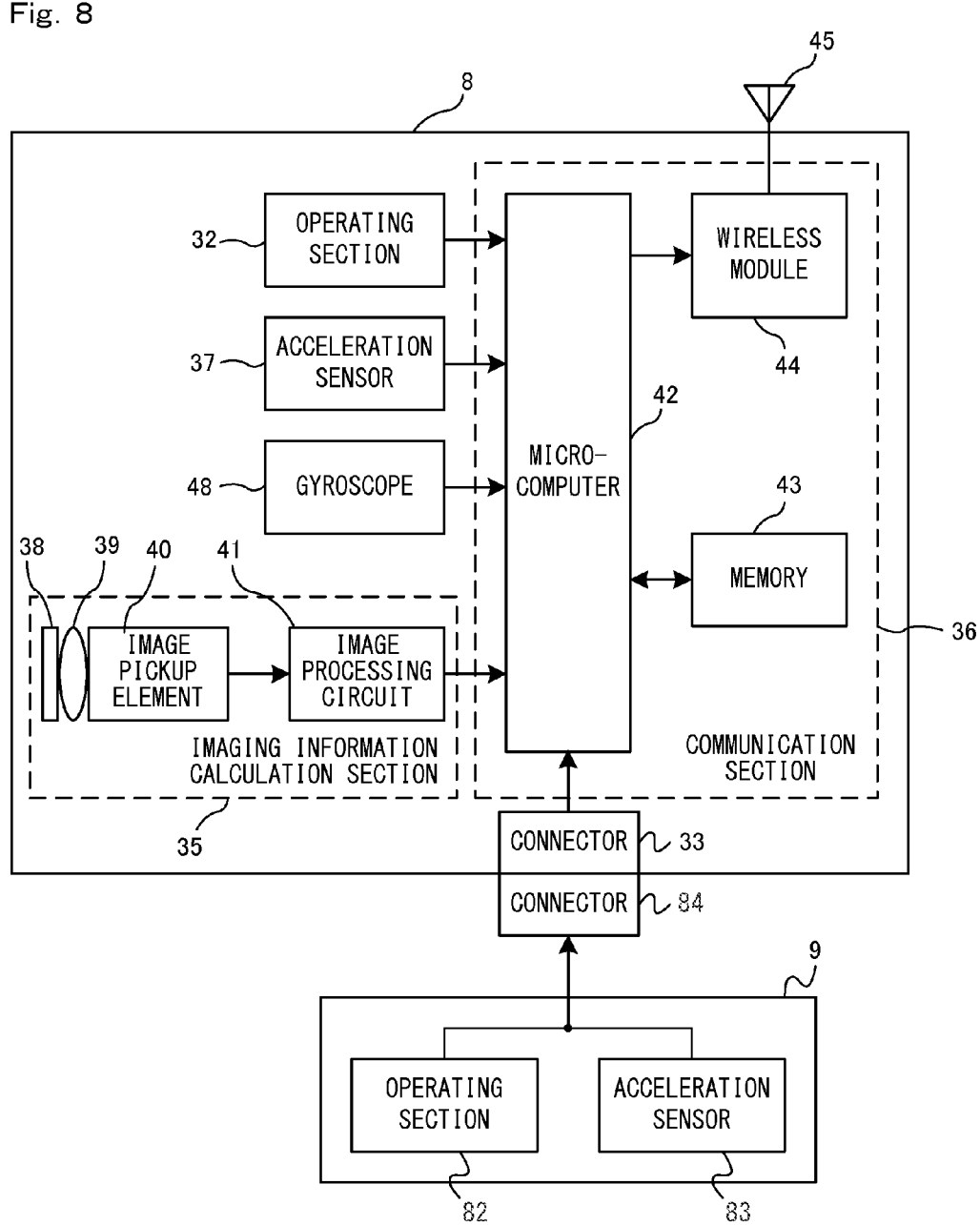
FIG. 8 is a block diagram illustrating a configuration of an example non-limiting controller 5.

FIG. 8 is a block diagram illustrating a configuration of the controller 5. As shown in FIG. 8, the main controller 8 includes an operating section 32 (the operation buttons 32a to 32i), the imaging information calculation section 35, a communication section 36, the acceleration sensor 37, and a gyroscope 48. The sub-controller 9 includes an operating section 82 and an acceleration sensor 83. The controller 5 transmits, as operation data, data representing the content of an operation performed on the controller 5 itself, to the game apparatus 3. Note that hereinafter, in some cases, operation data transmitted by the controller 5 is referred to as "controller operation data", and operation data transmitted by the terminal device 7 is referred to as "terminal operation data".

The operating section 32 includes the operation buttons 32a to 32i described above, and outputs, to the microcomputer 42 of the communication section 36, operation button data indicating an input state (that is, whether or not each operation button 32a to 32i is pressed) of each operation button 32a to 32i.

The imaging information calculation section 35 is a system for analyzing image data taken by the image pickup means and calculating, for example, the centroid and the size of an area having a high brightness in the image data. The imaging information calculation section 35 has a maximum sampling period of, for example, about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image pickup element 40. The image pickup element 40 is a solid-state imaging device such as, for example, a CMOS sensor or a CCD sensor, which receives the infrared light collected by the lens 39, and outputs an image signal. The marker section 55 of the terminal device 7 and the marker device 6, which are subjects to be imaged, include markers for outputting infrared light. Therefore, the infrared filter 38 enables the image pickup element 40 to receive only the infrared light transmitted through the infrared filter 38 and generate image data, so that an image of each subject to be imaged (the marker section 55 and/or the marker device 6) can be taken with enhanced accuracy. Hereinafter, the image taken by the image pickup element 40 is referred to as a pickup image. The image data generated by the image pickup element 40 is processed by the image processing circuit 41. The image processing circuit 41 calculates, in the pickup image, the positions of subjects to be imaged. The image processing circuit 41 outputs data representing coordinate points of the calculated positions, to the microcomputer 42 of the communication section 36. The data representing the coordinate points is transmitted as operation data to the game apparatus 3 by the microcomputer 42. Hereinafter, the coordinate points are referred to as "marker coordinate points". The marker coordinate point changes depending on the attitude (angle of tilt) and/or the position of the controller 5 itself, and therefore the game apparatus 3 is allowed to calculate the attitude and the position of the controller 5 using the marker coordinate point.

In another example embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection section of the acceleration sensor 37 in the straight line direction along the sensing axis direction, among all accelerations applied to a detection section of the acceleration sensor 37. For example, a multiaxial acceleration sensor having two or more axes detects an acceleration of a component for each axis, as the acceleration applied to the detection section of the acceleration sensor. The acceleration sensor 37 is, for example, a capacitive MEMS (Micro-Electro Mechanical System) acceleration sensor. However, another type of acceleration sensor may be used.

In the present example embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the controller 5.

Data (acceleration data) representing the acceleration detected by the acceleration sensor 37 is outputted to the communication section 36. The acceleration detected by the acceleration sensor 37 changes depending on the attitude (angle of tilt) and the movement of the controller 5, and therefore the game apparatus 3 is allowed to calculate the attitude and the movement of the controller 5 using the acquired acceleration data. In the present example embodiment, the game apparatus 3 calculates the attitude, angle of tilt, etc., of the controller 5 based on the acquired acceleration data.

When a computer such as a processor (e.g., the CPU 10) of the game apparatus 3 or a processor (e.g., the microcomputer 42) of the controller 5 processes an acceleration signal outputted by the acceleration sensor 37 (or similarly from an acceleration sensor 63 to be described later), additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1 G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the angle of tilt. Thus, the acceleration sensor 37 is used in combination with the processor, making it possible to determine the angle of tilt or the attitude of the controller 5.

On the other hand, when it is premised that the controller 5 is in dynamic state (where the controller 5 is being moved), the acceleration sensor 37 detects the acceleration based on the movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on the movement of the acceleration sensor is eliminated from the detected acceleration through a predetermined process, whereby it is possible to determine the tilt of the controller 5 relative to the direction of gravity. In another example embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (for example, gravitational acceleration) the embedded or dedicated processor could convert the acceleration signal to a corresponding angle of tilt (or another appropriate parameter).

The gyroscope 48 detects angular rates about three axes (in the present example embodiment, the X-, Y-, and Z-axes). In the present specification, the directions of rotation about the X-axis, the Y-axis, and the Z-axis relative to the imaging direction (the Z-axis positive direction) of the controller 5 are referred to as a pitch direction, a yaw direction, and a roll direction, respectively. So long as the gyroscope 48 can detect the angular rates about the three axes, any number thereof may be used, and also any combination of sensors may be included therein. That is, the two-axis gyroscope 55 detects angular rates in the pitch direction (the direction of rotation about the X-axis) and the roll direction (the direction of rotation about the Z-axis), and the one-axis gyroscope 56 detects an angular rate in the yaw direction (the direction of rotation about the Y-axis). For example, the gyroscope 48 may be a three-axis gyroscope or may include a combination of a two-axis gyroscope and a one-axis gyroscope to detect the angular rates about the three axes. Data representing the angular rates detected by the gyroscope 48 is outputted to the communication section 36. Alternatively, the gyroscope 48 may simply detect an angular rate about one axis or angular rates about two axes.

Furthermore, the operating section 82 of the sub-controller 9 includes the analog joystick 81, the C button, and the Z button. The operating section 82 outputs stick data and operation button data to the main controller 8 via the connector 84, and the particular stick data and operation button data (referred to as "sub stick data" and "sub operation button data", respectively) outputted by the operating section 82 represent the direction and the amount of tilt of the analog stick 81 and the state of input with each button (as to whether the button has been pressed or not).

Furthermore, the acceleration sensor 83 of the sub-controller 9 is of the same type as the acceleration sensor 37 of the main controller 8, and detects accelerations (including a gravitational acceleration) of the sub-controller 9, i.e., force (including gravity) applied to the sub-controller 9. Among all accelerations applied to a detection section of the acceleration sensor 38, the acceleration sensor 83 detects values for accelerations (linear accelerations) linearly applied along three predetermined axial directions. Data representing the detected accelerations (referred to as "sub acceleration data") is outputted to the main controller 8 via the connector 84.

In this manner, the sub-controller 9 outputs sub-controller data, including the sub stick data, the sub operation button data, and the sub acceleration data, to the main controller 8.

The communication section 36 of the main controller 8 includes the microcomputer 42, memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process.

The sub-controller data from the sub-controller 9 is inputted to the microcomputer 42 and temporarily stored to the memory 43. In addition, data outputted by the operating section 32, the imaging information calculation section 35, the acceleration sensor 37, and the gyroscope 48 to the microcomputer 42 (referred to as "main controller data") is temporarily stored to the memory 43. Both the main controller and the sub-controller data are transmitted to the game apparatus 3 as operation data (controller operation data). Specifically, at the time of the transmission to the controller communication module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The controller communication module 19 of the game apparatus 3 receives the low power radio wave signal. The game apparatus 3 demodulates or decodes the received low power radio wave signal to acquire the operation data. The CPU 10 of the game apparatus 3 performs the game process using the operation data acquired from the controller 5. The wireless transmission from the communication section 36 to the controller communication module 19 is sequentially performed at a predetermined time interval. Since the game process is generally performed at a cycle of 1/60 sec. (corresponding to one frame time), data may be transmitted at a cycle of a shorter time period. The communication section 36 of the controller 5 outputs, to the controller communication module 19 of the game apparatus 3, the operation data at intervals of 1/200 seconds, for example.

As described above, the main controller 8 can transmit marker coordinate data, acceleration data, angular rate data, and operation button data as operation data representing operations performed thereon. The sub-controller 9 can transmit acceleration data, stick data, and operation button data as operation data representing operations performed thereon. In addition, the game apparatus 3 executes the game process using the operation data as game inputs. Accordingly, by using the controller 5, the user can perform the game operation of moving the controller 5 itself, in addition to conventionally general game operations of pressing operation buttons. For example, it is possible to perform the operations of tilting the main controller 8 and/or the sub-controller 9 to arbitrary attitudes, pointing the main controller 8 to arbitrary positions on the screen, and moving the main controller 8 and/or the sub-controller 9.

Also, in the present example embodiment, the controller 5 is not provided with any display means for displaying game images, but the controller 5 may be provided with a display means for displaying an image or suchlike to indicate, for example, a remaining battery level.

4. Configuration of the Terminal Device 7

Figure 9:
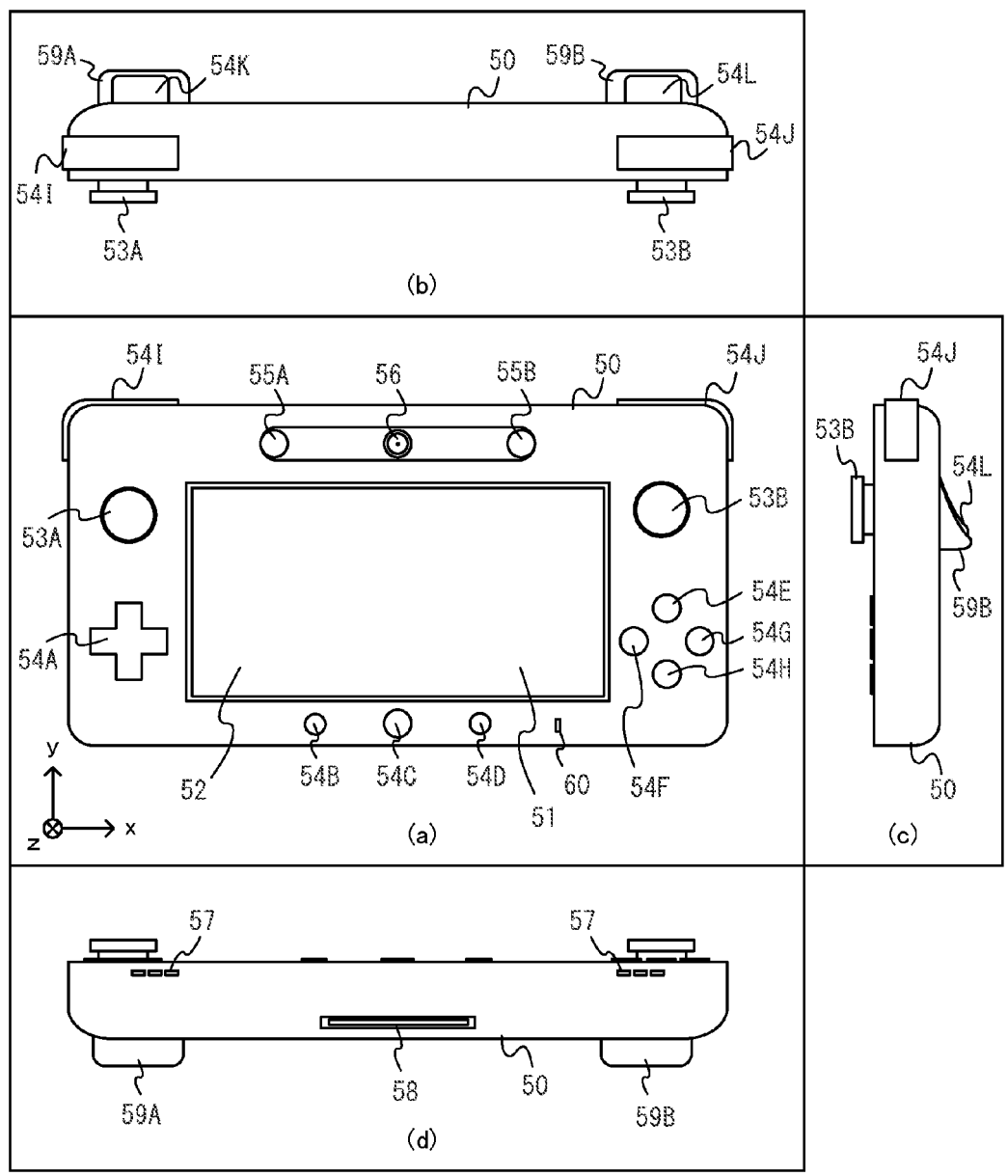
FIG. 9 is a diagram illustrating an external configuration of an example non-limiting terminal device 7.
Figure 10:
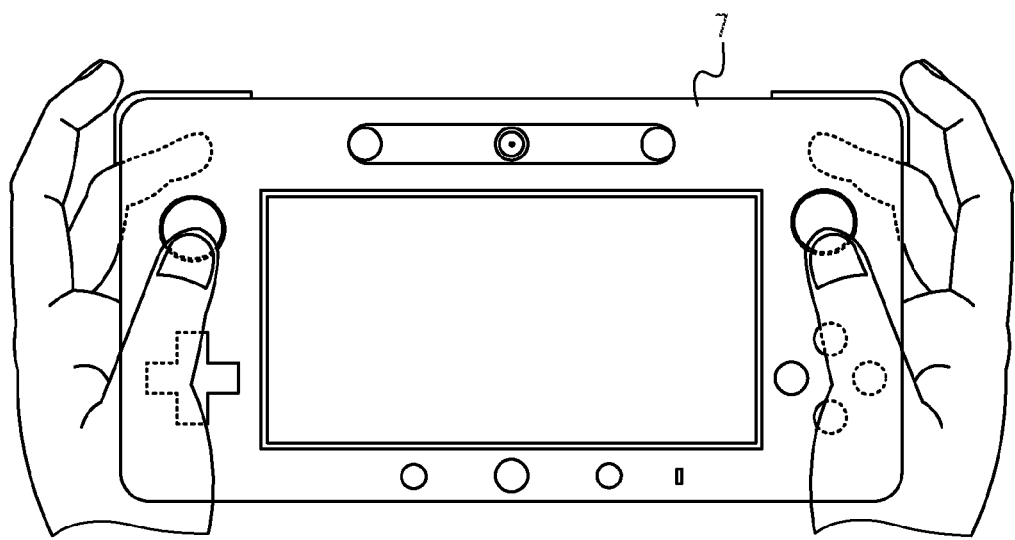
FIG. 10 is a diagram illustrating the terminal device 7 being held by the user.
Figure 11:
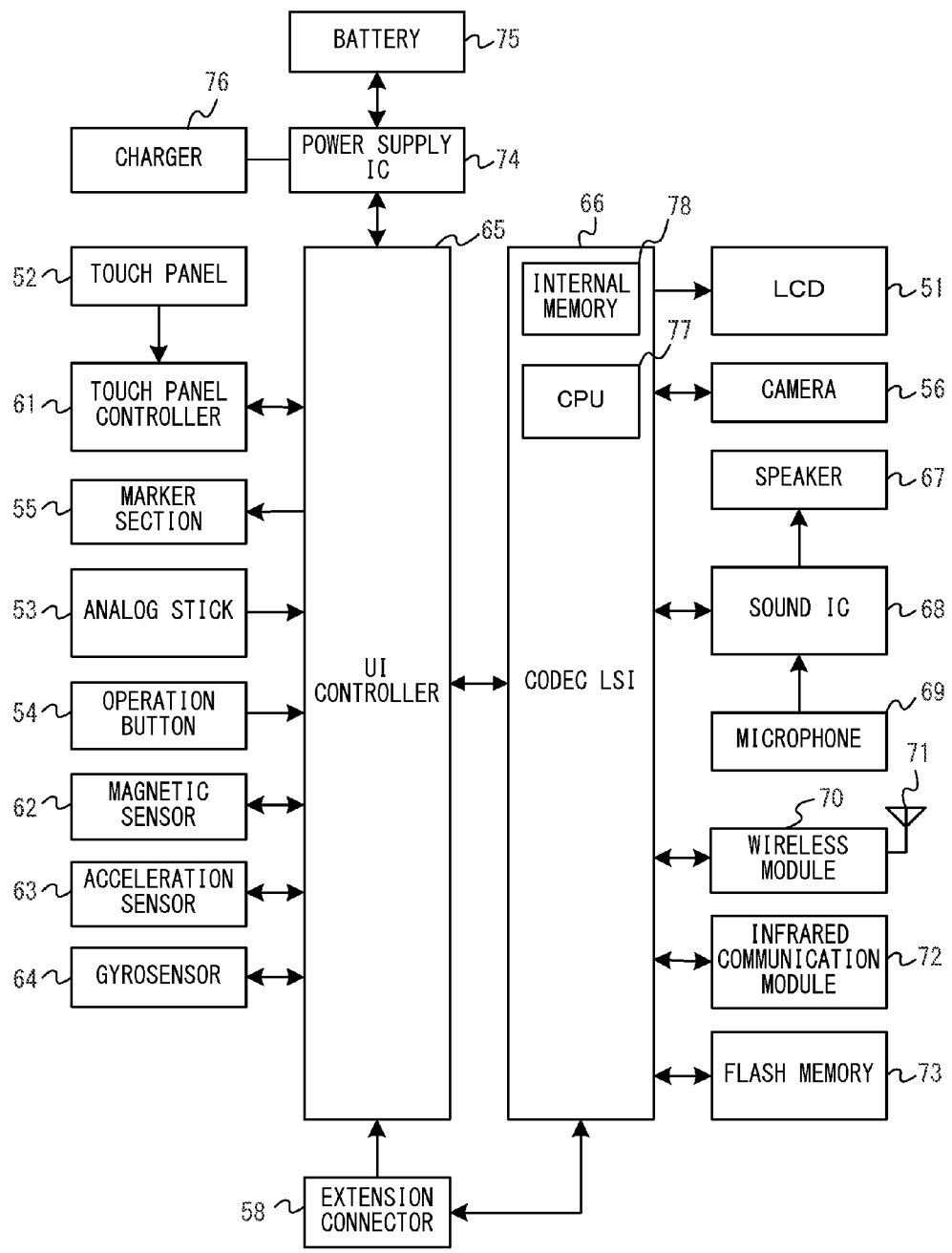
FIG. 11 is a block diagram illustrating an internal configuration of the terminal device 7.

Next, referring to FIGS. 9 to 11, the configuration of the terminal device 7 will be described. FIG. 9 provides views illustrating an external configuration of the terminal device 7. In FIG. 9, parts (a), (b), (c), and (d) are a front view, a top view, a right side view, and a bottom view, respectively, of the terminal device 7. FIG. 10 is a diagram illustrating the terminal device 7 being held by the user.

As shown in FIG. 9, the terminal device 7 has a housing 50 roughly shaped in the form of a horizontally rectangular plate. The housing 50 is sized to be held by the user. Thus, the user can hold and move the terminal device 7, and can change the position of the terminal device 7.

The terminal device 7 includes an LCD 51 on the front surface of the housing 50. The LCD 51 is provided approximately at the center of the surface of the housing 50. Therefore, the user can hold and move the terminal device while viewing the screen of the LCD 51 by holding the housing 50 by edges to the left and right of the LCD 51, as shown in FIG. 10. While FIG. 10 shows an example where the user holds the terminal device 7 horizontal (horizontally long) by holding the housing 50 by edges to the left and right of the LCD 51, the user can hold the terminal device 7 vertical (vertically long).

As shown in FIG. 9(a), the terminal device 7 includes a touch panel 52 on the screen of the LCD 51 as an operating means. In the present example embodiment, the touch panel 52 is a resistive touch panel. However, the touch panel is not limited to the resistive type, and may be of any type such as capacitive. The touch panel 52 may be single-touch or multi-touch. In the present example embodiment, a touch panel having the same resolution (detection precision) as the LCD 51 is used as the touch panel 52. However, the touch panel 52 and the LCD 51 do not have to be equal in resolution. While a stylus is usually used for providing input to the touch panel 52, input to the touch panel 52 can be provided not only by the stylus but also by the user's finger. Note that the housing 50 may be provided with an accommodation hole for accommodating the stylus used for performing operations on the touch panel 52. In this manner, the terminal device 7 includes the touch panel 52, and the user can operate the touch panel 52 while moving the terminal device 7. Specifically, the user can provide input directly to the screen of the LCD 51 (from the touch panel 52) while moving the screen.

As shown in FIG. 9, the terminal device 7 includes two analog sticks 53A and 53B and a plurality of buttons 54A to 54L, as operating means. The analog sticks 53A and 53B are devices capable of directing courses. Each of the analog sticks 53A and 53B is configured such that its stick portion to be operated with the user's finger is slidable (or tiltable) in an arbitrary direction (at an arbitrary angle in any of the up, down, left, right, and oblique directions) with respect to the surface of the housing 50. Moreover, the left analog stick 53A and the right analog stick 53B are provided to the left and the right, respectively, of the screen of the LCD 51. Accordingly, the user can provide an input for course direction using the analog stick with either the left or the right hand. In addition, as shown in FIG. 10, the analog sticks 53A and 53B are positioned so as to allow the user to manipulate them while holding the terminal device 7 at its left and right edges, and therefore the user can readily manipulate the analog sticks 53A and 53B while moving the terminal device 7 by hand.

The buttons 54A to 54L are operating means for providing predetermined input. As will be discussed below, the buttons 54A to 54L are positioned so as to allow the user to manipulate them while holding the terminal device 7 at its left and right edges (see FIG. 10). Therefore the user can readily manipulate the operating means while moving the terminal device 7 by hand.

As shown in FIG. 9(a), of all the operation buttons 54A to 54L, the cross button (direction input button) 54A and the buttons 54B to 54H are provided on the front surface of the housing 50. That is, these buttons 54A to 54H are positioned so as to allow the user to manipulate them with his/her thumbs (see FIG. 10).

The cross button 54A is provided to the left of the LCD 51 and below the left analog stick 53A. That is, the cross button 54A is positioned so as to allow the user to manipulate it with his/her left hand. The cross button 54A is a cross-shaped button which makes it possible to specify at least up, down, left and right directions. Also, the buttons 54B to 54D are provided below the LCD 51. These three buttons 54B to 54D are positioned so as to allow the user to manipulate them with either hand. Moreover, the four buttons 54E to 54H are provided to the right of the LCD 51 and below the right analog stick 53B. That is, the four buttons 54E to 54H are positioned so as to allow the user to manipulate them with the right hand. In addition, the four buttons 54E to 54H are positioned above, to the left of, to the right of, and below the central position among them. Therefore, the four buttons 54E to 54H of the terminal device 7 can be used to function as buttons for allowing the user to specify the up, down, left and right directions.

Furthermore, as shown in FIGS. 9(a), 9(b) and 9(c), the first L button 54I and the first R button 54J are provided at the upper (left and right) corners of the housing 50. Specifically, the first L button 54I is provided at the left edge of the top surface of the plate-like housing 50 so as to be exposed both from the top surface and the left-side surface. The first R button 54J is provided at the right edge of the top surface of the housing 50 so as to be exposed both from the top surface and the right-side surface. Thus, the first L button 54I is positioned so as to allow the user to manipulate it with the left index finger, and the first R button 54J is positioned so as to allow user to manipulate it with the right index finger (see FIG. 10).

Also, as shown in FIGS. 9(b) and 9(c), the second L button 54K and the second R button 54L are positioned at stands 59A and 59B, respectively, which are provided on the back surface of the plate-like housing 50 (i.e., the plane opposite to the surface where the LCD 51 is provided). The second L button 54K is provided at a comparatively high position on the right side of the back surface of the housing 50 (i.e., the left side as viewed from the front surface side), and the second R button 54L is provided at a comparatively high position on the left side of the back surface of the housing 50 (i.e., the right side as viewed from the front surface side). In other words, the second L button 54K is provided at a position approximately opposite to the left analog stick 53A provided on the front surface, and the second R button 54L is provided at a position approximately opposite to the right analog stick 53B provided on the front surface. Thus, the second L button 54K is positioned so as to allow the user to manipulate it with the left middle finger, and the second R button 54L is positioned so as to allow the user to manipulate it with the right middle finger (see FIG. 10). In addition, the second L button 54K and the second R button 54L are provided on the surfaces of the stands 59A and 59B that are directed obliquely upward, as shown in FIG. 9(c), and therefore, the second L button 54K and the second R button 54L have button faces directed obliquely upward. When the user holds the terminal device 7, the middle fingers will probably be able to move in the up/down direction, and therefore the button faces directed upward will allow the user to readily press the second L button 54K and the second R button 54L. Moreover, providing the stands on the back surface of the housing 50 allows the user to readily hold the housing 50, and furthermore, providing the buttons on the stands allows the user to readily manipulate the buttons while holding the housing 50.

Note that the terminal device 7 shown in FIG. 9 has the second L button 54K and the second R button 54L provided at the back surface, and therefore when the terminal device 7 is placed with the screen of the LCD 51 (the front surface of the housing 50) facing up, the screen might not be completely horizontal. Accordingly, in another example embodiment, three or more stands may be formed on the back surface of the housing 50. As a result, when the terminal device 7 is placed on the floor with the screen of the LCD 51 facing upward, all the stands contact the floor, so that the screen can be horizontal. Alternatively, the terminal device 7 may be placed horizontally by adding a detachable stand.

The buttons 54A to 54L are each appropriately assigned a function in accordance with the game program. For example, the cross button 54A and the buttons 54E to 54H may be used for direction-specifying operations, selection operations, etc., whereas the buttons 54B to 54E may be used for setting operations, cancellation operations, etc.

Although not shown in the figures, the terminal device 7 includes a power button for turning ON/OFF the terminal device 7. Moreover, the terminal device 7 may also include buttons for turning ON/OFF the screen of the LCD 51, performing a connection setting (pairing) with the game apparatus 3, and controlling the volume of speakers (speakers 67 shown in FIG. 11).

As shown in FIG. 9(a), the terminal device 7 has a marker section (a marker section 55 shown in FIG. 11), including markers 55A and 55B, provided on the front surface of the housing 50. The marker section 55 is provided in the upper portion of the LCD 51. The markers 55A and 55B are each formed by one or more infrared LEDs, as are the markers 6R and 6L of the marker device 6. The marker section 55 is used for the game apparatus 3 to calculate the movement, etc., of the controller 5 (the main controller 8), as is the marker device 6 described above. In addition, the game apparatus 3 can control the lighting of the infrared LEDs included in the marker section 55.

The terminal device 7 includes the camera 56 which is an image pickup means. The camera 56 includes an image pickup element (e.g., a CCD image sensor, a CMOS image sensor, or the like) having a predetermined resolution, and a lens. As shown in FIG. 8, in the present example embodiment, the camera 56 is provided on the front surface of the housing 50. Therefore, the camera 56 can pick up an image of the face of the user holding the terminal device 7, and can pick up an image of the user playing a game while viewing the LCD 51, for example.

Note that the terminal device 7 includes a microphone (a microphone 69 shown in FIG. 11) which is a sound input means. A microphone hole 60 is provided in the front surface of the housing 50. The microphone 69 is provided inside the housing 50 behind the microphone hole 60. The microphone detects sounds around the terminal device 7 such as the voice of the user.

The terminal device 7 includes speakers (speakers 67 shown in FIG. 11) which are sound output means. As shown in FIG. 9(d), speaker holes 57 are provided in the bottom surface of the housing 50. Sound emitted by the speakers 67 is outputted from the speaker holes 57. In the present example embodiment, the terminal device 7 includes two speakers, and the speaker holes 57 are provided at positions corresponding to the left and right speakers.

Also, the terminal device 7 includes an expansion connector 58 for connecting another device to the terminal device 7. In the present example embodiment, the expansion connector 58 is provided at the bottom surface of the housing 50, as shown in FIG. 9(d). Any additional device may be connected to the expansion connector 58, including, for example, a game-specific controller (a gun-shaped controller or suchlike) or an input device such as a keyboard. The expansion connector 58 may be omitted if there is no need to connect any additional devices to terminal device 7.

Note that as for the terminal device 7 shown in FIG. 9, the shapes of the operation buttons and the housing 50, the number and arrangement of components, etc., are merely illustrative, and other shapes, numbers, and arrangements may be employed.

Next, an internal configuration of the terminal device 7 will be described with reference to FIG. 11. FIG. 11 is a block diagram illustrating the internal configuration of the terminal device 7. As shown in FIG. 11, in addition to the components shown in FIG. 9, the terminal device 7 includes a touch panel controller 61, a magnetic sensor 62, the acceleration sensor 63, the gyroscope 64, a user interface controller (UI controller) 65, a codec LSI 66, the speakers 67, a sound IC 68, the microphone 69, a wireless module 70, an antenna 71, an infrared communication module 72, flash memory 73, a power supply IC 74, and a battery 75. These electronic components are mounted on an electronic circuit board and accommodated in the housing 50.

The UI controller 65 is a circuit for controlling the input/output of data to/from various input/output sections. The UI controller 65 is connected to the touch panel controller 61, an analog stick section 53 (including the analog sticks 53A and 53B), an operation button group 54 (including the operation buttons 54A to 54L), the marker section 55, the magnetic sensor 62, the acceleration sensor 63, the gyroscope 64. The UI controller 65 is connected to the codec LSI 66 and the expansion connector 58. The power supply IC 74 is connected to the UI controller 65, and power is supplied to various sections via the UI controller 65. The built-in battery 75 is connected to the power supply IC 74 to supply power. A charger 76 or a cable with which power can be obtained from an external power source can be connected to the power supply IC 74 via a charging connector, and the terminal device 7 can be charged with power supplied from an external power source using the charger 76 or the cable. Note that the terminal device 7 can be charged by being placed in an unillustrated cradle having a charging function.

The touch panel controller 61 is a circuit connected to the touch panel 52 for controlling the touch panel 52. The touch panel controller 61 generates touch position data in a predetermined format based on signals from the touch panel 52, and outputs it to the UI controller 65. The touch position data represents, for example, the coordinates of a position on the input surface of the touch panel 52 at which an input has been made. The touch panel controller 61 reads a signal from the touch panel 52 and generates touch position data once per a predetermined period of time. Various control instructions for the touch panel 52 are outputted by the UI controller 65 to the touch panel controller 61.

The analog stick section 53 outputs, to the UI controller 65, stick data representing the direction and the amount of sliding (or tilting) of the stick portion operated with the user's finger. The operation button group 54 outputs, to the UI controller 65, operation button data representing the input status of each of the operation buttons 54A to 54L (regarding whether it has been pressed).

The magnetic sensor 62 detects an azimuthal direction by sensing the magnitude and the direction of a magnetic field. Azimuthal direction data representing the detected azimuthal direction is outputted to the UI controller 65. Control instructions for the magnetic sensor 62 are outputted by the UI controller 65 to the magnetic sensor 62. While there are sensors using, for example, an MI (magnetic impedance) element, a fluxgate sensor, a Hall element, a GMR (giant magnetoresistance) element, a TMR (tunnel magnetoresistance) element, or an AMR (anisotropic magnetoresistance) element, the magnetic sensor 62 may be of any type so long as it is possible to detect the azimuthal direction. Strictly speaking, in a place where there is a magnetic field in addition to the geomagnetic field, the obtained azimuthal direction data does not represent the azimuthal direction. Nevertheless, if the terminal device 7 moves, the azimuthal direction data changes, and it is therefore possible to calculate the change in the attitude of the terminal device 7.

The acceleration sensor 63 is provided inside the housing 50 for detecting the magnitude of linear acceleration along each direction of three axes (the x-, y- and z-axes shown in FIG. 9(a)). Specifically, the acceleration sensor 63 detects the magnitude of linear acceleration along each axis, where the longitudinal direction of the housing 50 is taken as the x-axis, the width direction of the housing 50 as the y-axis and a direction perpendicular to the front surface of the housing 50 as the z-axis. Acceleration data representing the detected acceleration is outputted to the UI controller 65. Also, control instructions for the acceleration sensor 63 are outputted by the UI controller 65 to the acceleration sensor 63. In the present example embodiment, the acceleration sensor 63 is assumed to be, for example, a capacitive MEMS acceleration sensor, but in another example embodiment, an acceleration sensor of another type may be employed. The acceleration sensor 63 may be an acceleration sensor for detection in one axial direction or two axial directions.

The gyroscope 64 is provided inside the housing 50 for detecting angular rates about the three axes, i.e., the x-, y-, and z-axes. Angular rate data representing the detected angular rates is outputted to the UI controller 65. Also, control instructions for the gyroscope 64 are outputted by the UI controller 65 to the gyroscope 64. Note that any number and combination of gyroscopes may be used for detecting angular rates about the three axes, and similar to the gyroscope 48, the gyroscope 64 may include a two-axis gyroscope and a one-axis gyroscope. Alternatively, the gyroscope 64 may be a gyroscope for detection in one axial direction or two axial directions.

The UI controller 65 outputs operation data to the codec LSI 66, including touch position data, stick data, operation button data, azimuthal direction data, acceleration data, and angular rate data received from various components described above. If another device is connected to the terminal device 7 via the expansion connector 58, data representing an operation performed on that device may be further included in the operation data.

The codec LSI 66 is a circuit for performing a compression process on data to be transmitted to the game apparatus 3, and a decompression process on data transmitted from the game apparatus 3. The LCD 51, the camera 56, the sound IC 68, the wireless module 70, the flash memory 73, and the infrared communication module 72 are connected to the codec LSI 66. The codec LSI 66 includes a CPU 77 and internal memory 78. While the terminal device 7 does not perform any game process itself, the terminal device 7 may execute programs for its own management and communication purposes. Upon power-on, the CPU 77 executes a program loaded into the internal memory 78 from the flash memory 73, thereby starting up the terminal device 7. Also, some area of the internal memory 78 is used as VRAM for the LCD 51.

The camera 56 picks up an image in response to an instruction from the game apparatus 3, and outputs data for the pick-up image to the codec LSI 66. Also, control instructions for the camera 56, such as an image pickup instruction, are outputted by the codec LSI 66 to the camera 56. Note that the camera 56 can also record video. Specifically, the camera 56 can repeatedly pick up images and repeatedly output image data to the codec LSI 66.

The sound IC 68 is a circuit connected to the speakers 67 and the microphone 69 for controlling input/output of sound data to/from the speakers 67 and the microphone 69. Specifically, when sound data is received from the codec LSI 66, the sound IC 68 outputs to the speakers 67 a sound signal obtained by performing D/A conversion on the sound data so that sound is outputted by the speakers 67. The microphone 69 senses sound propagated to the terminal device 7 (e.g., the user's voice), and outputs a sound signal representing the sound to the sound IC 68. The sound IC 68 performs A/D conversion on the sound signal from the microphone 69 to output sound data in a predetermined format to the codec LSI 66.

The codec LSI 66 transmits, as terminal operation data, image data from the camera 56, sound data from the microphone 69 and operation data from the UI controller 65 to the game apparatus 3 via the wireless module 70. In the present example embodiment, the codec LSI 66 subjects the image data and the sound data to a compression process as the codec LSI 27 does. The terminal operation data, along with the compressed image data and sound data, is outputted to the wireless module 70 as transmission data. The antenna 71 is connected to the wireless module 70, and the wireless module 70 transmits the transmission data to the game apparatus 3 via the antenna 71. The wireless module 70 has a similar function to that of the terminal communication module 28 of the game apparatus 3. Specifically, the wireless module 70 has a function of connecting to a wireless LAN by a scheme in conformity with the IEEE 802.11n standard, for example. Data to be transmitted may or may not be encrypted depending on the situation.

As described above, the transmission data to be transmitted from the terminal device 7 to the game apparatus 3 includes operation data (terminal operation data), image data, and sound data. In the case where another device is connected to the terminal device 7 via the expansion connector 58, data received from that device may be further included in the transmission data. In addition, the infrared communication module 72 performs infrared communication with another device in accordance with, for example, the IRDA standard. Where appropriate, data received via infrared communication may be included in the transmission data to be transmitted to the game apparatus 3 by the codec LSI 66.

As described above, compressed image data and sound data are transmitted from the game apparatus 3 to the terminal device 7. These data items are received by the codec LSI 66 via the antenna 71 and the wireless module 70. The codec LSI 66 decompresses the received image data and sound data. The decompressed image data is outputted to the LCD 51, and images are displayed on the LCD 51. The decompressed sound data is outputted to the sound IC 68, and the sound IC 68 outputs sound from the speakers 67.

Also, in the case where control data is included in the data received from the game apparatus 3, the codec LSI 66 and the UI controller 65 give control instructions to various sections in accordance with the control data. As described above, the control data is data representing control instructions for the components of the terminal device 7 (in the present example embodiment, the camera 56, the touch panel controller 61, the marker section 55, the sensors 62 to 64, and the infrared communication module 72). In the present example embodiment, the control instructions represented by the control data are conceivably instructions to activate or deactivate (suspend) the components. Specifically, any components that are not used in a game may be deactivated in order to reduce power consumption, and in such a case, data from the deactivated components is not included in the transmission data to be transmitted from the terminal device 7 to the game apparatus 3. Note that the marker section 55 is configured by infrared LEDs, and therefore is simply controlled for power supply to be ON/OFF.

While the terminal device 7 includes operating means such as the touch panel 52, the analog sticks 53 and the operation button group 54, as described above, in another example embodiment, other operating means may be included in place of or in addition to these operating means.

Also, while the terminal device 7 includes the magnetic sensor 62, the acceleration sensor 63 and the gyroscope 64 as sensors for calculating the movement of the terminal device 7 (including its position and attitude or changes in its position and attitude), in another example embodiment, only one or two of the sensors may be included. Furthermore, in another example embodiment, any other sensor may be included in place of or in addition to these sensors.

Also, while the terminal device 7 includes the camera 56 and the microphone 69, in another example embodiment, the terminal device 7 may or may not include the camera 56 and the microphone 69 or it may include only one of them.

Also, while the terminal device 7 includes the marker section 55 as a feature for calculating the positional relationship between the terminal device 7 and the main controller 8 (e.g., the position and/or the attitude of the terminal device 7 as seen from the main controller 8), in another example embodiment, it may not include the marker section 55. Furthermore, in another example embodiment, the terminal device 7 may include another means as the aforementioned feature for calculating the positional relationship. For example, in another example embodiment, the main controller 8 may include a marker section, and the terminal device 7 may include an image pickup element. Moreover, in such a case, the marker device 6 may include an image pickup element in place of an infrared LED.

5. Outline of the Game Process

Next, the game process to be performed in the game system 1 of the present example embodiment will be outlined. The game to be performed by the present game process is a game for a plurality of players to play against each other using a plurality of controllers 5 as operating devices. Moreover, in the present example embodiment, the terminal device 7 is used as a display device, and game images are displayed on the television 2 and the terminal device 7. The present example embodiment will be described with respect to the case where the game system 1 includes two controllers 5, and all of the two controllers 5 are used. Specifically, in the present example embodiment, the game is played by two players, each manipulating one controller 5. Note that in another example embodiment, the number of controllers 5 may be three or more.

Figure 12:
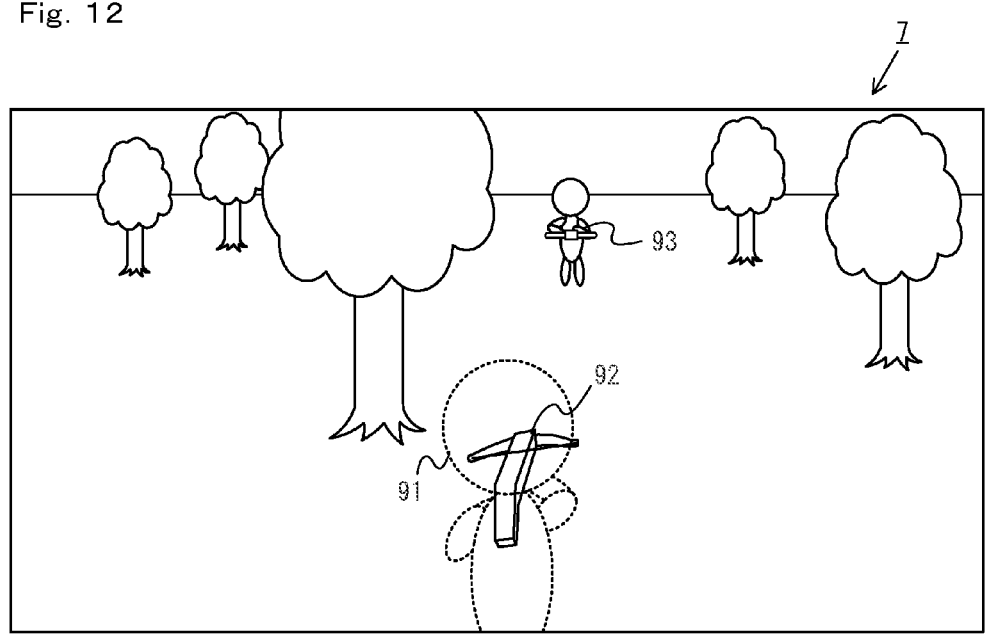
FIG. 12 is a diagram illustrating an example terminal game image displayed on the terminal device 7.

FIG. 12 is a diagram illustrating an example of the terminal game image to be displayed on the terminal device 7. As shown in FIG. 12, an image representing a game space with a second object 93 viewed from behind a first object 91 is displayed on the terminal device 7 as the terminal game image. The first object 91 is an object to be operated by one of the two players. In addition, the second object 93 is an object to be operated by the other player. Hereinafter, the player who operates the first object 91 will be referred to as the "first player", and the player who operates the second object 93 will be referred to as the "second player". Note that in the present example embodiment, to allow the first player to readily recognize the situation in the game space, the first object 91 is displayed translucently (indicated by dotted lines in FIG. 12) on the terminal device 7.

In this manner, the terminal device 7 displays the game image for the first player. That is, in the present example embodiment, the image representing the game space, including the first object 91, is displayed as the terminal game image. Note that in another example embodiment, the terminal game image may be an image representing the game space as viewed from the position of the first object 91, or an image in which the position of the point of view and/or the line of sight direction changes/change in accordance with the first player's operation. In addition, as will be described in detail later, the terminal game image is generated using a first virtual camera being set in the game space.

In the present game, the first object 91 moves within the game space in accordance with the first player's predetermined moving operation with the controller 5 (to be referred to as the "first controller"). Moreover, the first object 91 carries a crossbow 92, and performs a shooting action in accordance with a predetermined shooting operation with the first controller. As will be described in detail later, the crossbow 92 is controlled to change its direction in accordance with the attitude of the main controller 8 (first main controller) included in the first controller. That is, the first player can perform an operation to change the attitude of the first main controller, thereby changing the shooting direction of the first object 91.

Figure 13:
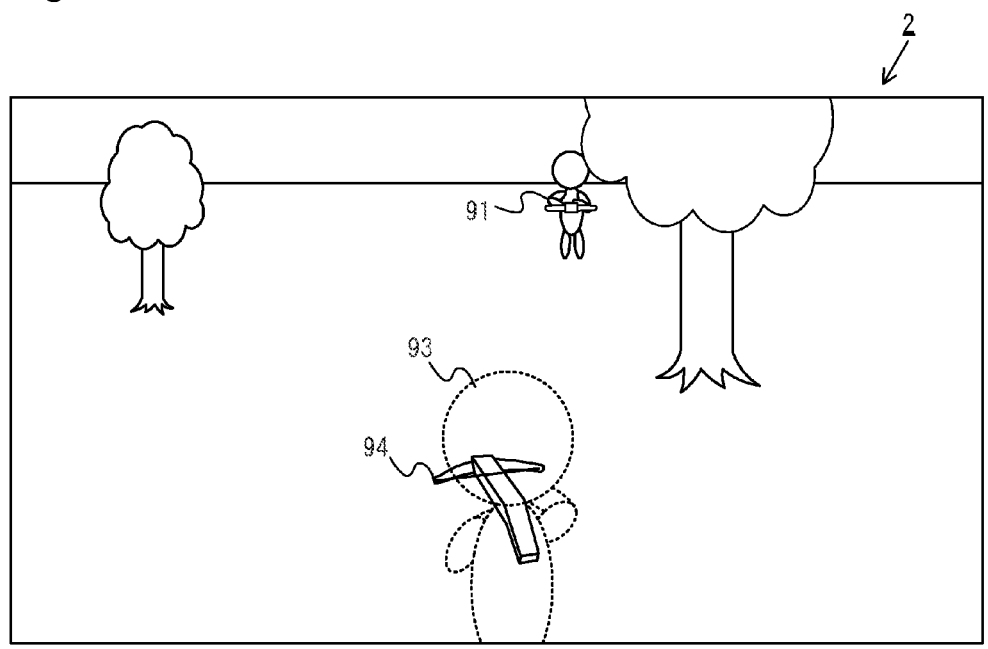
FIG. 13 is a diagram illustrating an example television game image displayed on a television 2.

FIG. 13 is a diagram illustrating an example of the television game image to be displayed on the television 2. As shown in FIG. 13, an image representing the game space with the first object 91 viewed from behind the second object 93 is displayed on the television 2 as the television game image. Note that in the present example embodiment, to allow the second player to readily recognize the situation in the game space, the second object 93 is displayed translucently (indicated by dotted lines in FIG. 13) on the television 2.

In this manner, the television 2 displays the game image for the second player. That is, in the present example embodiment, the image representing the game space, including the second object 93, is displayed as the television game image. Note that in another example embodiment, the television game image may be an image representing the game space as viewed from the position of the second object 93, or an image in which the position of the point of view and/or the line of sight direction changes/change in accordance with the second player's operation. In addition, as will be described in detail later, the television game image is generated using a second virtual camera being set in the game space.

In the present game, the action of the second object 93 is controlled by the same operation method as the first object 91. That is, the second object 93 moves within the game space in accordance with the second player's predetermined moving operation with the controller 5 (to be referred to as the "second controller"). Moreover, the second object 93 carries a crossbow 94, and performs a shooting action in accordance with a predetermined shooting operation on the second controller. Moreover, the crossbow 94 is controlled to change its direction (shooting direction) in accordance with the attitude of the main controller 8 (second main controller) included in the second controller.

In the present example embodiment, the game to be played using the game system 1 is a shooting game in which two players operate their respective objects to shoot each other's object. That is, each player plays the game by moving an object to be operated within the game space and causing the object to perform an action to shoot the other's object.

As described above, in the present example embodiment, the game image for the first player is displayed on the terminal device 7, and the game image for the second player is displayed on the television 2. Accordingly, the game images for the players are displayed on their respective display devices, and therefore the game images can be provided so as to be readily viewed by the players, without dividing the display area of a display device. Specifically, in the case where a plurality of game images are displayed on divided display areas of a display device, each player might mistake another player's game image for his/her own game image and might feel uncomfortable about his/her own game image being displayed in small size, but the present example embodiment can prevent such problems.

Furthermore, the game in the present example embodiment is of a type for two players to play against each other, and therefore, if a game image for one player can be seen by the other player, the game is rendered less strategic and hence less enjoyable. Concretely, in the present example embodiment, each player can move and hide his/her player object behind a tree or suchlike so that the other player cannot see it, but if the game image for that player is viewed by the other player, the position of the player object can be revealed to the other player. In this regard, in the present example embodiment, the terminal device 7 is a portable display device, and therefore can be placed in any arbitrary position. That is, placing the terminal device 7 in an appropriate position can prevent each player from viewing the game image for the other player. As a result, it is possible to enhance the strategic aspect of the game, thereby rendering the game highly enjoyable.

Figure 14:
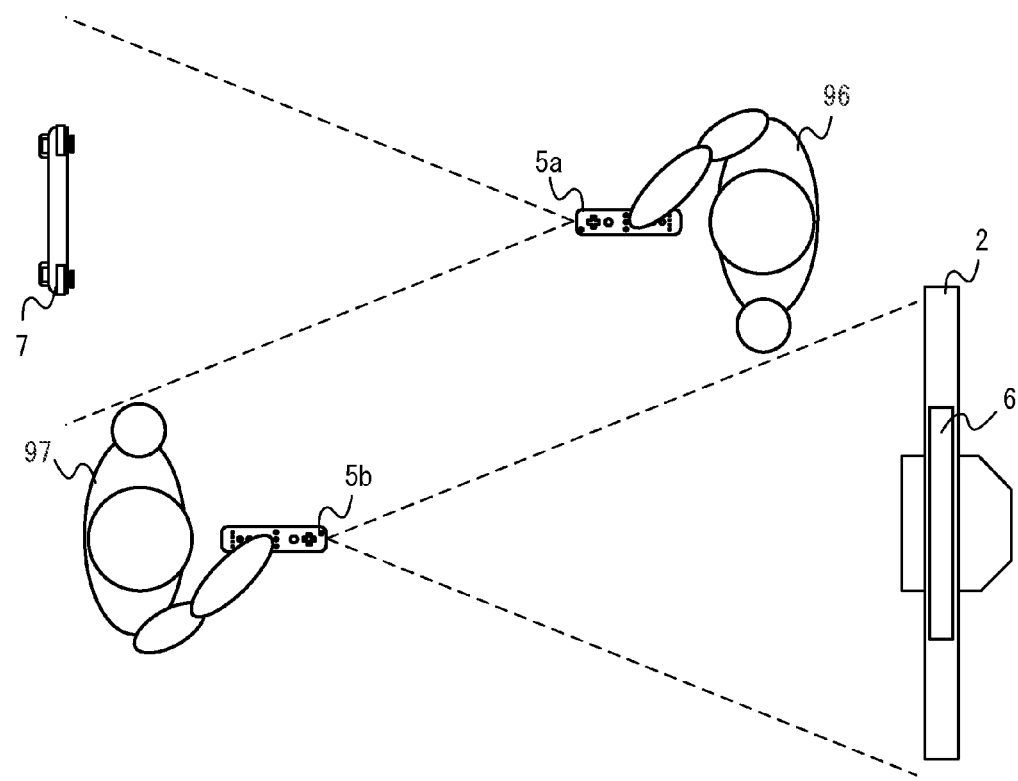
FIG. 14 illustrates an arrangement example where the television 2 and the terminal device 7 are directed in opposite directions.
Figure 15:
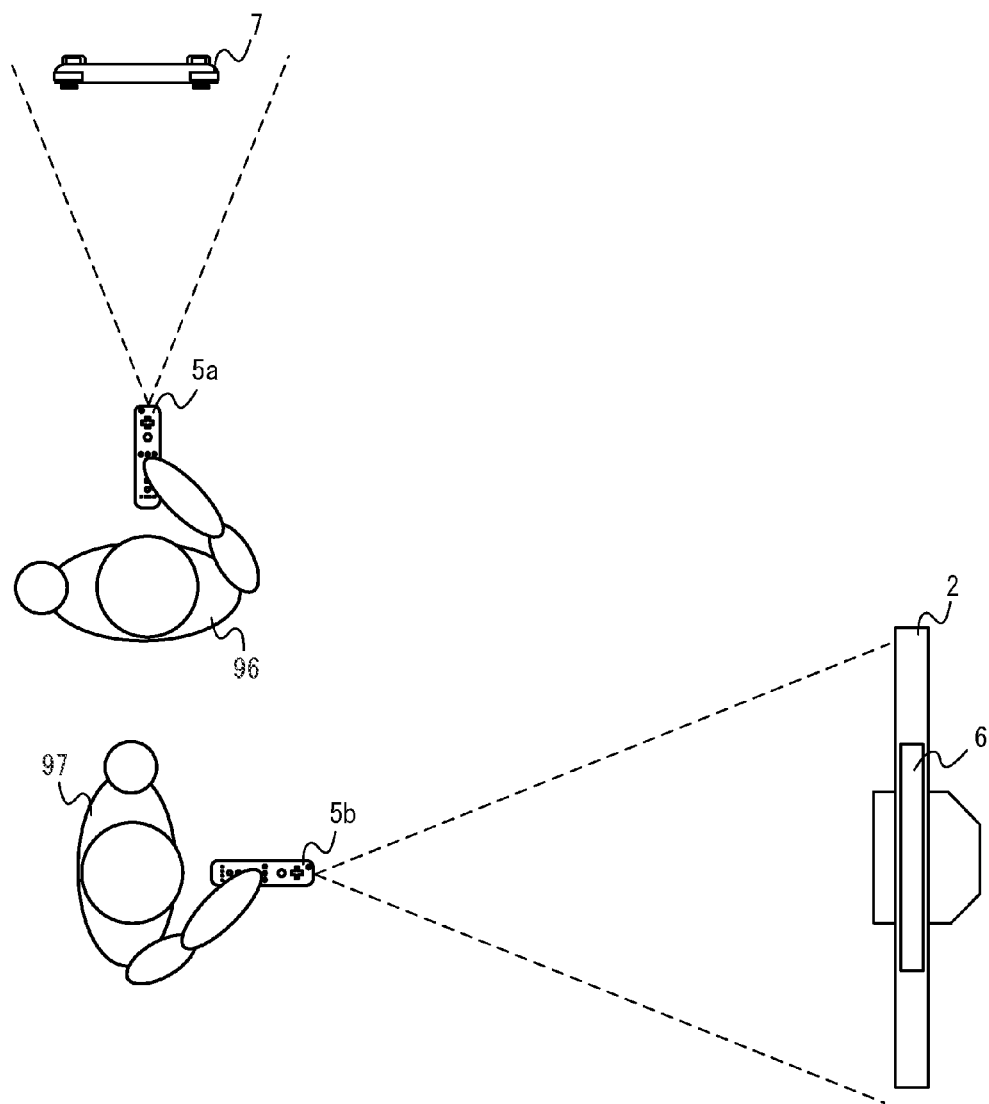
FIG. 15 is a diagram illustrating an arrangement example where the television 2 and the terminal device 7 are placed with their screens approximately at a right angle with respect to each other.
Figure 16:
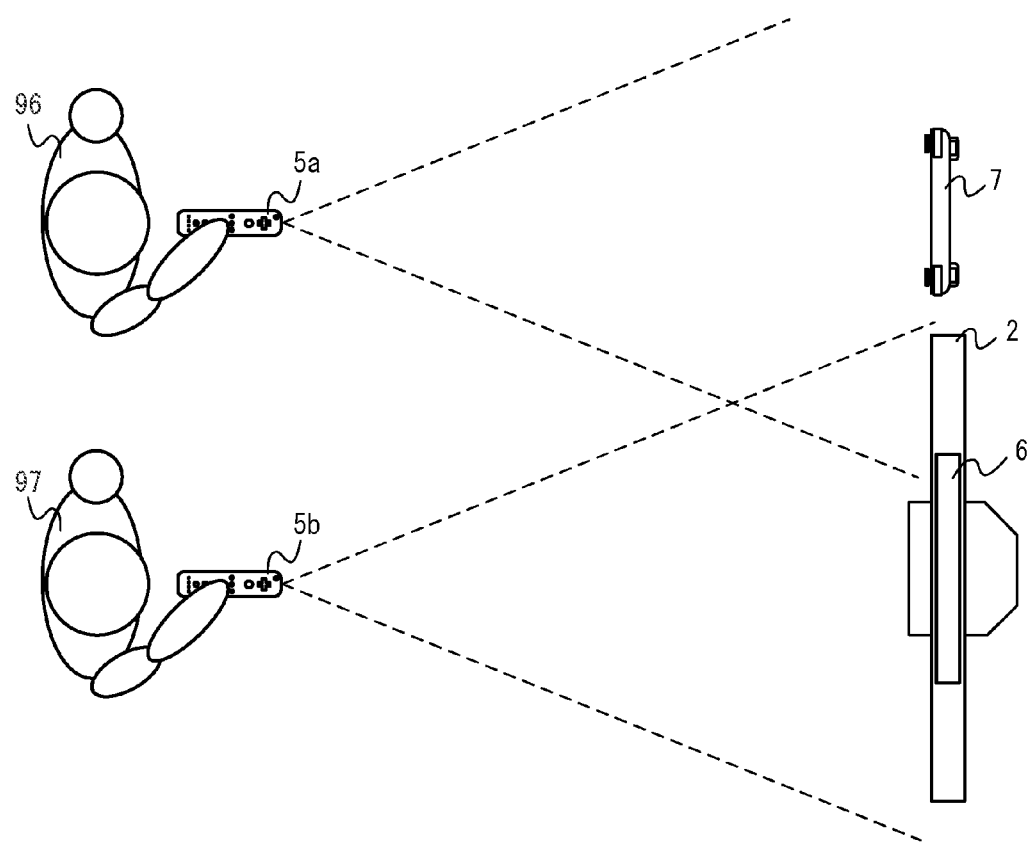
FIG. 16 is a diagram illustrating an arrangement example where the television 2 and the terminal device 7 are placed side by side.

Note that in the present example embodiment, the terminal device 7, which is a portable display device, can be placed in any arbitrary position, as described above, and therefore, the players can play the game with various arrangement patterns. FIGS. 14 to 16 are diagrams illustrating arrangement examples of the television 2 and the terminal device 7. FIG. 14 illustrates an arrangement example where the television 2 and the terminal device 7 are directed in opposite directions. In FIG. 14, the television 2 and the terminal device 7 are arranged with their front directions being opposite to each other. In this case, the first player 96 and the second player 97 play the game while standing in front of the terminal device 7 and the television 2, respectively. The arrangement shown in FIG. 14 causes the players 96 and 97 to play the game without viewing each other's game image, thereby enhancing the strategic aspect of the game. Moreover, in FIG. 14, the players 96 and 97 are positioned to face each other, and therefore, the positional relationship between the objects 91 and 93 in the game space corresponds to the positional relationship between the players 96 and 97 in the real space. As a result, the game can be rendered more realistic.

Furthermore, as will be described in detail later, in the present example embodiment, controllers 5a and 5b perform game processes using marker coordinate data as inputs, where the marker coordinate data is obtained by picking up images of markers (markers 6R and 6L of the marker device 6 or markers 55A and 55B of a marker section 55 provided in the terminal device 7). That is, the first controller 5a operated by the first player 96 corresponds to the marker section 55 of the terminal device 7, which displays the game image for the first player 96, and the game process is performed on the basis of marker coordinate data obtained by picking up an image of the marker section 55. In addition, the second controller 5b operated by the second player 97 corresponds to the marker device 6 provided on the television 2, which displays the game image for the second player 97, and the game process is performed on the basis of marker coordinate data obtained by picking up an image of the marker device 6. Therefore, the players 96 and 97 perform game operations while directing the controllers to the display devices. On the other hand, when one controller picks up an image including both the marker device 6 and the marker section 55 or an image of a marker not corresponding to that controller, erroneous marker detection occurs, and therefore the game process is not performed correctly, so that the game operation cannot be performed appropriately. Accordingly, in the case where a pickup image of a marker is used for the game process, the terminal device 7 may be arranged such that neither the marker device 6 nor the marker section 55 is included within the range of an image to be picked up by one controller, or the controller does not pick up an image of a marker not corresponding thereto.

For example, when the television 2 and the terminal device 7 are directed in opposite directions, as shown in FIG. 14, neither marker is included within the range of an image to be picked up by each controller, and the controller is unlikely to pick up a marker not corresponding thereto. FIG. 15 is a diagram illustrating an arrangement example where the television 2 and the terminal device 7 are placed with their screens approximately right angle with respect to each other. As shown in FIG. 15, when the screen (marker device 6) of the television 2 and the screen of the terminal device 7 are set at an angle of about 90°, neither marker is included within the range of an image to be picked up by each controller, and the controller does not pick up a marker not corresponding thereto. Therefore, in another example embodiment, the player may arrange the terminal device 7 as shown in FIG. 15. In this manner, by setting an angle of about 90° or more between the screen (marker device 6) of the television 2 and the screen of the terminal device 7, it is possible to prevent any erroneous marker detection.

FIG. 16 is a diagram illustrating an arrangement example where the television 2 and the terminal device 7 are placed side by side. In the case where the screen (marker device 6) of the television 2 and the screen of the terminal device 7 are approximately lateral to each other, as shown in FIG. 16, neither marker is included within the range of an image to be picked up by each controller, and furthermore, the controller might pick up an image of a marker not corresponding thereto. Accordingly, in the case where the terminal device 7 is set in such an arrangement, the marker device 6 and the marker section 55 may emit light on a time-slicing basis. In addition, in the case where the television 2 and the terminal device 7 are arranged side by side, as shown in FIG. 16, only one marker may emit light.

6. Details of the Game Process

Figure 17:
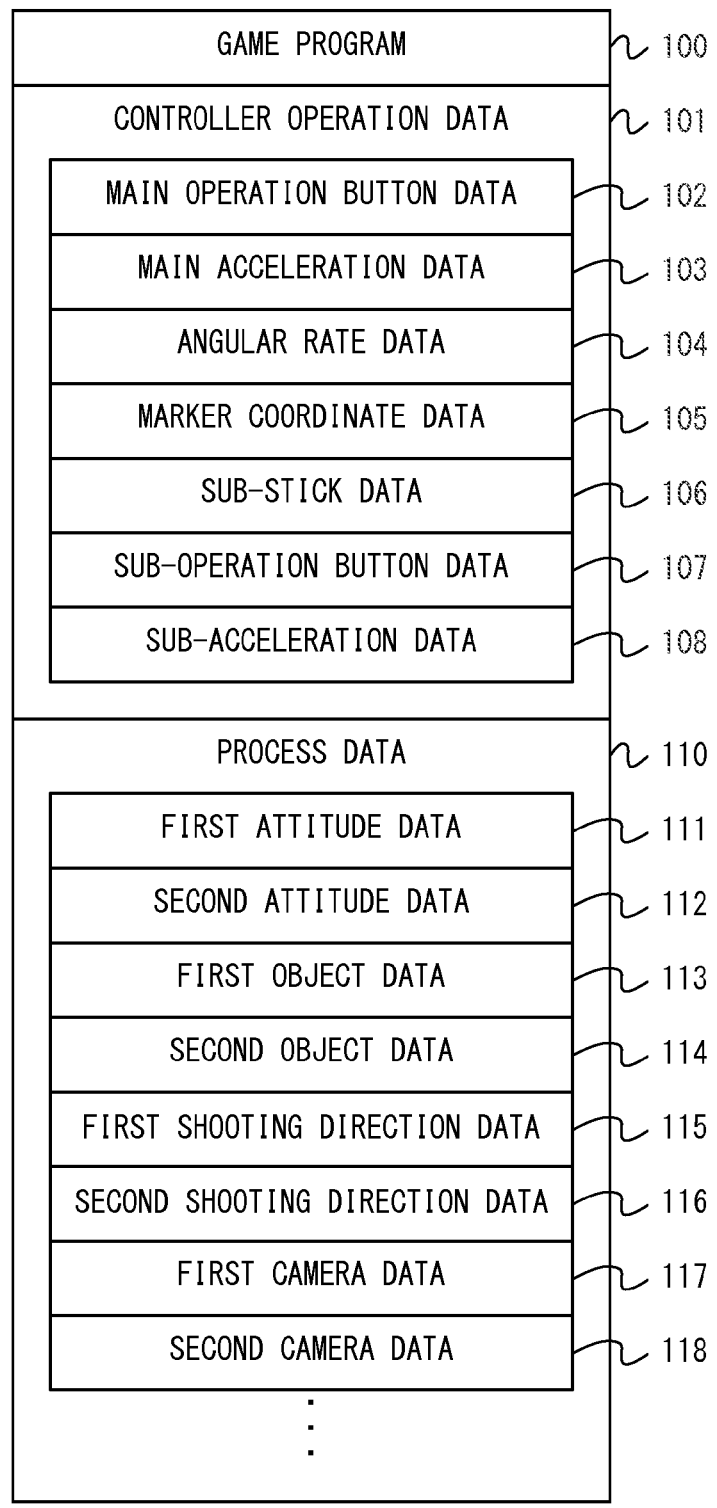
FIG. 17 is a diagram illustrating various types of data for use in a game process.

Next, the game process to be executed in the present game system will be described in detail. First, various types of data for use in the game process will be described. FIG. 17 is a diagram illustrating the data for use in the game process. In FIG. 17, main data stored in the main memory (the external main memory 12 or the internal main memory 11e) of the game apparatus 3 is shown. As shown in FIG. 17, the main memory of the game apparatus 3 has stored therein a game program 100, controller operation data 101, and process data 110. Note that in addition to the data shown in FIG. 17, the main memory has stored therein data to be used in the game such as image data for various objects appearing in the game and sound data.

The game program 100 is partially or entirely read from the optical disc 4 at an appropriate time after the power-on of the game apparatus 3, and then stored to the main memory. Note that the game program 100 may be acquired from the flash memory 17 or a device external to the game apparatus 3 (e.g., via the Internet), rather than from the optical disc 4. Also, a portion of the game program 100 (e.g., a program for calculating the attitude of the controller 5 and/or the attitude of the terminal device 7) may be prestored in the game apparatus 3.

The controller operation data 101 is data representing the user's (player's) operation on the controller 5, and is outputted (transmitted) by the controller 5 on the basis of an operation on the controller 5. The controller operation data 101 is transmitted by the controller 5, acquired by the game apparatus 3, and then stored to the main memory. The controller operation data 101 includes main operation button data 102, main acceleration data 103, angular rate data 104, marker coordinate data 105, sub-stick data 106, sub-operation button data 107, and sub-acceleration data 108. Note that the game apparatus 3 is capable of communicating with four controllers and acquiring operation data from one to four controllers 5, but in the present example embodiment, the game apparatus 3 is assumed to acquire operation data from two controllers. That is, in the present example embodiment, controller operation data 101 transmitted separately by two controllers 5 is stored to the main memory. For each of the two controllers 5, the main memory may have stored therein the controller operation data up to a predetermined number of pieces counted from the latest piece (the last acquired piece).

The main operation button data 102 is data representing an input state of each of the operation buttons 32a to 32i provided on the main controller 8. Concretely, the main operation button data 102 represents whether the operation buttons 32a to 32i have been pressed or not.

The main acceleration data 103 is data representing acceleration (acceleration vector) detected by the acceleration sensor 37 of the main controller 8. Here, the main acceleration data 103 represents three-dimensional acceleration whose components are acceleration values associated with the directions of three axes, X-, Y-, and Z-axes, shown in FIG. 3, but in another example embodiment, the data may represent acceleration associated with any one or more directions.

The angular rate data 104 is data representing angular rates detected by the gyroscope 48 of the main controller 8. Here, the angular rate data 104 represents angular rates about three axes, X-, Y-, and Z-axes, shown in FIG. 3, but in another embodiment, the data may represent an angular rate about each of any one or more axes.

The marker coordinate data 105 is data representing a coordinate point calculated by the image processing circuit 41 of the imaging information calculation section 35, i.e., the data represents the marker coordinate point. The marker coordinate point is expressed by a two-dimensional coordinate system for representing a position in a plane that corresponds to a pickup image, and the marker coordinate data 105 represents coordinate values in the two-dimensional coordinate system.

The sub-stick data 106 is data representing an operation on the analog joystick 81 of the sub-controller 9. Concretely, the sub-stick data 106 represents the direction and the amount of tilt with respect to the analog stick 81.

The sub-operation button data 107 is data representing an input state of each of the operation buttons provided on the sub-controller 9. Concretely, the sub-operation button data 107 represents whether the operation buttons have been pressed or not.

The sub-acceleration data 108 is data representing acceleration (acceleration vector) detected by the acceleration sensor 83 of the sub-controller 9. Here, the sub-acceleration data 108 represents three-dimensional acceleration whose components are acceleration values associated with the directions of three axes, x'-, y'-, and z'-axes, shown in FIG. 7, but in another example embodiment, the data may represent acceleration associated with any one or more directions.

Note that the controller operation data 101 may include only part of the data items 102 to 108 so long as the operation by the player manipulating the controller 5 can be represented. In addition, when the controller 5 includes other input means (e.g., a touch panel, an analog stick, etc.), the controller operation data 101 may include data representing operations on those other input means. Note that in the case where the attitude of the controller 5 itself is used as a game operation as in the present example embodiment, the controller operation data 101 includes data whose value changes in accordance with the attitude of the controller 5, as in the case of the main acceleration data 103, the angular rate data 104, the marker coordinate data 105, and the sub-acceleration data 108.

Furthermore, although not shown because the terminal device 7 is not used as an operating device in the present example embodiment, terminal operation data representing the player's operation on the terminal device 7 may be acquired and stored to the main memory.

Figure 18:
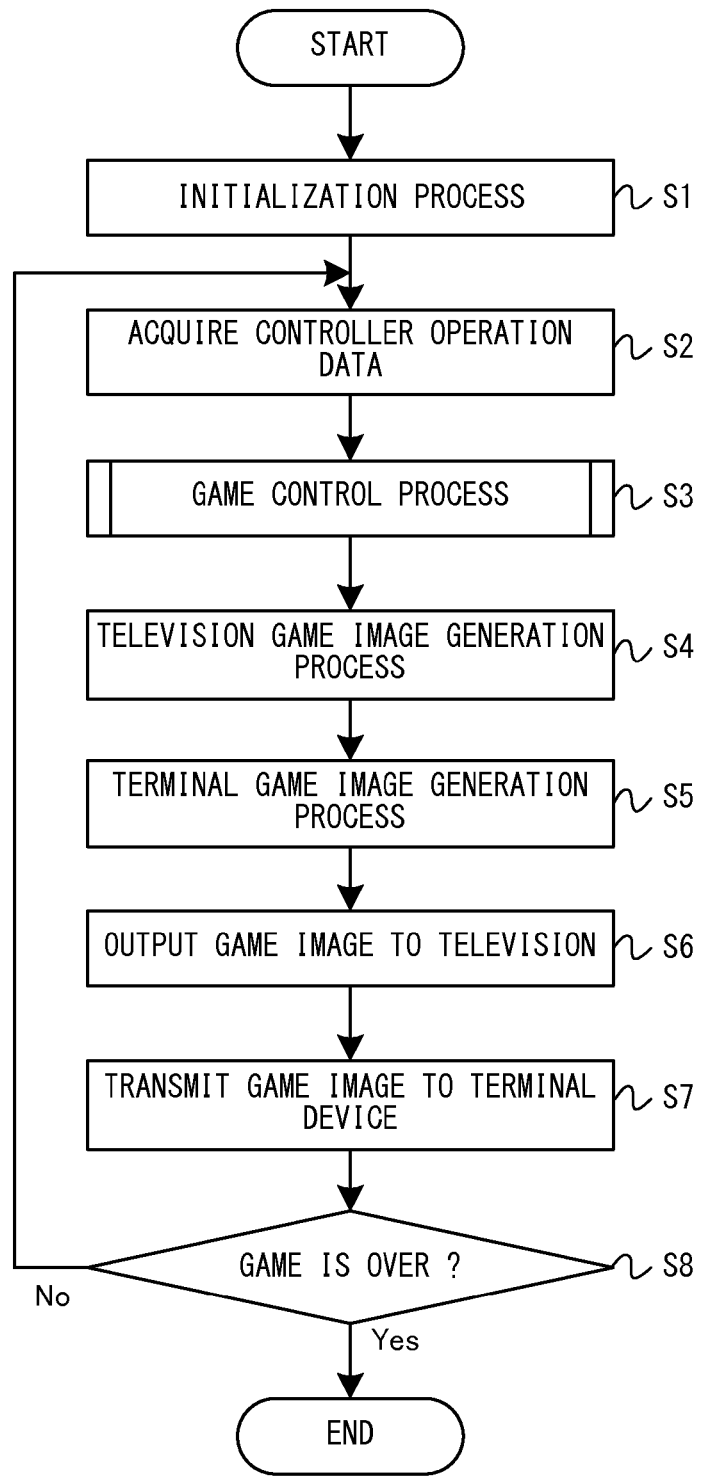
FIG. 18 is a main flowchart illustrating a flow of an example game process to be performed by the game apparatus 3.

The process data 110 is data to be used in the game process to be described later (FIG. 18). The process data 110 includes first attitude data 111, second attitude data 112, first object data 113, second object data 114, first shooting direction data 115, second shooting direction data 116, first camera data 117, and second camera data 118. Note that in addition to the data shown in FIG. 17, the process data 110 includes various types of data to be used in the game process, e.g., data representing various parameters being set for various objects appearing in the game.

Each of the attitude data 111 and 112 is data representing the attitude of the controller 5 (more precisely, the main controller 8). Specifically, the first attitude data 111 represents the attitude of the first controller 5a, and the second attitude data 112 represents the attitude of the second controller 5b. For example, the attitude of the controller 5 may be expressed by a rotation matrix representing a rotation from a predetermined reference attitude to the current attitude of the controller 5 or may be expressed by a three-dimensional vector or three angles. Moreover, in the present example embodiment, an attitude in a three-dimensional space is used as an attitude of the controller 5, but in another example embodiment, an attitude in a two-dimensional plane may be used. Each of the attitude data 101 and 102 is calculated on the basis of main acceleration data 103, angular rate data 104, and marker coordinate data 105 included in controller operation data 101 from its corresponding controller 5. The method for calculating the attitude of the controller 5 will be described later in conjunction with step S12.

The object data represents various information being set for the objects 91 and 93 (here, their positions and directions in the game space). Specifically, the first object data 113 represents the position and the direction of the first object 91, and the second object data 114 represents the position and the direction of the second object 93. In the present example embodiment, the positions of the objects 91 and 93 are calculated on the basis of the sub-stick data 106 from their corresponding controllers 5.

The shooting direction data 115 and 116 represent the shooting directions (attitudes) of the crossbows 92 and 94 held by the objects 91 and 93. Specifically, the first shooting direction data 115 represents the shooting direction of the crossbow 92 held by the first object 91, and the second shooting direction data 116 represents the shooting direction of the crossbow 94 held by the second object 93. In the present example embodiment, the shooting directions of the crossbows 92 and 94 are calculated on the basis of the attitudes of the main controllers 8 included in their corresponding controllers 5 (i.e., on the basis of the attitude data 101 and 102).

The camera data 117 and 118 represent the positions and attitudes of the virtual cameras being set in the game space. Specifically, the first camera data 117 represents the position and the attitude of the first virtual camera, and the second camera data 118 represents the position and the attitude of the second virtual camera. In the present example embodiment, the positions and the attitudes of the virtual cameras are set on the basis of the positions of the objects 91 and 93.

Next, the game process to be performed by the game apparatus 3 will be described in detail with reference to FIGS. 18 to 20. FIG. 18 is a main flowchart illustrating a flow of the game process to be performed by the game apparatus 3. When the game apparatus 3 is powered on, the CPU 10 of the game apparatus 3 executes a boot program stored in an unillustrated boot ROM, thereby initializing each unit, including the main memory. The game program stored in the optical disc 4 is loaded to the main memory, and the CPU 10 starts executing the game program. The flowchart shown in FIG. 18 illustrates a process to be performed after completion of the process described above. Note that the game apparatus 3 may be configured such that the game program is executed immediately after the power-on or such that an internal program for displaying a predetermined menu screen is initially executed after the power-on and then the game program is executed when the user provides an instruction to start the game.

Figure 19:
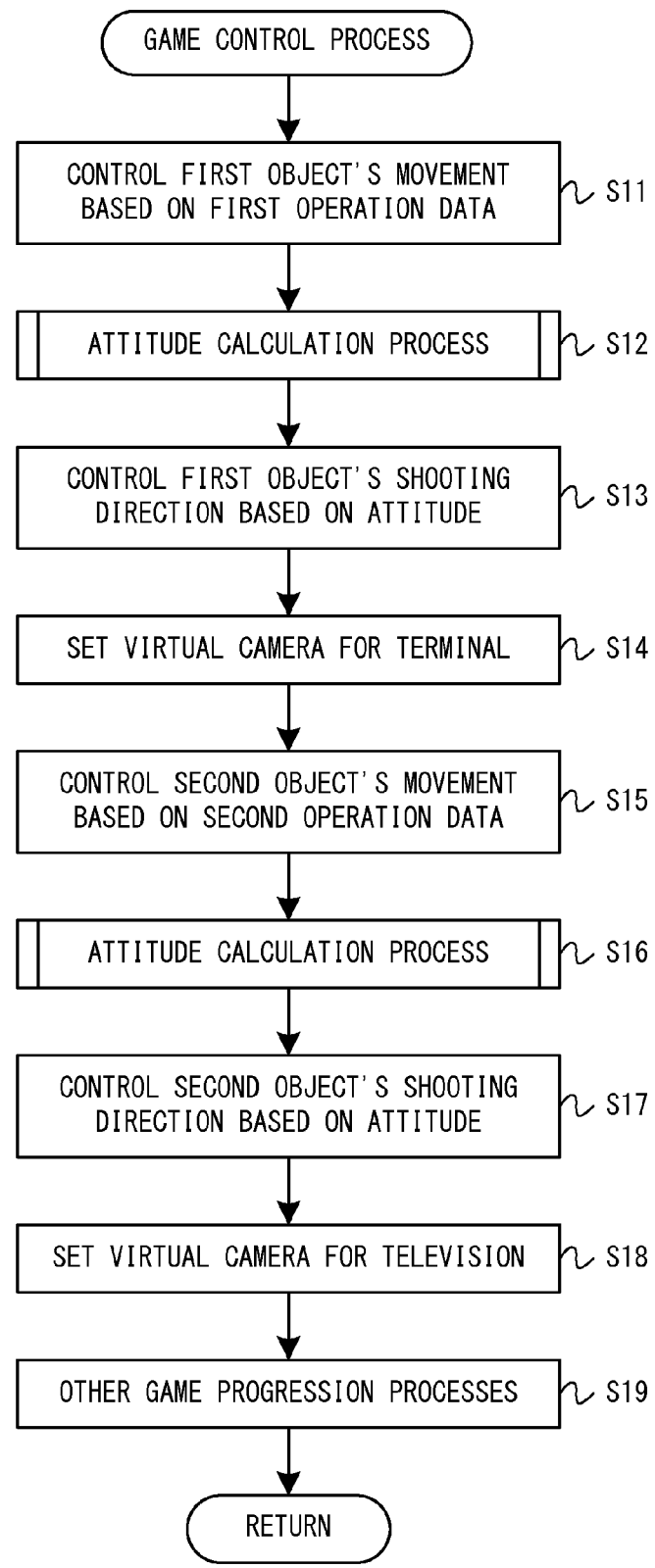
FIG. 19 is a flowchart illustrating a detailed flow of an example game control process (step S3) shown in FIG. 18.
Figure 20:
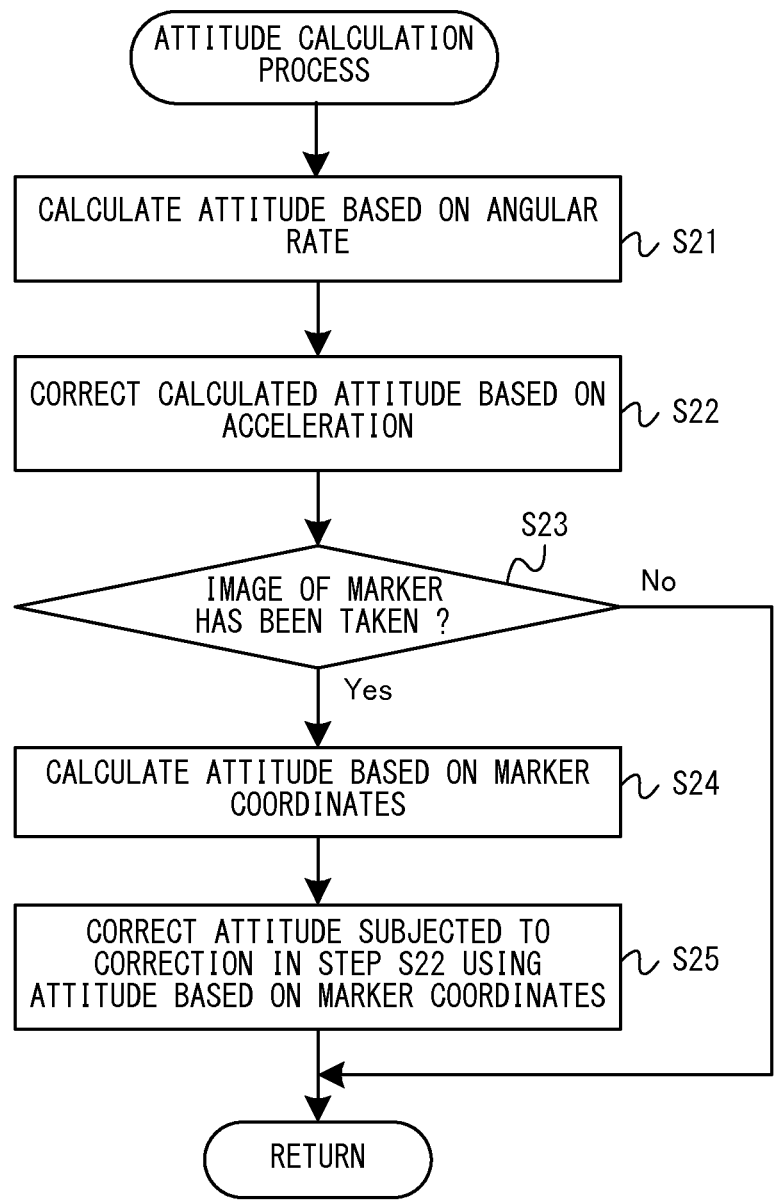
FIG. 20 is a flowchart illustrating a detailed flow of an example attitude calculation process (step S12) shown in FIG. 19.

Note that processing in each step of the flowcharts shown in FIGS. 18 to 20 is merely illustrative, and if similar results can be achieved, the processing order of the steps may be changed. In addition, values of variables and thresholds to be used in determination steps are also merely illustrative, and other values may be used appropriately. Furthermore, while the present example embodiment is described on the premise that the CPU 10 performs processing in each step of the flowcharts, part of the steps in the flowcharts may be performed by a processor other than the CPU 10 or by specialized circuits.

First, in step S1, the CPU 10 performs an initialization process. The initialization process is, for example, a process of constructing a virtual game space, placing objects appearing in the game space at their initial positions, and setting initial values of various parameters to be used in the game process. Note that in the present example embodiment, the objects 91 and 93 are arranged at predetermined positions and in predetermined directions. Specifically, data representing the position and the direction of the first object 91 is stored to the main memory as first object data 113, and data representing the position and the direction of the second object 93 is stored to the main memory as second object data 114. In addition, the virtual cameras (the first and second virtual cameras) are set in initial positions and initial attitudes in accordance with the positions of the objects 91 and 93, respectively. Data representing the initial position and the initial attitude of the first virtual camera is stored to the main memory as first camera data 117, and data representing the initial position and the initial attitude of the second virtual camera is stored to the main memory as second camera data 118. Following step S1, the process of step S2 is performed. Thereafter, a process loop including a series of processes of steps S2 to S8 is repeatedly performed once per a predetermined period of time (e.g., one frame period or 1/60 of a second).

In step S2, the CPU 10 acquires controller operation data from the two controllers 5. Here, each of the controllers 5 repeats transmitting the controller operation data to the game apparatus 3, and therefore the controller communication module 19 of the game apparatus 3 sequentially receives the controller operation data, and the received controller operation data is sequentially stored to the main memory by the input/output processor 11a. The controllers 5 and the game apparatus 3 may transmit/receive the data at intervals of, for example, 1/200 of a second, which is shorter than time periods taken for processing in the game. In step S2, the CPU 10 reads the latest controller operation data 101 from the main memory. Following step S2, the process of step S3 is performed.

In step S3, the CPU 10 performs a game control process. The game control process is a process for causing the game to progress by performing, for example, the processing of moving objects in the game space in accordance with the players game operations. Concretely, in the game control process of the present example embodiment, for example, the movement of the objects 91 and 93 is controlled and the virtual cameras are controlled. Hereinafter, referring to FIG. 19, the game control process will be described in detail.

FIG. 19 is a flowchart illustrating a detailed flow of the game control process (step S3) shown in FIG. 18. In the game control process, the CPU 10 initially in step S11 controls the movement of the first object 91. The movement of the first object 91 is controlled on the basis of operation data (first operation data) for the first controller manipulated by the first player. Concretely, the first object 91 moves to be in front of the second object 93 in accordance with a direction inputted with the analog joystick 81. Specifically, the first object 91 moves forward or backward with respect to the second object 93 in accordance with an up or down direction inputted with the analog joystick 81. Moreover, the first object 91 rotationally moves about the second object 93 to the left or to the right in accordance with a left or right direction inputted with the analog joystick 81. As a result, the second object 93 is positioned in front of the first object 91, which makes it easy to aim at the second object 93 with the crossbow 92. Note that in another example embodiment, any method can be employed to control the movement of the first object 91, and the movement of the first object 91 may be controlled regardless of the position of the second object 93.

Concretely, in the process of step S11 the CPU 10 reads the object data 113 and 114 from the main memory, and calculates a new position and direction of the first object 91 on the basis of the sub-stick data 106, which is read in step S2, the position and the direction of the first object 91, and the position of the second object 93. Data representing the new position and direction is stored to the main memory as first object data 113. Following step S11, the process of step S12 is performed.

In step S12, the CPU 10 performs an attitude calculation process. The attitude calculation process of step S12 is a process for calculating the attitude of the first controller (main controller 8) on the basis of physical quantities for attitude calculation, which are included in the operation data for the controller. Note that in the present example embodiment, the physical quantities for attitude calculation include an angular rate detected by the gyroscope 48, acceleration detected by the acceleration sensor 37, and marker coordinates calculated by the imaging information calculation section 35. Hereinafter, referring to FIG. 20, the attitude calculation process will be described in detail.

FIG. 20 is a flowchart illustrating a detailed flow of the attitude calculation process (step S12) shown in FIG. 19. Note that the attitude calculation process of step S12 and the attitude calculation process of step S16 to be described later are basically the same attitude calculation methods, except that the former calculates the attitude of the first controller and the latter calculates the attitude of the second controller. Accordingly, in the following, the attitude calculation process will be described without distinguishing between the first controller and the second controller.

Initially, in step S21, the CPU 10 calculates the attitude of the controller 5 on the basis of the angular rate data 104. Any method can be employed to calculate an attitude based on an angular rate, but the attitude is calculated using the last attitude (the last calculated attitude) and the current angular rate (an angular rate acquired in step S2 of the current process loop). Concretely, the CPU 10 calculates the attitude by rotating the last attitude at the current angular rate for a unit time. Note that the last attitude is represented by the first attitude data 111 stored in the main memory, and the current angular rate is represented by the angular rate data 104 stored in the main memory. Accordingly, the CPU 10 reads the first attitude data 111 and the angular rate data 104 from the main memory, and calculates the attitude of the controller 5. Data representing the attitude thus calculated is stored to the main memory. Following step S21, the process of step S22 is performed.

Note that in the case where the attitude is calculated from an angular rate in step S21, an initial attitude is determined beforehand. Specifically, in the case where the attitude of the controller 5 is calculated from an angular rate, the CPU 10 sets an initial attitude of the controller 5 in advance. The initial attitude of the controller 5 may be calculated on the basis of the main acceleration data 103. Alternatively, the player may be caused to perform a predetermined operation on the controller 5 being set in a specific attitude, and the specific attitude may be set as the initial attitude at the time of the predetermined operation. Note that in the case where the attitude of the controller 5 is calculated as an absolute attitude with respect to a predetermined direction in the space, the initial attitude is calculated, but, for example, in the case where the attitude of the controller 5 is calculated as a relative attitude with respect to the attitude of the controller 5 at the start of the game, the initial attitude is not calculated.

In step S22, the CPU 10 corrects the attitude calculated in step S21 on the basis of the acceleration of the controller 5. Here, when the controller 5 is in almost static state, acceleration applied to the controller 5 corresponds to gravitational acceleration. That is, in this state, the acceleration vector represented by the main acceleration data 103 for the controller 5 indicates the direction of gravity of the controller 5. Accordingly, the CPU 10 performs correction to cause the downward direction (the direction of gravity) of the controller 5 in the attitude calculated in step S21 to approach the direction of gravity represented by the acceleration vector. Specifically, the attitude is rotated such that the downward direction approaches the direction of gravity represented by the acceleration vector at a predetermined rate. As a result, the attitude based on the angular rate can be corrected to be an attitude that takes the direction of gravity based on acceleration into consideration. Note that the predetermined rate may be a fixed value or may be set in accordance with detected acceleration or suchlike. For example, when the magnitude of the detected acceleration is close to the gravitational acceleration, the CPU 10 may increase the rate at which the downward direction of the controller 5 in the calculated attitude approaches the direction of gravity represented by the acceleration vector, and when the magnitude of the detected acceleration is away from the gravitational acceleration, the rate may be decreased.

Concretely, in the process of step S22, the CPU 10 reads data representing the attitude calculated in step S21 from the main memory, along with the main acceleration data 103, and then performs the aforementioned correction. Thereafter, data representing the corrected attitude is stored to the main memory. Following step S22, the process of step S23 is performed.

In step S23, the CPU 10 determines whether or not an image including markers (the markers 55a and 55b of the marker section 55 provided in the terminal device 7 or the markers 6R and 6L, of the marker device 6) has been picked up by the image pickup means (image pickup element 40) of the controller 5. The determination of step S23 can be made with reference to the marker coordinate data 105 stored in the main memory in association with the controller 5. Here, when the marker coordinate data 105 represents two marker coordinate points, an image including the markers is determined to have been picked up, and when the marker coordinate data 105 represents only one marker coordinate point or no marker coordinate point, no image including the markers is determined to have been picked up. When the result of the determination of step S23 is affirmative, the processes of subsequent steps S24 and S25 are performed. On the other hand, when the result of the determination of step S23 is negative, the processes of steps 24 and S25 are skipped, and the CPU 10 ends the attitude calculation process. In this manner, when an image including the markers is not picked up by the image pickup element 40, the attitude of the controller 5 (the attitude based on the marker coordinate points) cannot be calculated using data acquired from the image pickup element 40, and therefore, in such a case, no correction is performed using the attitude.

In step S24, the CPU 10 calculates the attitude of the controller 5 on the basis of the marker coordinate points. The marker coordinate points indicate the positions of the two markers (the markers 6L and 6R or the markers 55A and 55B) in the pickup image, and therefore, the attitude of the controller 5 can be calculated from these positions. Hereinafter, the method for calculating the attitude of the controller 5 on the basis of the marker coordinate points will be described. Note that in the following, roll, yaw, and pitch directions refer to directions of rotation of the controller 5 about Z-, Y-, and X-axes where the controller 5 is in a state (reference state) such that its imaging direction (positive Z-axis direction) points at any of the markers.

Initially, the attitude can be calculated for the roll direction (the direction of rotation about Z-axis) on the basis of the slope of a straight line extending between the two marker coordinate points in the pickup image. Specifically, when the attitude is calculated for the roll direction, the CPU 10 initially calculates a vector extending between the two marker coordinate points. This vector changes its direction in accordance with the rotation of the controller 5 in the roll direction, and therefore, the CPU 10 can calculate the attitude for the roll direction on the basis of the vector. For example, the attitude for the roll direction may be calculated as a rotation matrix for rotating a vector for a predetermined attitude to the current vector, or may be calculated as an angle between a vector for a predetermined attitude and the current vector.

Furthermore, in the case where the position of the controller 5 is assumed to be generally constant, the attitude of the controller 5 can be calculated for both the pitch direction (the direction of rotation about the X-axis) and the yaw direction (the direction of rotation about the Y-axis) on the basis of the positions of the marker coordinate points in the pickup image. Concretely, the CPU 10 first calculates the position of a midpoint between the two marker coordinate points. Specifically, in the present example embodiment, the midpoint position is used as the position of any of the markers in the pickup image. Next, the CPU 10 performs correction to rotate the midpoint about the center of the pickup image (in an opposite direction to the direction of rotation of the controller 5) by an angle of rotation of the controller 5 in the roll direction. In other words, the midpoint is rotated about the center of the pickup image, such that the vector is directed horizontally.

From the midpoint position thus corrected, the attitude of the controller 5 can be calculated for both the yaw direction and the pitch direction. Specifically, in the reference state, the corrected midpoint position lies at the center of the pickup image. Moreover, the corrected midpoint position moves from the center of the pickup image in an opposite direction to the direction of change in the attitude of the controller 5 from the reference state, by an amount corresponding to the amount of the change. Accordingly, the direction and the amount (angle) of the change in the attitude of the controller 5 from the reference state are calculated on the basis of the direction and the amount of the change of the corrected midpoint position with respect to the center of the pickup image. Moreover, the yaw direction and the pitch direction of the controller 5 correspond to the horizontal direction and the vertical direction, respectively, of the pickup image, and therefore, the attitude can be calculated individually for the yaw direction and the pitch direction.

Note that in the case of the game system 1, since players take various positions to play the game (e.g., they stand or sit) and markers also take various positions (e.g., the marker device 6 is positioned on or under the television 2), the assumption that the position of the controller 5 is generally constant might not be valid for the vertical direction. Specifically, in the present example embodiment, the attitude might not be calculated accurately for the pitch direction, and therefore, for the pitch direction, the CPU 10 does not calculate an attitude on the basis of the marker coordinate points, and uses the attitude corrected in step S22.

Thus, in step S24, the CPU 10 reads the marker coordinate data 105 from the main memory, and calculates the attitude for both the roll direction and the yaw direction on the basis of the two marker coordinate points. In addition, the CPU 10 reads data representing the attitude corrected in step S22, and extracts the attitude for the pitch direction. Note that when the attitude is calculated for each direction as a rotation matrix, for example, the attitude of the controller 5 can be obtained by performing integration of rotation matrices corresponding to the directions. Data representing the calculated attitude is stored to the main memory. Following step S24, the process of step S25 is performed.

Note that in the present example embodiment, the CPU 10 calculates the attitude for the roll direction and the yaw direction on the basis of the marker coordinate points, and does not correct the attitude for the pitch direction using the marker coordinate points. However, in another example embodiment, the CPU 10 may calculate the attitude for the pitch direction on the basis of the marker coordinate points in the same manner as the yaw direction, and correct the attitude for the pitch direction using the marker coordinate points.

In step S25, the CPU 10 corrects the attitude based on the angular rate using the attitude based on the marker coordinate points. Concretely, the CPU 10 reads data representing the attitude corrected in step S22 (i.e., the attitude based on the angular rate) and data representing the attitude calculated in step S24 (i.e., the attitude based on the marker coordinate points) from the main memory, and performs correction such that the attitude based on the angular rate approaches the attitude based on the marker coordinate points at a predetermined rate. The predetermined rate is, for example, a fixed value. Data representing the corrected attitude thus obtained is stored to the main memory as new first attitude data 111 (or second attitude data 112). That is, the attitude data 111 and 112 after the correction in step S25 are used in subsequent processes as the final attitudes of the first and second controllers. After step S25, the CPU 10 ends the attitude calculation process.

In the attitude calculation process, the CPU 10 corrects the attitude of the controller 5, which is calculated on the basis of the angular rate data 104, using the main acceleration data 103 and the marker coordinate data 105. Here, of the methods for calculating the attitude of the controller 5, the method that uses the angular rate can calculate the attitude however the controller 5 is moving. On the other hand, the method that uses the angular rate calculates the attitude by cumulatively adding angular rates that are sequentially detected, and therefore, there is a possibility of poor accuracy due to, for example, error accumulation or poor accuracy of the gyroscope 48 due to a so-called temperature drift problem. Also, the method that uses acceleration does not cause error accumulation, but when the controller 5 is being moved vigorously, the attitude cannot be calculated with accuracy (because the direction of gravity cannot be detected with precision). Moreover, the method that uses the marker coordinate points can calculate the attitude with accuracy (particularly for the roll direction), but the attitude cannot be calculated when an image including the markers cannot be picked up. On the other hand, in the present example embodiment, the aforementioned three characteristically different methods are used, and therefore the attitude of the controller 5 can be calculated with higher precision. Note that in another example embodiment, the attitude may be calculated using one or two of the three methods.

Returning to the description of FIG. 19, in step S13 following step S12, the CPU 10 controls the shooting direction of the crossbow 92 held by the first object 91 (i.e., the attitude of the crossbow 92) on the basis of the attitude of the first controller. In the present example embodiment, the attitude of the crossbow 92 is calculated so as to correspond to the attitude of the first controller in the real space. Specifically, when the first controller is rotated from its predetermined reference attitude, the crossbow 92 is rotated from its attitude corresponding to the reference attitude in a direction corresponding to the direction of change in the attitude of the first controller by an amount corresponding to the amount of the change. Note that the attitude of the crossbow 92 may be controlled arbitrarily so long as it changes in accordance with the change in the attitude of the first controller. In step S13, the CPU 10 reads the first attitude data 111 from the main memory, and calculates the attitude of the crossbow 92 on the basis of the attitude of the first controller. Thereafter, data representing the calculated attitude is stored to the main memory as first shooting direction data 115. Following step S13, the process of step S14 is performed.

In step S14, the CPU 10 sets a first virtual camera for generating a terminal game image. In the present example embodiment, the first virtual camera is set on the basis of the positions of the first object 91 and the second object 93. Concretely, the first virtual camera is positioned behind and slightly above the first object 91 at a predetermined distance therefrom. In addition, the first virtual camera is set to be directed from the first object 91 toward the second object 93. However, if the first virtual camera is always oriented in such a direction with precision, the second object 93 is always positioned right in front thereof, which renders shooting operations extremely easy. Therefore, when the first object 91 moves to the right or left, the attitude of the first virtual camera may be controlled to be directed to a position slightly to the right or left of the second object 93. In step S14, the CPU 10 reads the object data 113 and 114 from the main memory, and calculates the position and the attitude of the first virtual camera. Then, data representing the calculated position and attitude is stored to the main memory as first camera data 117. Following step S14, the process of step S15 is performed.

In steps S15 to S18, similar processing to that in steps S11 to S14 for the first object 91 is performed on the second object 93. Specifically, in step S15, the CPU 10 controls the movement of the second object 93 on the basis of operation data (second operation data) for the second controller manipulated by the second player. The method for controlling the movement of the second object 93 is the same as the control method in step S11. Data representing the position and direction of the second object 93 calculated in step S14 is stored to the main memory as second object data 114. Following step S15, the process of step S16 is performed.

In step S16, the CPU 10 performs an attitude calculation process. Specifically, the attitude of the second controller (main controller) is calculated on the basis of main acceleration data 103, angular rate data 104, and marker coordinate data 105 included in the second operation data (see FIG. 20). The calculated attitude of the second controller is stored to the main memory as second attitude data 112. Following step S16, the process of step S17 is performed.

In step S17, the CPU 10 controls the shooting direction of the crossbow 94 held by the second object 93 (i.e., the attitude of the crossbow 94) on the basis of the attitude of the second controller. The method for controlling the crossbow 94 is the same as the method for controlling the crossbow 92 in step S13. Data representing the attitude of the crossbow 94 calculated in step S17 is stored to the main memory as second shooting direction data 116. Following step S17, the process of step S18 is performed.

In step S18, the CPU 10 sets a second virtual camera for generating a television game image on the basis of the positions of the first object 91 and the second object 93. Concretely, the second virtual camera is positioned behind and slightly above the second object 93 at a predetermined distance therefrom, and is directed from the second object 93 toward the first object 91. Data representing the position and the attitude of the second virtual camera thus set is stored to the main memory as second camera data 118. Following step S18, the process of step S19 is performed.

In step S19, the CPU 10 performs other game progression processing. The other game progression processing is the processing performed in the game control process of step S3, excluding the processing in steps S11 to S18. For example, the other game progression processing includes processing for controlling the behavior of an arrow shot from the crossbow and determining whether or not the arrow has hit the object 91 or 93. In addition to the aforementioned processing, processing for game progression is appropriately performed in step S19. After step S19, the CPU 10 ends the game control process.

In the present example embodiment, the CPU 10 controls the first virtual camera being set in the game space on the basis of operation data representing an operation on the first controller manipulated by the first player (step S14), as in the game control process. In addition, the CPU 10 controls the second virtual camera being set in the game space on the basis of operation data representing an operation on the second controller manipulated by the second player (step S18). Therefore, the players can change their points of view and line of sight directions in game images by their operations with the controllers 5.

Furthermore, in the present example embodiment, the CPU 10 calculates the attitudes of the controllers on the basis of physical quantities included in the operation data (steps S12 and S16), and performs the game process on the basis of the attitudes of the operating devices (steps S13 and S17). Accordingly, the players can intuitively and readily perform game operations by tilting their controllers. Moreover, in the game control process, the attitudes of the crossbows 92 and 94 change in accordance with changes in the attitudes of the controllers, and therefore, it can be said that the CPU 10 calculates the movement (the changes in the attitudes) of the controllers, and performs the game process on the basis of the movement of the controllers. Thus, the players can intuitively and readily perform game operations by moving their controllers.

Furthermore, in the present example embodiment, the operation data includes imaging data (marker coordinate data) concerning the result of imaging by the image pickup means of the controller 5, and the CPU 10 performs the game process on the basis of the imaging data (step S23). As a result, the CPU 10 can calculate the positional relationship between the marker and the controller 5, which makes it possible to calculate the attitude and the motion of the controller with accuracy.

Furthermore, in another example embodiment, in the game control process, the CPU 10 may specify a position on the screen of the display device (the television 2 or the terminal device 7), and perform the game process in accordance with that position (referred to as the "specified position"). Specifically, the CPU 10 may specify a position on the screen of the terminal device 7 on the basis of the operation data for the first controller manipulated by the first player, and perform a process in accordance with the specified position. In addition, the CPU 10 may specify a position on the screen of the television 2 on the basis of the operation data for the second controller manipulated by the second player, and perform a process in accordance with the specified position.

Furthermore, in the game process in accordance with the specified position, by displaying a cursor at the specified position, the CPU 10 may cause the object 91 or 93 to perform a shooting action toward the position identified by the cursor, or may select a target identified by the cursor. Note that the specified position can be calculated on the basis of information given by the attitude of the terminal device 7 or the marker coordinate data. Specifically, from such information, it is possible to calculate (estimate) the position of an intersection between the screen of the display device and a straight line extending from the controller 5 in the imaging direction (the positive Z-axis direction), and therefore the position of the intersection can be used as the specified position. Note that the CPU 10 does not always accurately calculate the position of the intersection as the specified position, and a position around the position of the intersection is adequately calculated. Moreover, in another example embodiment, the specified position may be calculated so as to change in accordance with the attitude or the motion of the controller 5, or an input with the controller 5 (e.g., an input as to a direction with the cross button 32a), regardless of the position of the intersection.

Note that by allowing the game process using the specified position, the player can intuitively and readily perform the game operation by simply specifying a position on the screen of the display device. Here, the number of divisions in the display area (screen) of the display device increases, the range for position specification is narrowed, which makes it difficult to perform the operation of specifying a position on the screen. On the other hand, in the present example embodiment, the number of divisions in the display area can be reduced, making it easy to perform the operation of specifying a position on the screen. That is, in the case where the operation of specifying a position on the screen is employed, any feature for reducing the number of divisions is useful.

Returning to the description of FIG. 18, the process of step S4 is performed after the game control process of step S3. In step S4, a television game image, which is a game image for the second player, is generated on the basis of the game control process. Specifically, the CPU 10 and the GPU 11b collaborate to read data representing the result for the game control process in step S3 from the main memory and also data for use in generating the game image from the VRAM 11d, and generate the television game image. In the present example embodiment, an image representing the game space is generated using the second virtual camera, which is set to include the second object 93 within a display range. In this case, the television game image is generated with the second object 93 being translucent. The generated television game image is stored to the VRAM 11d. Following step S4, the process of step S5 is performed.

In step S5, a terminal game image, which is a game image for the first player, is generated on the basis of the game control process. Specifically, the CPU 10 and the CPU 11b collaborate to read data representing the result for the game control process of step S3 from the main memory and also data for use in generating the game image from the VRAM 11d, and generate the terminal game image. In the present example embodiment, an image representing the game space is generated using the first virtual camera, which is set to include the first object 91 within a display range. In this case, the terminal game image is generated with the first object 91 being translucent. The generated terminal game image is stored to the VRAM 11d. Following step S5, the process of step S6 is performed.

In step S6, the CPU 10 outputs the game image to the television 2. Concretely, the CPU 10 sends data for the television game image stored in the VRAM 11d to the AV-IC 15. In response to this, the AV-IC 15 outputs the data for the television game image to the television 2 via the AV connector 16. As a result, the television game image is displayed on the television 2. Moreover, in step S6, game sound data, along with game image data, may be outputted to the television 2, so that game sound is outputted by the speakers 2a of the television 2. Following step S6, the process of step S7 is performed.

In step S7, the CPU 10 transmits the game image to the terminal device 7. Concretely, the image data for the terminal game image stored in the VRAM 11*d* is sent to the codec LSI 27 by the CPU 10, and subjected to a predetermined compression process by the codec LSI 27. The terminal communication module 28 transmits the image data subjected to the compression process to the terminal device 7 via the antenna 29. The image data transmitted by the game apparatus 3 is received by the wireless module 70 of the terminal device 7, and subjected to a predetermined decompression process by the codec LSI 66. The image data subjected to the decompression process is outputted to the LCD 51. As a result, the terminal game image is displayed on the LCD 51. Moreover, in step S7, game sound data, along with game image data, may be outputted to the terminal device 7, so that game sound may be outputted by the speakers 67 of the terminal device 7. Following step S7, the process of step S8 is performed.

In step S8, the CPU 10 determines whether or not to end the game. The determination of step S8 is made on the basis of, for example, whether or not the game is over (either object has been defeated) or the player has provided an instruction to cancel the game. When the result of the determination of step S8 is negative, the process of step S2 is performed again. On the other hand, when the result of the determination of step S8 is affirmative, the CPU 10 ends the game process shown in FIG. 18. Thereafter, a series of processes of steps S2 to S8 are repeated until a determination to end the game is made in step S8.

In the game process described above with respect to the game to be played between two players, the terminal device 7 displays a game image for the first player, and the television 2 displays a game image for the second player. Thus, it is possible to provide game images that can be readily viewed by the players without dividing the display area of a display device.

7. Variants

The above example embodiment is merely illustrative, and in another example embodiment, a game system can be carried out with, for example, a configuration as will be described below.

(First Variant Related to the Content of the Game)

Figure 21:
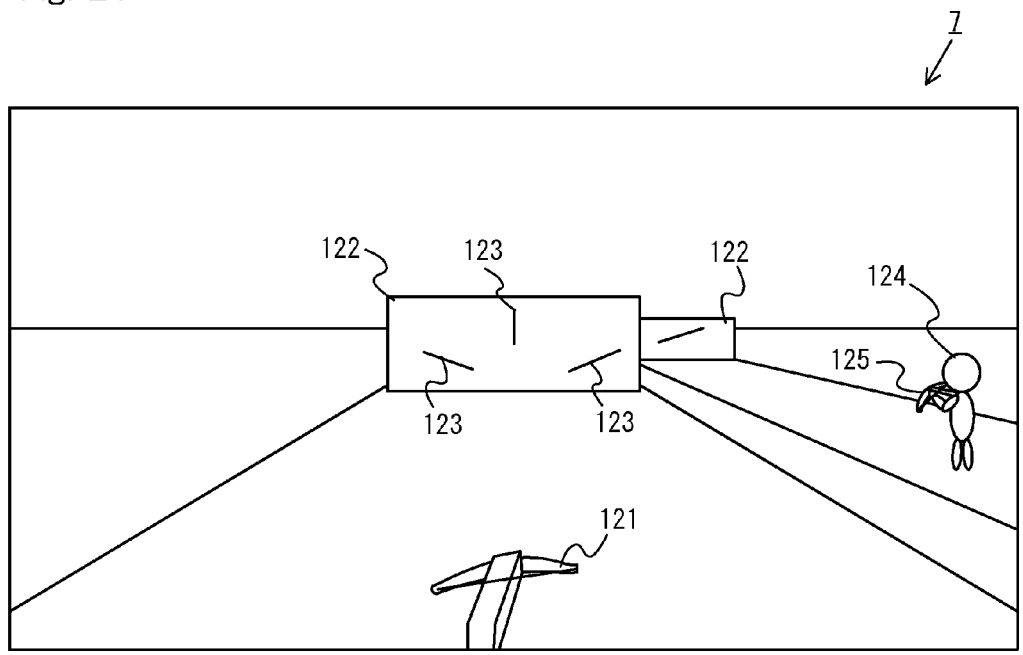
FIG. 21 is a diagram illustrating an example terminal game image in a first variant of the present example embodiment.
Figure 22:
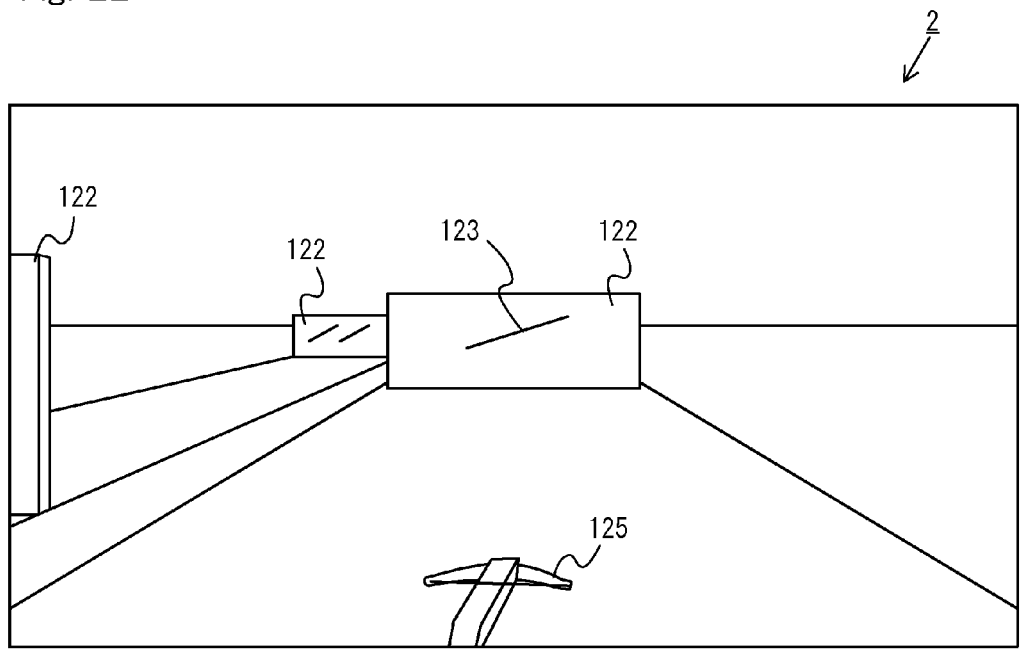
FIG. 22 is a diagram illustrating an example television game image in the first variant.

The above example embodiment has been described with respect to an exemplary game where two players manipulate their respective objects to shoot each other's object, but the content of the game is arbitrary. For example, in another example embodiment, the game system 1 may execute a game as shown in FIGS. 21 and 22. FIGS. 21 and 22 are diagrams illustrating exemplary game images in a first variant of the present example embodiment. Specifically, FIG. 21 illustrates an exemplary terminal game image in the first variant, and FIG. 22 illustrates an exemplary television game image in the first variant.

As shown in FIG. 21, the terminal device 7 displays a game space image including a crossbow 121 to be manipulated by a first player, and a wall 122 arranged on a road ahead of the crossbow 121. In this manner, in the first variant, as in the example embodiment, a game image for the first player is displayed on the terminal device 7. Note that in the first variant, the terminal device 7 displays the game image from the point of view of a first object to be manipulated by the first player, and therefore, the first object itself is not displayed on the terminal device 7.

Furthermore, the wall 122 has ropes 123 stretched thereon, and the first player attempts to cut the ropes 123 on the wall 122 by shooting arrows, throwing stars, etc., from the crossbow 121. Once all the ropes 123 on the wall 122 are cut, the wall 122 falls so that the object can move forward. The aim of the game is to compete on the speed of reaching the finish line while taking down a predetermined number of walls 122 arranged on the road for the first object. Note that in the first variant, as in the example embodiment, the attitude (shooting direction) of the crossbow 121 may be controlled in accordance with the attitude of the controller 5.

Note that a road on which a second object to be manipulated by a second player moves is laid out next to the road for the first object. Accordingly, depending of the positional relationship between the objects, the second object 124 may be displayed on the terminal device 7 (see FIG. 21), so that the first player can know the progress of the second object 124.

On the other hand, the television 2 displays a game space image including a crossbow 125 to be manipulated by the second player, and a wall 122 arranged on the road ahead of the crossbow 125, as shown in FIG. 22. In this manner, in the first variant, as in the example embodiment, a game image for the second player is displayed on the television 2. Note that in the first variant, the television 2 displays the game image from the point of view of the second object 124 to be manipulated by the second player, and therefore, the second object itself is not displayed on the television 2. Moreover, as in the case of the first player, the second player attempts to cut ropes 123 on the wall 122 by operating the crossbow 125 to shoot arrows, throwing stars, etc.

In the first variant described above, as in the above example embodiment, the terminal device 7 displays the game image for the first player, and the television 2 displays the game image for the second player. Thus, it is possible to provide game images that can be readily viewed by the players without dividing the display area of a single display device.

(Second Variant Related to the Number of Players)

The above example embodiment has been described with respect to an exemplary game to be played by two players at the same time, but the game system 1 can execute a game to be played by two or more players at the same time. Hereinafter, referring to FIGS. 23 to 26, a second variant will be described where two or more players play the game. Note that the game of the second variant is assumed to be played by two to four players.

Figure 23:
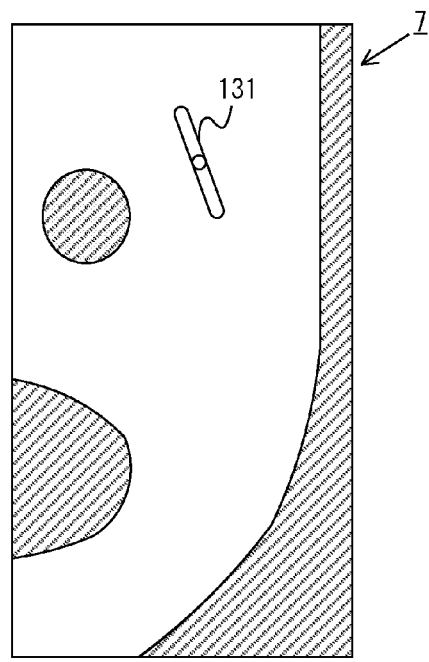
FIG. 23 is a diagram illustrating an example terminal game image in a second variant of the present example embodiment.
Figure 24:
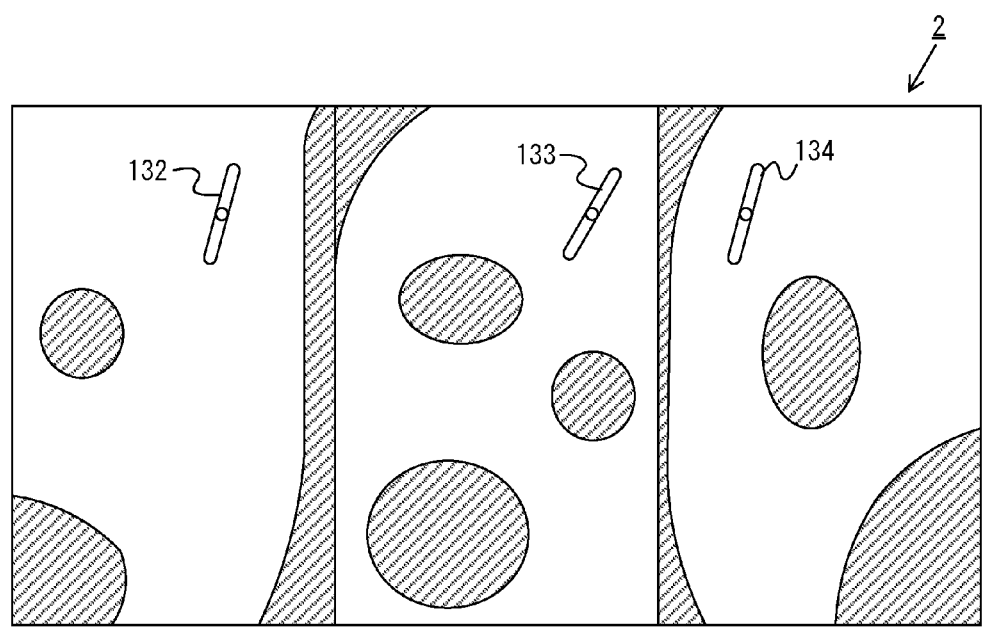
FIG. 24 is a diagram illustrating an example television game image in the second variant.

FIGS. 23 and 24 are diagrams illustrating exemplary game images to be displayed on display devices where the game is played by four players. FIG. 23 shows an exemplary terminal game image in the second variant, and FIG. 24 shows exemplary television game images in the second variant. The second variant will be described with respect to an exemplary game, as shown in FIGS. 23 and 24, where four players manipulate and move first to fourth objects 131 to 134, respectively, while avoiding walls and obstacles, which are hatched in the figures.

The terminal device 7 displays a game image for a predetermined first one of the four players, as shown in FIG. 23. Specifically, the terminal game image is a game space image including the first object 131 to be manipulated by the first player, and having its display range changed (scrolled up or down) in accordance with the first player's manipulation. Moreover, in this game, the objects 131 to 134 move downward in the game images, and the game images are scrolled down in accordance with the movement of the objects 131 to 134. As a result, walls and obstacles appear as if they are scrolling up on the screen. In the second variant, game images for the players are vertically long, and therefore, game images such as those shown in FIGS. 23 and 24 are displayed. Therefore, in the second variant, the terminal device 7 is positioned so as to have a vertically long screen. The terminal device 7 is portable, and therefore can be used both in horizontal placement as in the above example embodiment and in vertical placement as in the second variant.

Furthermore, the television 2 displays game images for the second to fourth of the four players, i.e., the players other than the first player, as shown in FIG. 24. Specifically, the television 2 has its display area divided into three horizontally arranged regions in which game images are displayed respectively for the second, third, and fourth players. Here, a game space image including the second object 132 is displayed in the left region, a game space image including the third object 133 is displayed in the center region, and a game space image including the fourth object 134 is displayed in the right region. In the second variant, since the three game images for the second to fourth players are displayed side by side in the horizontal direction, each of the game images can be vertically long as in the case of the game image on the terminal device 7, which renders it possible to provide game images in the shape suitable for the content of the game.

Furthermore, in the case where the game is played by three players, as in the case of four players, the terminal device 7 displays a game image for a predetermined first player, and the television 2 displays game images for the remaining (two) players. Note that in the case where the game is played by three players, the television 2 has its display area divided into two horizontally arranged regions. The game image for the second player is displayed in the left region of the display area, and the game image for the third player is displayed in the right region. In the case of three players, as in the case of four players, the game images for the players are vertically long, though the ratio of width to height changes.

As described above, in the second variant, game images for three or more players are displayed on two display devices, i.e., the terminal device 7 and the television 2. Specifically, one game image is displayed on the terminal device 7, and the remaining game images are displayed in divided regions in the display area of the television 2. As a result, the number of divisions in the display area of the television 2 can be reduced compared to the case where all game images are displayed only on the television 2. In this manner, by reducing the number of divisions, the possibility can be reduced that a game image for one player would be mistaken for a game image for another player, which makes it possible to reduce the feeling of the screen being narrow when multiple game images are arranged thereon. Thus, the second variant makes it possible to provide players with game images that can be readily viewed even in the case where the game is played by three or more players.

Figure 25:
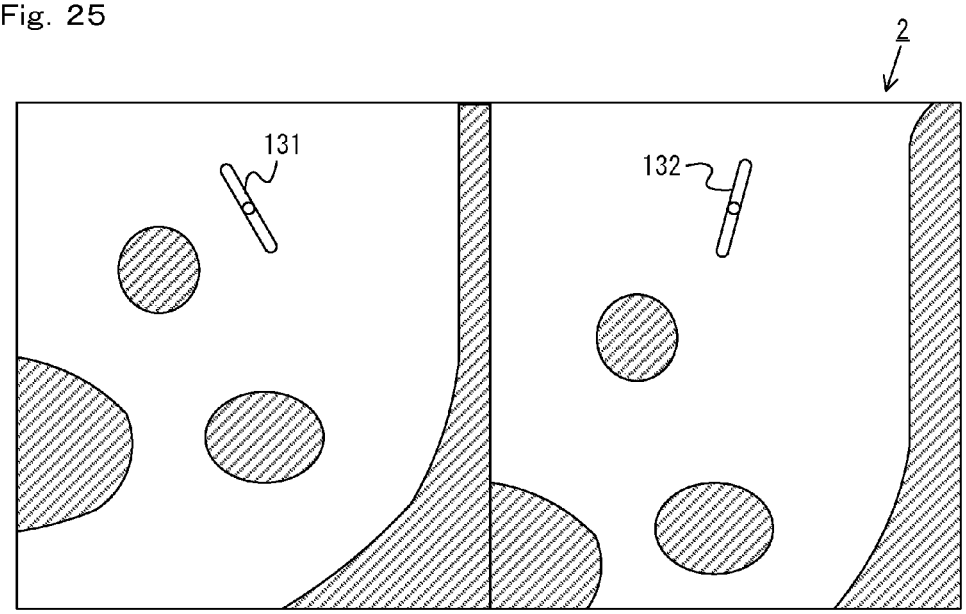
FIG. 25 is a diagram illustrating example television game images in the second variant where the game is played by two players.

Furthermore, in the second variant, in the case where the game is played by two players, the terminal device 7 is not used, and the television 2 displays two game images for the two players. FIG. 25 illustrates exemplary television game images in the second variant where the game is played by two players. As shown in FIG. 25, in the case where the game is played by two players, two game images are displayed in two horizontally arranged regions defined by halving the display area of the television 2. Specifically, a game space image including the first object 131 to be manipulated by the first player is displayed in the left region in the display area of the television 2, and a game space image including the second object 132 to be manipulated by the second player is displayed in the right region.

Here, it is assumed that, in the case where the game is played by two players in the second variant, the game image for the first player is displayed on the terminal device 7, and the game image for the second player is displayed on the television 2. In this case, the television 2 displays a horizontally long game image or displays a vertically long game image with the rest of the display area displaying another image other than the game space (or no image). However, in the second variant, the method which displays horizontally long game images might cause some difficulty in viewing the game images or might cause some advantage/disadvantage over the other player. Moreover, in the case of the method which displays another image in the rest of the display area, the display area of the television 2, which is horizontally long, displays a vertically long game image with the rest of the display area displaying an image having little importance to the progression of the game, which might cause the player to feel the display to be artificial or unnatural.

Therefore, in the second variant, in the case where the game is played by two players, two game images are displayed on the television 2 without using the terminal device 7. As a result, a vertically long game image can be provided to each player, which makes it possible to provide game images that can be readily viewed without unfairness. Moreover, the screen dose not have any useless margin, and therefore can be efficiently utilized, and by displaying an image other than the game space, it is possible to prevent the players from feeling the display to be artificial or unnatural.

Hereinafter, the game process in the second variant will be described in detail, mainly focusing on differences from the above example embodiment. In the second variant, as in the example embodiment, the processes of steps S1 to S8 shown in FIG. 18 are basically performed, but the processes of steps S3 to S5 differ from those in the example embodiment.

Initially, in the game control process of step S3, the processing of, for example, controlling objects (in the case where the game is played by four players, the objects 131 to 134) on the basis of operation data for each controller. Note that any method can be employed for manipulating the objects so long as the manipulation is performed based on the operation data.

Figure 26:
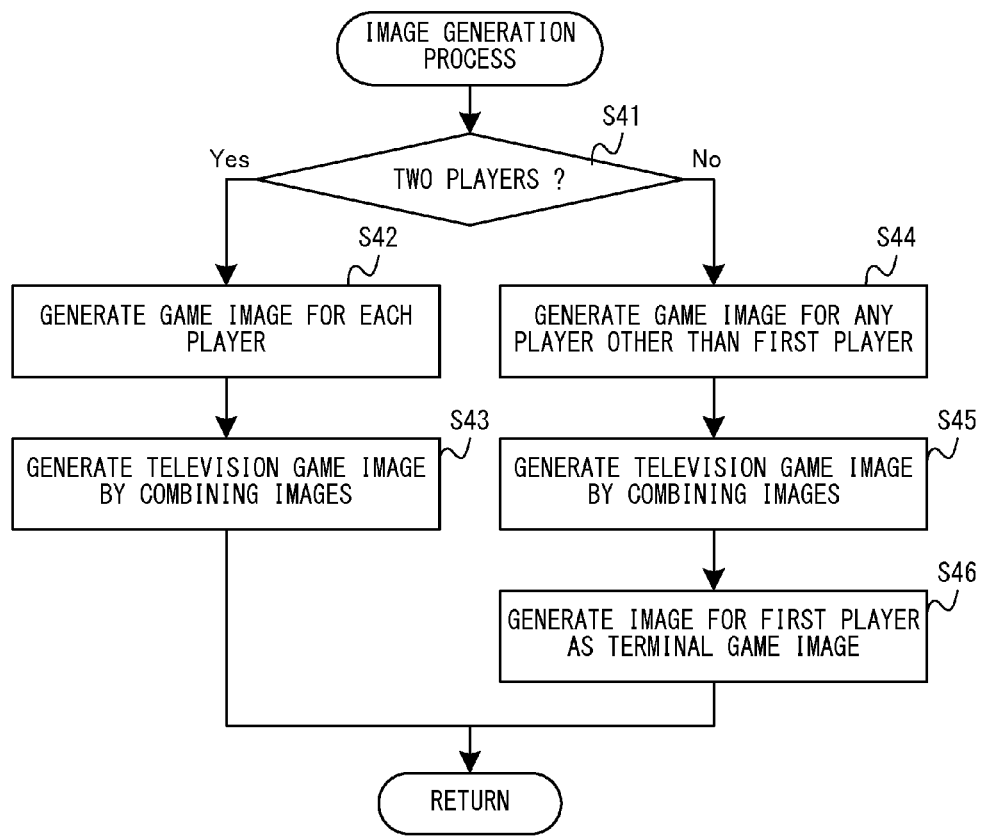
FIG. 26 is a flowchart illustrating a flow of an example image generation process to be performed in the second variant.

Furthermore, in the second variant, an image generation process shown in FIG. 26 is performed in place of the processes of steps S4 and S5 shown in FIG. 18. FIG. 26 is a flowchart illustrating a flow of the image generation process to be performed in the second variant. Hereinafter, referring to FIG. 26, the image generation process will be described in detail.

In the image generation process, the CPU 10 initially in step S41 determines whether or not the game is played by two players. This determination can be made on the basis of, for example, whether or not the number of operation data items acquired in step S2 is two or whether or not the number of controllers 5 that are currently in communication therewith is two. Alternatively, the CPU 10 may cause the players to input the number of players at the beginning of the game (e.g., in the process of step S1), and determine whether or not the inputted number is two. When the result of the determination of step S41 is affirmative, the process of step S42 is performed. On the other hand, when the result of the determination of step S41 is negative, the process of step S44 is performed.

In step S42, two game images for the players are generated. Specifically, for each of the objects to be manipulated by the players, the CPU 10 and the GPU 11*b* collaborate to generate a game space image including that object. The specific method for game image generation is arbitrary and may be the same method as in, for example, the example embodiment. The generated game images are stored to the VRAM 11*d*. Following step S42, the process of step S43 is performed.

In step S43, a television game image is generated. The generated television game image includes the two game images generated in step S42. Specifically, the CPU 10 and the GPU 11*b* collaborate to generate an image with the two game images horizontally arranged and store the image to the VRAM 11d. After step S43, the CPU 10 ends the image generation process.

On the other hand, in step S44, a game image is generated for each player other than the first player. Note that the specific method for generating the game images is the same as in step S42 except the ratio of width to height is different. The generated game images are stored to the VRAM 11d. Following step S44, the process of step S45 is performed.

In step S45, another television game image is generated. The generated television game image includes the game images generated in step S44. Specifically, the CPU 10 and the GPU 11b collaborate to generate an image with the game images horizontally arranged and store the image to the VRAM 11d. Note that the image generated in the second variant has three or four vertically long game images arranged side by side. Following step S45, the process of step S46 is performed.

In step S46, a terminal game image is generated. Specifically, the CPU 10 and the GPU 11b collaborate to generate a game image for the first player as a terminal game image. Note that the specific method for generating the game image is the same as in step S42 except the ratio of width to height is different. The generated terminal game image is stored to the VRAM 11d. After step S46, the CPU 10 ends the image generation process.

After the image generation process, the processes of steps S6 to S8 are performed as in the example embodiment. Specifically, in step S6, the television game image generated in step S43 or S45 is outputted to the television 2 and then displayed thereon. In the case where the number of players is two, an image with two game images arranged for the players is displayed on the television 2 (see FIG. 25), and in the case where the number of players is three or more, an image with game images arranged for the players other than the first player is displayed on the television 2 (see FIG. 24 for an example where the number of players is four).

Furthermore, in step S7, the terminal game image generated in step S46 is outputted (transmitted) to the terminal device 7 and then displayed thereon. Note that when the result of the determination of step S41 is negative, no terminal game image is displayed. That is, in the case where the number of players is two, the terminal device 7 displays no game image, and in the case where the number of players is three or more, the terminal device 7 displays the game image for the first player (see FIG. 23).

As described above, in the second variant, in the case where the number of players is three or more, the terminal device 7 displays the game image for the first player, and the television 2 displays an image including the game image for the second player (different from the first player) and the game image for the third player. Thus, the second variant makes it possible to provide each player with a game image that can be readily viewed even if the number of players is three or more.

Furthermore, in the second variant, the CPU 10 determines whether or not the number of players for the game meets a predetermined condition (step S41). When the number of players meets the predetermined condition, the CPU 10 generates a game image for the first player as a terminal game image (step S46). As for television game images, the CPU 10 generates game images for players other than the first player when the number of players meets the predetermined condition (step S45), and generates a game image for each player of the game when the number of players does not meet the predetermined condition (step S43). In this manner, in the second variant, whether or not to use the terminal device 7 to display a game image is determined in accordance with the number of players. As a result, it is possible to provide game images in a suitable display format in accordance with the number of players.

Furthermore, in the second variant, the television 2, which has a horizontally long display area, displays a game image with vertically long game images arranged side by side, respectively for the second and third players (note that a vertically long game image for the fourth player may be additionally included). Moreover, since the terminal device 7 is portable and can be positioned so as to have a vertically long screen, the second variant makes it possible to provide three or more vertically long game images. Thus, it is possible to equalize the ratio of width to height among game images, and render the game images readily viewable without causing much advantage/disadvantage among players.

Note that in the second variant, the predetermined condition the number of players is three or more is used, but this is not restrictive. For example, in another example embodiment, when horizontally long game images are displayed, the condition "the number of players is four" may be used as the predetermined condition. Specifically, when the number of players is two, the game apparatus 3 displays a game image for the first player on the terminal device 7 and a game image for the second player on the television 2. When the number of players is three, the game apparatus 3 displays a game image for the first player on the terminal device 7 and game images for the second and third players on the television 2. In this case, these two game images may be arranged vertically side by side so as to be horizontally longer. On the other hand, when the number of players is four, the game apparatus 3 causes the television 2 to display an image including four game images for the first to fourth players, and the terminal device 7 displays no game image. In this case, the four game images are displayed in four regions defined by equally dividing the display area of the television 2 (the regions being obtained by vertically halving the display area and then horizontally halving the resultant areas). In this manner, even in the case where the number of the players is anywhere from two to four, it is possible to provide the players with horizontally long game images.

(Third Variant where the Terminal Device 7 is Used or not Used Depending on the Game Situation)

Note that in the second variant, the game apparatus 3 uses the terminal device 7 to display a game image in accordance with the number of players. Here, in another variant, the game apparatus 3 may use the terminal device 7 to display a game image in accordance with the situation of the game. Hereinafter, referring to FIGS. 27 and 28, a third variant will be described where the terminal device 7 is used or not used depending on the situation of the game.

Figure 27:
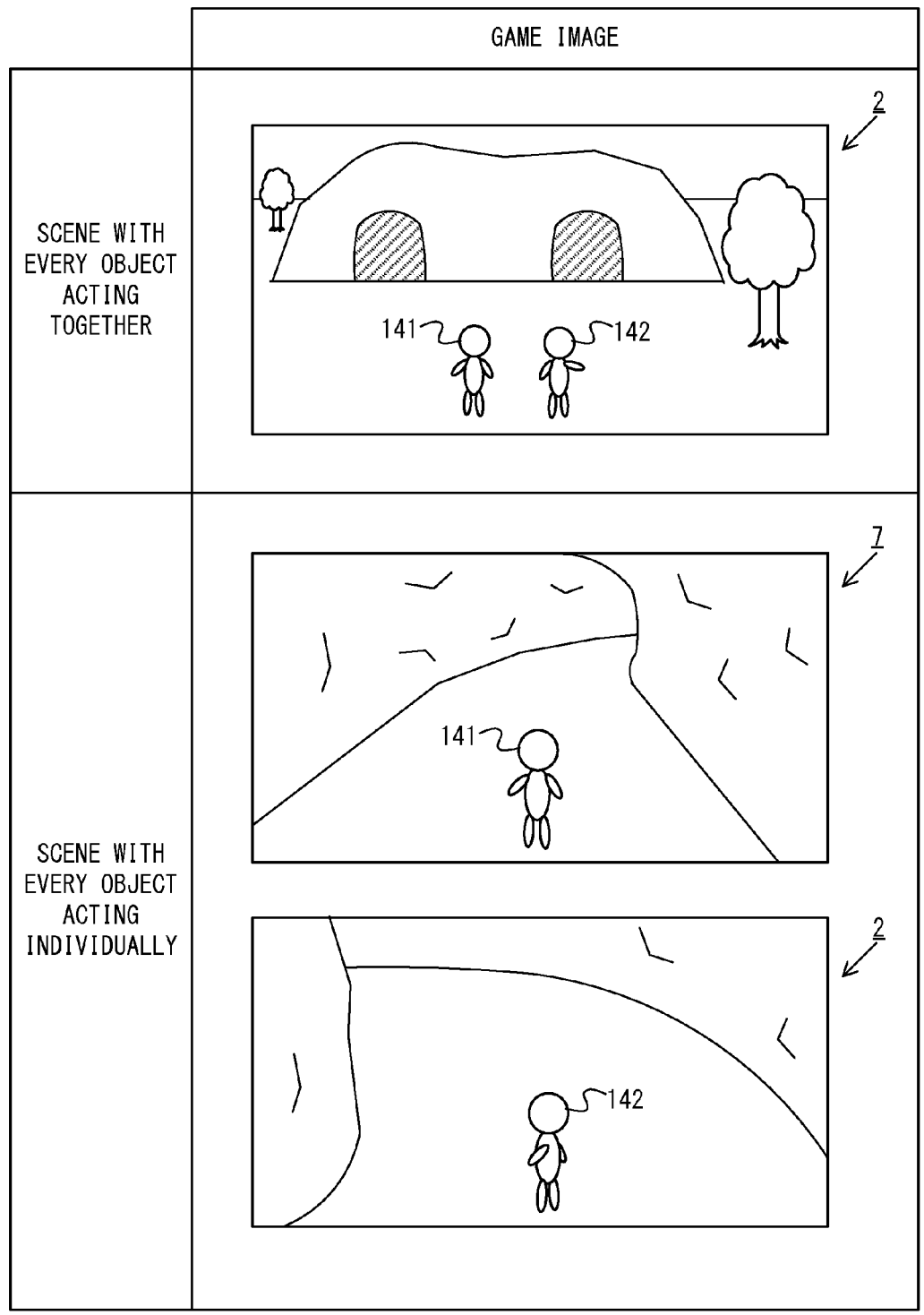
FIG. 27 is a diagram illustrating example game images in a third variant of the present example embodiment.

FIG. 27 is a diagram illustrating exemplary game images in the third variant. Note that it is assumed here that the number of players is two, the first player manipulates a first object 141, and the second player manipulates a second object 142. In addition, the objects 141 and 142 are assumed to be arranged in the same game space (i.e., in one game space).

The upper panel of FIG. 27 shows a game image for a scene where the objects 141 and 142 act together. In this scene, the objects 141 and 142 are arranged on the same game field. In such a scene, for example, it is conceivable that the objects 141 and 142 cooperate for progression of the game, and it might be preferable for each player to know the situation of the other object that is not manipulated by that player. Accordingly, in this case, a single game image which represents the game space including the objects 141 and 142 is displayed on the television 2, as shown in FIG. 27. That is, in the above case, one game image for both players is displayed on the television 2.

On the other hand, the lower panel of FIG. 27 shows game images for a scene where the objects 141 and 142 act individually. In this scene, the objects 141 and 142 enter different caves and act individually. In such a scene, there is little need for each player to know the situation of the other object that is not manipulated by that player, and by allowing each player to readily recognize that the objects 141 and 142 are in different places, it is rendered possible to enhance the real feel of the game. Accordingly, in this case, as shown in FIG. 27, a game image which represents a game space including the first object 141 is displayed on the terminal device 7, and a game image which represents a game space including the second object 142 is displayed on the television 2. That is, a game image for the first player is displayed on the terminal device 7, and a game image for the second player is displayed on the television 2.

As described above, in the third variant, the terminal device 7 does or does not display a game image depending on the situation of the game. Thus, it is possible to provide the players with appropriate game images in accordance with the situation of the game.

Hereinafter, the game process in the third variant will be described in detail mainly focusing on differences from the above example embodiment. In the third variant, the processes of steps S1 to S8 shown in FIG. 18 are basically performed as in the example embodiment, but the processes of steps S3 to S5 are different from those in the example embodiment.

First, in the game control process of step S3, the processing of, for example, controlling the actions of the objects 141 and 142 is performed on the basis of operation data for the controllers. Note that any method can be employed to operate the objects 141 and 142 so long as the objects are operated on the basis of the operation data.

Figure 28:
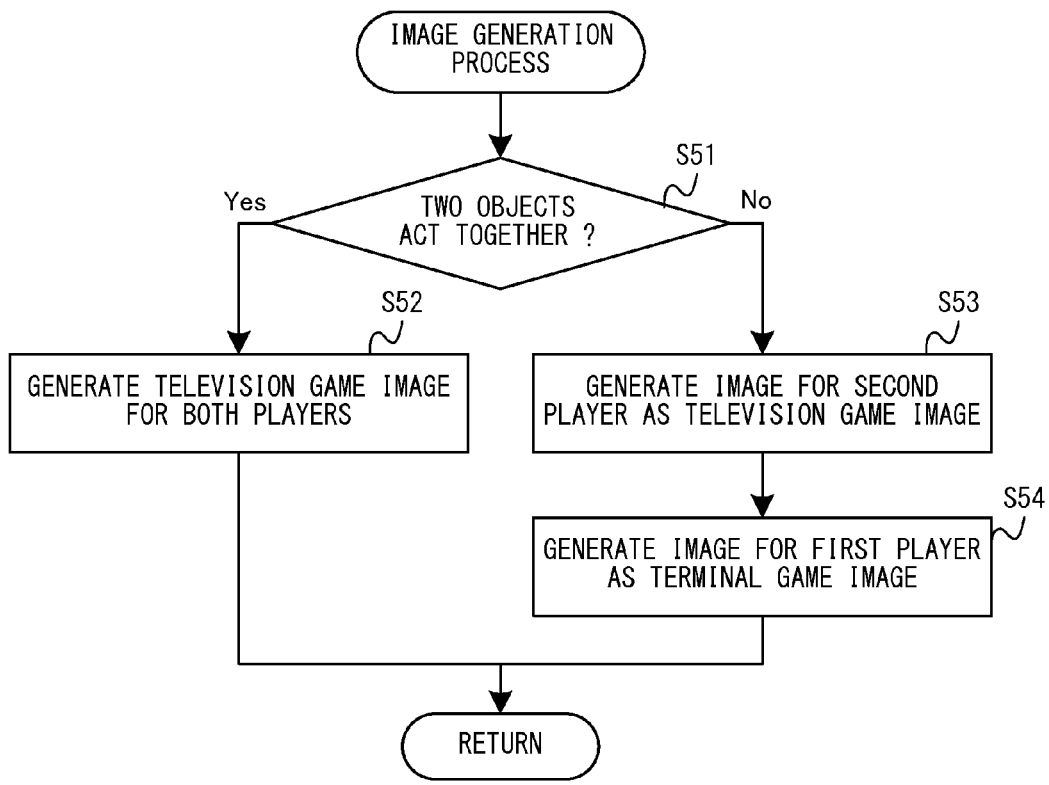
FIG. 28 is a flowchart illustrating a flow of an example image generation process to be performed in the third variant.

Furthermore, in the third variant, an image generation process shown in FIG. 28 is performed in place of the processes of steps S4 and S5 shown in FIG. 18. FIG. 28 is a flowchart illustrating a flow of the image generation process to be performed in the third variant. Hereinafter, referring to FIG. 28, the image generation process will be described in detail.

In the image generation process, the CPU 10 initially in step S51 determines whether the objects 141 and 142 act together or individually in a scene. The determination is made on the basis of the result for the game control process of step S3. For example, in the third variant, the determination of step S51 is made on the basis of whether or not the objects 141 and 142 enter a predetermined cave. When the result of the determination of step S51 is affirmative, the process of step S52 is performed. On the other hand, when the result of the determination of step S51 is negative, the process of step S53 is performed.

In step S52, a game image for both players is generated as a television game image. Specifically, the CPU 10 and the GPU 11b collaborate to generate an image that represents a game space including the objects 141 and 142 to be operated by the players. Note that in the third variant, a single game image that represents a game space including the objects 141 and 142 is generated in step S52, but in another example embodiment, the game image may include an image that represents a game space including the first object 141 and another image that represents a game space including the second object 142. That is, a single game image may be generated for both players, or the game image may include separate images for the first player and the second player. In addition, the specific game image generation method may be arbitrary, e.g., the same method as in the example embodiment may be employed. The generated game image is stored to the VRAM 11d. After step S52, the CPU 10 ends the image generation process.

On the other hand, in step S53, a game image for the second player is generated as a television game image. Specifically, the CPU 10 and the GPU 11b collaborate to generate an image that represents a game space including the second object 142 to be operated by the second player. The specific game image generation method may be arbitrary, e.g., the same method as in the example embodiment may be employed. The generated game image is stored to the VRAM 11d. Following step S53, the process of step S54 is performed.

In step S54, a game image for the first player is generated as a terminal game image. Specifically, the CPU 10 and the GPU 11b collaborate to generate an image that represents a game space including the first object 141 to be operated by the first player. The specific game image generation method may be arbitrary, e.g., the same method as in the example embodiment may be employed. The generated game image is stored to the VRAM 11d. After step S54, the CPU 10 ends the image generation process.

After the image generation process, the processes of steps S6 to S8 are performed in the same manner as in the example embodiment. Specifically, in step S6, the television game image generated in step S52 or S53 is outputted to the television 2 and then displayed thereon. Subsequently, in step S7, the terminal game image generated in step S54 is outputted (transmitted) to the terminal device 7 and then displayed thereon. Note that when the result of the determination of step S51 is affirmative, no terminal game image is displayed.

As described above, in the third variant, by the game control process of step S3, it is determined whether a predetermined game condition is satisfied or not, i.e., it is determined whether the objects 141 and 142 act individually or not in the scene (step S51). When the game control process determines that the predetermined game condition is satisfied, the CPU 10 generates a terminal game image for the first player (step S54). In this case, the CPU 10 also generates a television game image for the second player (step S53). On the other hand, when the game process determines that the predetermined game condition is not satisfied, a television game image for both players is generated (step S52). In this manner, in the third variant, whether the terminal device 7 is used to display a game image or not is determined in accordance with the situation of the game. Thus, it is possible to provide game images in appropriate display forms in accordance with the situation of the game.

(Variant Related to the Configuration of the Game System)

In the above example embodiment, the game system 1 includes a plurality of controllers 5 functioning as operating devices, one game apparatus 3 for performing game processes, and one terminal device 7 functioning as a display device. Here, in another example embodiment, the game system 1 may include a plurality of terminal devices 7. In the case where a plurality of terminal devices are used, each terminal device displays one game image for one player. Accordingly, for example, in the case where the game system 1 includes two terminal devices, the game system 1 includes a total of three display devices, i.e., the television 2 and the two terminal devices, so that the display devices can display three game images for three players. In addition, in the case of a game to be played by four players, two against two, it is possible to display one game image on each of the terminal devices for two players in the same team, and two game images on the television 2 for two players in the other team. As a result, even in the case of a two-against-two game, the game can be played without showing game images for one side to the other side.

(Variant Related to the Information Processing Apparatus for Performing the Game Process)

In the above example embodiment, a series of game processes to be performed in the game system 1 are performed by the game apparatus 3, but the series of game processes may be performed in part by another apparatus. For example, in another example embodiment, a part (e.g., the terminal game image generation process) of the series of game processes may be performed by the terminal device 7. Moreover, in another example embodiment, a series of game processes in a game system including a plurality of information processing apparatus capable of communicating with each other may be shared between the information processing apparatuses. Note that in the case where a plurality of information processing apparatuses perform game processes, synchronizing the game processes performed by the information processing apparatuses complicates the game processes. On the other hand, as in the present example embodiment, in the case where one game apparatus 3 performs game processes and one terminal device 7 performs the processing of receiving and displaying game images, it is not necessary to synchronize game processes between a plurality of information processing apparatuses, so that the game processes can be simplified.

The systems, devices and apparatuses described herein may include one or more processors, which may be located in one place or distributed in a variety of places communicating via one or more networks. Such processor (s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the present example embodiment can be applied to, for example, a game system, apparatus, or program for the purpose of, for example, reducing the number of divisions in the display area of a display device, thereby displaying game images that can be readily viewed.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system for a plurality of players to play a game, comprising a plurality of operating devices, a game apparatus, and at least one portable display device, wherein,
the game apparatus includes:
an operation data acquisition device configured to acquire operation data from each of the operating devices, the operation data being outputted on the basis of an operation on the operating device;
a game processor configured to perform a game process on the basis of the operation data;
a first image generator configured to generate a first game image on the basis of the game process, the first game image being intended for a predetermined first one of the players;
a second image generator configured to generate second game image on the basis of the game process, the second game image being intended for another player different from the first player;
a first image output configured to output the first game image to the portable display device; and
a second image output configured to output the second game image to a predetermined display device different from the portable display device, and
the portable display device includes:
a game image receiver configured to receive the first game image, and
a display device configured to display the first game image;
wherein each of the plurality of operating devices is a physically separate device from each other and from the portable display device.

2. The game system according to claim 1, wherein,
the game processor includes:
a first virtual camera controller configured to control a first virtual camera set in a game space, on the basis of operation data representing an operation on the operating device manipulated by the first player; and
a second virtual camera controller configured to control a second virtual camera set in the game space, on the basis of operation data representing an operation on the operating device manipulated by the other player,
the first image generator is configured to generate the first game image on the basis of the first virtual camera, and
the second image generator is configured to generate the second game image on the basis of the second virtual camera.

3. The game system according to claim 1, wherein,
each of the operating devices includes a sensor device configured to detect a physical quantity for calculating an attitude of the operating device,
the operation data includes data acquired from the sensor device, and
the game processor includes an attitude calculation processor configured to calculate the attitude of the operating device on the basis of the physical quantity included in the operation data, and perform the game process on the basis of the attitude of the operating device.

4. The game system according to claim 1, wherein,
each of the operating devices includes a sensor device configured to detect a physical quantity for calculating a motion of the operating device,
the operation data includes data acquired from the sensor device, and
the game processor includes an attitude calculation processor configured to calculate the motion of the operating device on the basis of the physical quantity included in the operation data, and perform the game process on the basis of the motion of the operating device.

5. The game system according to claim 1, wherein the game processor includes:
a first specification processor configured to specify a position in a display area of the portable display device on the basis of operation data for the operating device manipulated by the first player, and perform a process in accordance with the specified position; and
a second specification processor configured to specify a position in a display area of the predetermined display device on the basis of operation data for the operating device manipulated by the other player, and perform a process in accordance with the specified position.

6. The game system according to claim 1, wherein,
the number of operating devices included in the game system is at least three, and
the second image generator is configured to generate as the second game image a game image including an image for a second player different from the first player and an image for a third player different from the first player.

7. The game system according to claim 6, wherein,
the predetermined display device has a horizontally long display area, and
the second image generator is configured to generate as the second game image an image having vertically long game images arranged side by side, respectively for the second and third players.

8. The game system according to claim 1, wherein,
the first image generator is configured to generate a first game image for the first player when the game process meets a predetermined game condition, and
the second image generator is configured to generate a game image for the other player as the second game image when the game process meets the predetermined game condition, or a game image for the plurality of players as the second game image when the game process does not meet the predetermined game condition.

9. The game system according to claim 1, wherein each of the operating devices does not include a display device for displaying game images.

10. The game system according to claim 1, wherein the portable display device further includes a light-emitter and each of operating devices further includes a detector configured to detect light from the light emitter of the portable display device.

11. A game system for a plurality of players to play a game, comprising a plurality of operating devices, a game apparatus, and at least one portable display device, wherein,
the game apparatus includes:
an operation data acquisition device configured to acquire operation data from each of the operating devices, the operation data being outputted on the basis of an operation on the operating device;
a game processor configured to perform a game process on the basis of the operation data;
a first image generator configured to generate a first game image on the basis of the game process, the first game image being intended for a predetermined first one of the players;
a second image generator configured to generate a second game image on the basis of the game process, the second game image being intended for another player different from the first player;
a first image output configured to output the first game image to the portable display device; and
a second image output configured to output the second game image to a predetermined display device different from the portable display device, and
the portable display device includes:
a game image receiver configured to receive the first game image, and
a display device configured to display the first game image;
the game system further comprises a light-emitting device arrangeable close to the predetermined display device;
the portable display device further includes a light-emitter,
each of the operating devices further includes an image pickup device configured to pickup light from both the light-emitting device and the light-emitter,
the operation data includes imaging data for an image picked up by the image pickup device, and
the game processor uses the imaging data to perform a game process based on a position of a predetermined imaging target within the pickup image.

12. A game system for a plurality of players to play a game, comprising a plurality of operating devices, a game apparatus, and at least one portable display device, wherein,
the game apparatus includes:
an operation data acquisition device configured to acquire operation data from each of the operating devices, the operation data being outputted on the basis of an operation on the operating device;
a game processor configured to perform a game process on the basis of the operation data;
a first image generator configured to generate a first game image on the basis of the game process, the first game image being intended for a predetermined first one of the players;
a second image generator configured to generate a second game image on the basis of the game process, the second game image being intended for another player different from the first player;
a first image output configured to output the first game image to the portable display device; and
a second image output configured to output the second game image to a predetermined display device different from the portable display device, and
the portable display device includes:
a game image receiver configured to receive the first game image, and
a display device configured to display the first game image;
the operation data acquisition device is configured to acquire operation data from anywhere from one to a predetermined number of operating devices,
the game processor includes a determination device configured to determine whether or not the number of players of the game meets a predetermined condition,
the first image generator is configured to generate a first game image for the first player when the number of players meets the predetermined condition, and
the second image generator is configured to generate a game image for the other player as the second game image when the number of players meets the predetermined condition, or a game image for each player of the game as the second game image when the number of players does not meet the predetermined condition.

13. A game process method to be executed by a game apparatus for a plurality of players to play a game, the method comprising:
   acquiring operation data from a plurality of operating devices, the operation data being outputted on the basis of an operation on the operating device;
   performing, using a computer processor, a game process on the basis of the operation data;
   generating a first game image on the basis of the game process, the first game image being intended for a predetermined first one of the players;
   generating a second game image on the basis of the game process, the second game image being intended for another player different from the first player;
   outputting the first game image to be displayed on a portable display device; and
   transmitting the second game image to be displayed on a predetermined display device different from the portable display device;
   wherein each of the plurality of operating devices is a physically separate device from each other and from the portable display device.

14. The game process method according to claim 13, wherein,
   when the process is performed, the game apparatus controls a first virtual camera set in a game space, on the basis of operation data representing an operation on the operating device manipulated by the first player,
   the game apparatus controls a second virtual camera set in the game space, on the basis of operation data representing an operation on the operating device manipulated by the other player,
   the game apparatus generates the first game image on the basis of the first virtual camera, and
   the game apparatus generates the second game image on the basis of the second virtual camera.

15. The game process method according to claim 13, wherein,
   each of the operating devices includes a sensor device for detecting a physical quantity for calculating an attitude of the operating device,
   the operation data includes data acquired from the sensor device, and
   the game apparatus calculates the attitude of the operating device on the basis of the physical quantity included in the operation data, and performs the game process on the basis of the attitude of the operating device.

16. The game process method according to claim 13, wherein,
   each of the operating devices includes a sensor device for detecting a physical quantity for calculating a motion of the operating device,
   the operation data includes data acquired from the sensor device, and
   the game apparatus calculates the motion of the operating device on the basis of the physical quantity included in the operation data, and performs the game process on the basis of the motion of the operating device.

17. The game process method according to claim 13, wherein,
   when the game process is performed, the game apparatus specifies a position in a display area of the portable display device on the basis of operation data for the operating device manipulated by the first player, and performs a process in accordance with the specified position, and
   the game apparatus specifies a position in a display area of the predetermined display device on the basis of operation data for the operating device manipulated by the other player, and performs a process in accordance with the specified position.

18. The game process method according to claim 13, wherein,
   the game system further includes a light-emitting device arrangeable close to the predetermined display device,
   the portable display device further includes a light-emitter,
   each of the operating devices further includes an image pickup device capable of picking up light from both the light-emitting device and the light-emitting device,
   the operation data includes imaging data for an image picked up by the image pickup device, and
   the game apparatus performs the game process on the basis of the imaging data.

19. The game process method according to claim 13, wherein,
   the number of operating devices included in the game system is at least three, and
   the game apparatus generates as the second game image a game image including an image for a second player different from the first player and an image for a third player different from the first player.

20. The game process method according to claim 19, wherein,
   the predetermined display device has a horizontally long display area, and
   the game apparatus generates as the second game image an image having vertically long game images arranged side by side, respectively for the second and third players.

21. The game process method according to claim 13, wherein,
   the game apparatus is capable of acquiring operation data from anywhere from one to a predetermined number of operating devices,
   when the game process is performed, the game apparatus determines whether or not the number of players of the game meets a predetermined condition,
   the game apparatus generates a first game image for the first player when the number of players meets the predetermined condition, and
   the game apparatus generates a game image for the other player as the second game image when the number of players meets the predetermined condition, or a game image for each player of the game as the second game image when the number of players does not meet the predetermined condition.

22. The game process method according to claim 13, wherein,
   the game apparatus generates a first game image for the first player when the game process meets a predetermined game condition, and
   the game apparatus generates a game image for the other player as the second game image when the game process meets the predetermined game condition, or a game image for the plurality of players as the second game image when the game process does not meet the predetermined game condition.

23. The game process method according to claim 13, wherein each of the operating devices does not include a display device for displaying game images.

24. The game process method according to claim 13, wherein the portable display device further includes a light-emitter and each of operating devices further includes a detector configured to detect light from the light emitter of the portable display device.

25. A game apparatus for a plurality of players to play a game, wherein the apparatus is capable of communicating with a plurality of operating devices and at least one portable display device, the apparatus comprising:
   a processing system, including a computer processor, the processing system being configured to at least:
      acquire operation data from each of the operating devices, the operation data being outputted on the basis of an operation on the operating device;
      perform a game process on the basis of the operation data;
      generate a first game image on the basis of the game process, the first game image being intended for a predetermined first one of the players;
      generate a second game image on the basis of the game process, the second game image being intended for another player different from the first player;
      output the first game image to be displayed on the portable display device; and
      output the second game image to be displayed on a predetermined display device different from the portable display device;
   wherein each of the plurality of operating devices is a physically separate device from each other and from the portable display device.

26. The game apparatus according to claim 25, wherein each of the operating devices does not include a display device for displaying game images.

27. The game apparatus according to claim 25, wherein the portable display device further includes a light-emitter and each of operating devices further includes a detector configured to detect light from the light emitter of the portable display device.

28. A non-transitory computer-readable storage medium having stored therein a game program to be performed by a computer of a game apparatus for a plurality of players to play a game, wherein the game apparatus is capable of communicating with a plurality of operating devices and at least one portable display device, the program causing the computer to perform:
   acquisition of operation data from each of the operating devices, the operation data being outputted on the basis of an operation on the operating device;
   a game process on the basis of the operation data;
   generation of a game image for a predetermined first one of the players on the basis of the game process as a first game image to be displayed on the portable display device; and
   generation of a game image for another player different from the first player on the basis of the game process as a second game image to be displayed on a predetermined display device different from the portable display device;
   wherein each of the plurality of operating devices is a physically separate device from each other and from the portable display device.

29. The non-transitory computer-readable storage medium according to claim 28, wherein each of the operating devices does not include a display device for displaying game images.

30. The non-transitory computer-readable storage medium according to claim 28, wherein the portable display device further includes a light-emitter and each of operating devices further includes a detector configured to detect light from the light emitter of the portable display device.

* * * * *